United States Patent
Gutierrez

(10) Patent No.: US 8,744,975 B2
(45) Date of Patent: Jun. 3, 2014

(54) INTERACTIVE MEDIA CONTENT DISPLAY SYSTEM

(75) Inventor: John J. Gutierrez, Frederiksted, VI (US)

(73) Assignee: MyPowerPad, LLC, Christiansted, VI (US)

( * ) Notice: Subject to any disclaimer, the term of this patent is extended or adjusted under 35 U.S.C. 154(b) by 1383 days.

(21) Appl. No.: 12/389,435

(22) Filed: Feb. 20, 2009

(65) Prior Publication Data

US 2009/0216683 A1    Aug. 27, 2009

Related U.S. Application Data

(60) Provisional application No. 61/030,355, filed on Feb. 21, 2008.

(51) Int. Cl.
*G06Q 50/00* (2012.01)
*G06Q 50/18* (2012.01)

(52) U.S. Cl.
CPC ........ *G06Q 50/184* (2013.01); *G06Q 2220/165* (2013.01); *G06Q 2220/10* (2013.01); *Y10S 705/904* (2013.01)
USPC .......................................... 705/310; 705/904

(58) Field of Classification Search
CPC .................... G06Q 2220/10; G06Q 2220/165; G06Q 50/184
USPC .................................. 705/310, 904
See application file for complete search history.

(56) References Cited

U.S. PATENT DOCUMENTS

| | | | |
|---|---|---|---|
| 6,268,849 B1 * | 7/2001 | Boyer et al. | 725/40 |
| 7,840,563 B2 * | 11/2010 | Powers et al. | 707/736 |
| 7,849,207 B2 * | 12/2010 | Kazmi et al. | 709/232 |
| 8,032,649 B2 * | 10/2011 | Gupta et al. | 709/231 |
| 2001/0037399 A1 * | 11/2001 | Eylon et al. | 709/231 |
| 2002/0026638 A1 * | 2/2002 | Eldering et al. | 725/42 |
| 2002/0040323 A1 * | 4/2002 | Lee et al. | 705/26 |
| 2002/0104096 A1 * | 8/2002 | Cramer et al. | 725/113 |
| 2004/0030643 A1 * | 2/2004 | Madison et al. | 705/39 |
| 2004/0133467 A1 * | 7/2004 | Siler | 705/14 |
| 2005/0278760 A1 * | 12/2005 | Dewar et al. | 725/94 |
| 2006/0120385 A1 * | 6/2006 | Atchison et al. | 370/400 |
| 2007/0035764 A1 * | 2/2007 | Aldrich et al. | 358/1.15 |
| 2007/0136487 A1 * | 6/2007 | Woo et al. | 709/231 |
| 2007/0300149 A1 * | 12/2007 | Bryant et al. | 715/513 |
| 2008/0005348 A1 * | 1/2008 | Kosiba et al. | 709/231 |
| 2008/0084470 A1 * | 4/2008 | Hamilton | 348/14.09 |

(Continued)

OTHER PUBLICATIONS

U.S. Appl. No. 60/888,084, filed Feb. 3, 2007.*

(Continued)

*Primary Examiner* — Calvin Cheung

(74) *Attorney, Agent, or Firm* — Harness, Dickey & Pierce, P.L.C.

(57) ABSTRACT

A system and method is provided including a central application server with a data storage unit including a plurality of client containers corresponding to a plurality of clients. Each client container stores client media content provided by a respective client. The client media content includes at least one of audio files, video files, and audio/video files. A plurality of computing devices is connected to the central application server. Each computing device receives client media content from at least one client container of the plurality of client containers. Each client container of the plurality of client containers is updated independently with client media content from each respective client.

8 Claims, 48 Drawing Sheets

(56) References Cited

U.S. PATENT DOCUMENTS

| | | | |
|---|---|---|---|
| 2008/0140719 A1* | 6/2008 | Chaney et al. | 707/104.1 |
| 2008/0184117 A1* | 7/2008 | Alsbury et al. | 715/719 |
| 2008/0189617 A1* | 8/2008 | Covell et al. | 715/738 |
| 2008/0263610 A1* | 10/2008 | Murray et al. | 725/110 |
| 2008/0307106 A1* | 12/2008 | Miller et al. | 709/231 |
| 2009/0049184 A1* | 2/2009 | Boss et al. | 709/231 |
| 2009/0150797 A1* | 6/2009 | Burkholder et al. | 715/747 |
| 2009/0157803 A1* | 6/2009 | Haggis et al. | 709/203 |
| 2009/0204885 A1* | 8/2009 | Ellsworth et al. | 715/234 |
| 2009/0217343 A1* | 8/2009 | Bellwood et al. | 726/1 |
| 2009/0327895 A1* | 12/2009 | Bailloux et al. | 715/730 |
| 2012/0284765 A1* | 11/2012 | Killick et al. | 725/111 |

OTHER PUBLICATIONS

Youtube, Wikipedia, all pages, Feb. 2, 2007. http://web.archive.org/web/20070202090641/http://en.wikipedia.org/wiki/YouTube.*

* cited by examiner

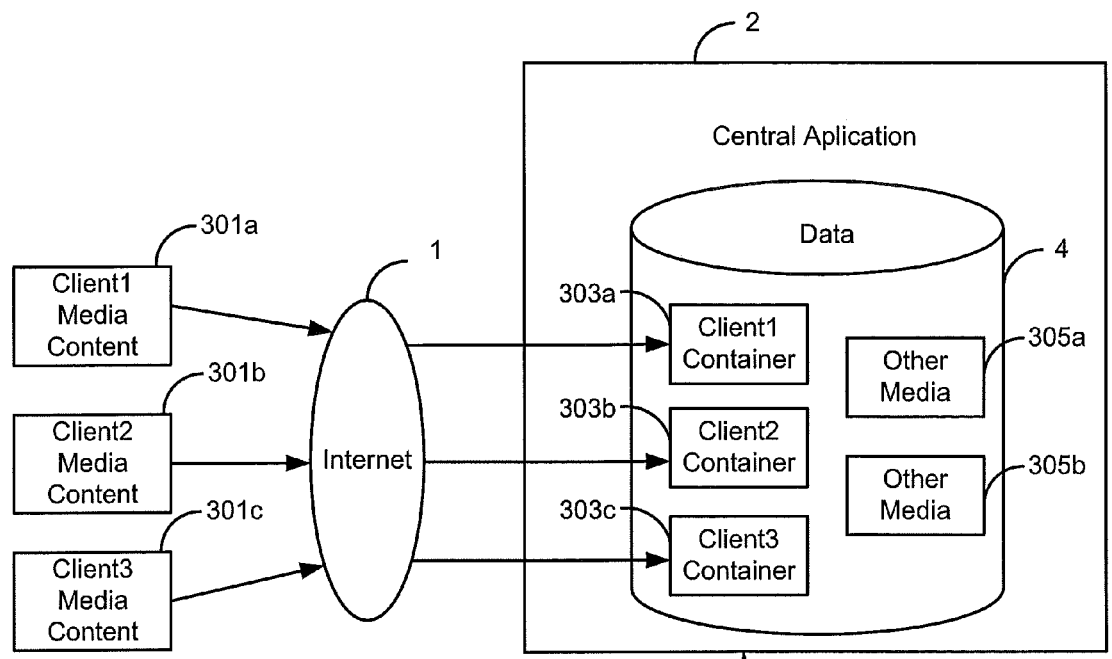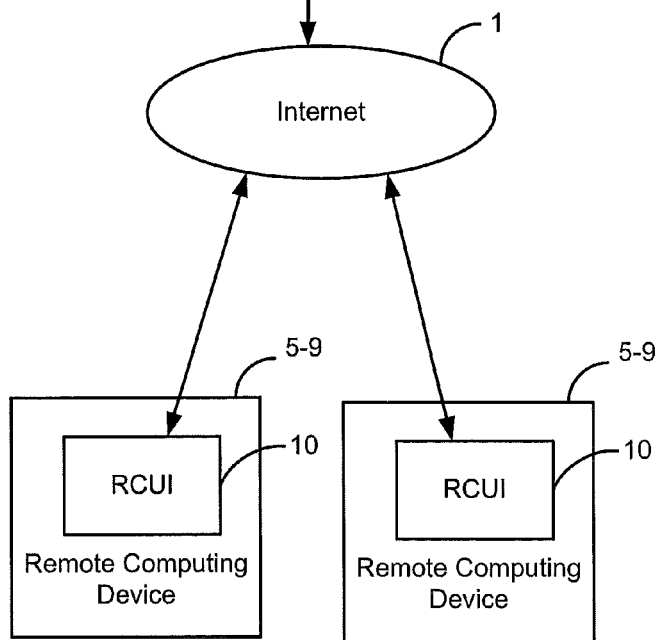
FIG. 46

INTERACTIVE MEDIA CONTENT DISPLAY SYSTEM

CROSS-REFERENCE TO RELATED APPLICATIONS

This application claims the benefit of U.S. Provisional Application No. 61/030,355, filed on Feb. 21, 2008. The entire disclosure of the above application is incorporated herein by reference.

BACKGROUND

The statements in this section provide background and may not constitute prior art.

Rich Client User Interfaces (RCUI) may be comprised of tethered and untethered widgets, gadgets, gizmos, dashboards, portals, GUI widgets, dashboard widgets, web widgets, rich interface applications, service-oriented applications, object-oriented applications, interactive portable desktops, dashboard interfaces, client-server applications, and roaming desktops. Essentially, all of these objects relate to embeddable, web-server-deployed, or downloadable Rich Internet Application (RIA) or Rich Client User Interface (RCUI) frameworks that operate inside an encapsulated window environment and that integrate multiple fonts, vector and bitmap graphic files, animations, online conferencing, audio and video, simple navigation, etc., into a single screen. RIA vendors may use auto-generation of code in some aspect of their systems where mini applications are "assembled" online using browser-based software models to build and deploy Rich Internet Applications on-the-fly to the web or to the user's desktop.

These objects may connect to web services to deliver business data, weather information, news updates, recipes, sports scores, traffic maps, streaming media, and even slide shows of online photo albums. They may also integrate with other programs to provide streamlined interaction with lifestyle logistics. For example, they may give a user an at-a-glance view of all online instant messaging contacts, the day view from a calendar, or an easy way to control a media player. They may also have any number of dedicated purposes such as calculators, games, sticky notes, etc.

One issue with existing products is that the objects are limited in terms of delivery channels, as well as two-way data/media/streaming media-centric content. Further, cross-domain access is restricted, as is application reusability and recomposition of flow and flexibility once deployed.

For example, a new mini-application may be created to update the embeddable object that preceded it and the user may be forced to keep coming back to the web assembly platform to make more. In the event the mini-application is downloaded, the immense potential for desktop clutter is invoked in addition to the mini-application update issue.

Another issue with existing products is that online, menu-based, membership-driven "widget or gadget factories" that depend largely on ad insertion to subsidize their company and that use members as ad carriers to feed off of online social community platforms have done so at their own peril by creating an unauthorized dependency on social community hosts who are, or may become, intolerant of such parasitical practices.

SUMMARY

To address these issues, the present teachings relate to a rich client user interface (RCUI) application, a web client, and application server.

The downloadable, embeddable, or web-server-deployed, rich graphical and intuitive User Interface (UI) framework may encapsulate, in a windows environment, dense, interactive, two-way web or flash-based, data/media-centric, streaming media-centric content, and online communication functionality, and may deliver it to a user desktop, or plurality of user desktops, with single-click, hyperlinked procedural calls.

The web client may enable a user to display and interact with text, images, videos, music and other information using loosely coupled web-oriented architecture (WOA), protocols, and hyperlink structures typically located on a web page at a website on the World Wide Web or a local area network (LAN).

The application server may employ a software engine that delivers applications to client computers or devices, typically through the Internet via the extensive use of server-side dynamic content and integration with database engines, while processing and governing the state of most, if not all, of the ubiquitous program logic and data access requests of the application.

The present teachings may provide a hybrid desktop portal to overcome the shortcomings of prior art devices.

The present teachings may provide a hybrid desktop portal for online information access, delivery and communication.

The present teachings may provide a hybrid desktop portal that enhances prefab, multi-channel delivery, modular virtual asset leverage and management of data/media/streaming media-centric content, online communication functionality, and cross-domain access.

The present teachings may provide a hybrid desktop portal that enhances dynamic rich client user interface (RCUI) performance responsiveness, recomposability, interoperability, and reusability.

The present teachings may provide a hybrid desktop portal that enhances highly intuitive and interactive rich client user interface (RCUI) flexibility, flow, control, and functionality.

The present teachings may provide a hybrid desktop portal that enhances predictable rich client user interface (RCUI) service structure that drives processing logic, while triggering network effects and stimulating virally proliferated-user behavior of those who interact with it.

The present teachings may provide a hybrid desktop portal that enhances overall persistence in user experience of the rich client user interface (RCUI) as a desktop display that composites multiple web, data, and streaming objects into a single, common architecture, while simultaneously utilizing the agility, reach, and two-way dialogue capability of the Internet.

A system is provided having a central application server with a data storage unit including a plurality of client containers corresponding to a plurality of clients. Each client container stores client media content provided by a respective client. The client media content includes at least one of audio files, video files, and audio/video files. The system also comprises a plurality of computing devices connected to the central application server. Each computing device receives client media content from at least one client container of the plurality of client containers. Each client container of the plurality of client containers is updated independently with client media content from each respective client.

In other features, the client media content may include advertising related to the respective client.

In other features, each computing device may include a user interface application for providing the client media content to a user.

In other features, the user interface application may include a media retrieval module for receiving the client media content from the central application server.

In other features, the user interface application may include a media control module for receiving user input from the user with respect to outputting the client media content to the user.

In other features, the user interface application may include a flash ticker module for displaying at least one of animated text or hyper-linkable text.

In other features, the client media content may be streamed to the plurality of computing devices.

A method is also provided that includes providing a central application server with a data storage unit including a plurality of client containers corresponding to a plurality of clients. Each client container stores client media content provided by a respective client. The client media content includes at least one of audio files, video files, and audio/video file. The method also includes executing an agreement with each client of the plurality of clients to allow each client to independently update a respective client container of the plurality of client containers with client media content for a fee. The method also includes providing the client media content to a plurality of computing devices, each computing device including a user interface application for outputting the client media content.

In other features, the method may include executing an agreement with a user for providing the client media content to the user through a respective computer device, the agreement including providing the client media content for a fee.

In other features, the method may include executing an agreement with a user for providing the client media content to the user through a respective computer device, the agreement including providing the client media content for free.

In other features, the client media content may include advertising related to a respective client.

In other features, the method may include providing each user interface application with at least one of animated text or hyper-linkable text for display with a flash ticker module of said each user interface application.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 9 is a schematic illustration of an exemplary graphical user screen displaying a loading of virtual assets after log on.

FIG. 46 is schematic illustration of an exemplary virtual asset management system with client controlled content functionality.

DETAILED DESCRIPTION

Figure 1:
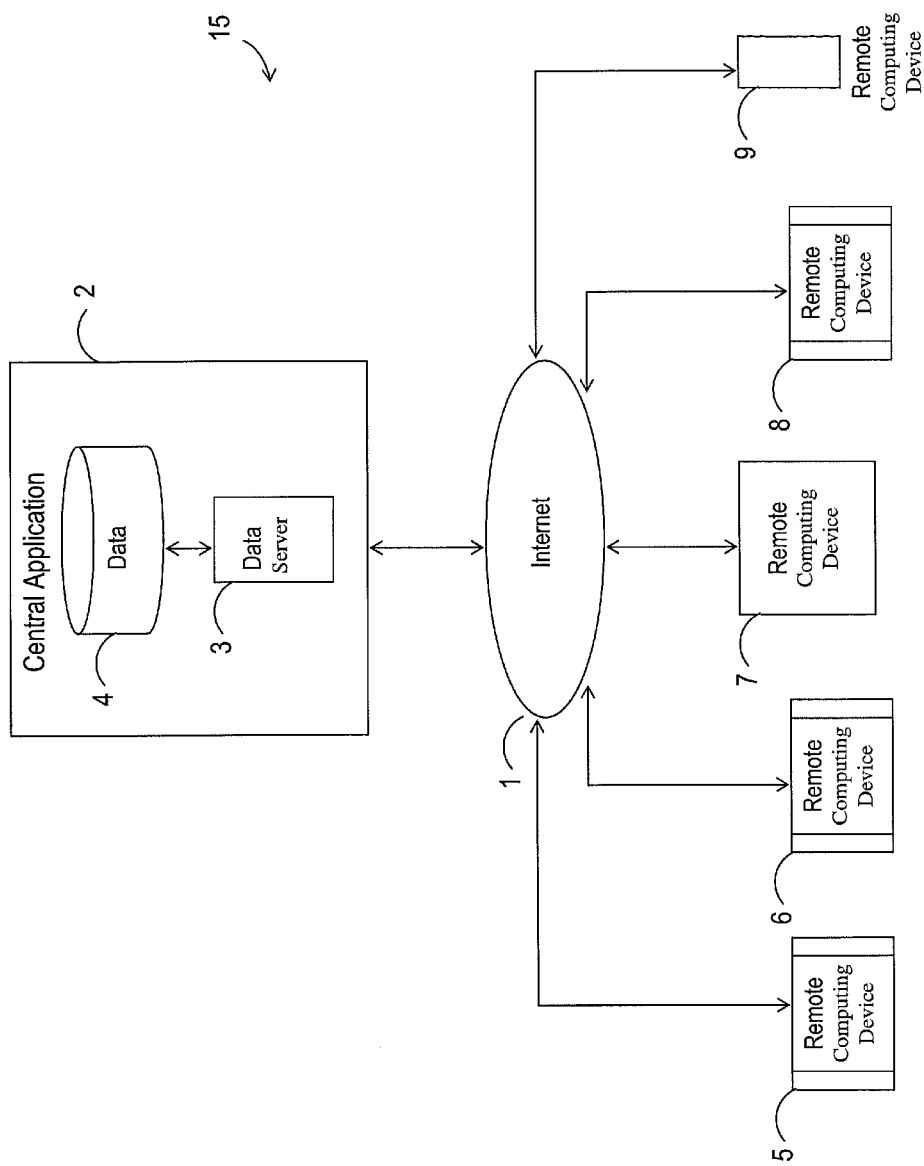
FIG. 1 is a diagrammatic illustration of an architecture of a virtual asset management system.

The following description is merely exemplary in nature and is not intended to limit the present disclosure, application, or uses. It should be understood that throughout the drawings, corresponding reference numerals indicate like or corresponding parts and features.

As used herein, the term module may refer to one or more of the following: a processor (shared, dedicated, or group) and memory that execute one or more software or firmware programs or a portion of one or more software or firmware programs, an application specific integrated circuit (ASIC), an electronic circuit, a combinational logic circuit, and/or other suitable components that provide the described functionality. As used herein, computer readable medium may refer to any medium capable of storing data for a computer or module, including, but not limited to, memory, RAM, ROM, PROM, EPROM, EEPROM, flash memory, CD-ROM, floppy disk, magnetic tape, other magnetic medium, optical medium, or any other device or medium capable of storing data that is readable by a computer.

A management system 15 for managing virtual assets or works is illustrated in FIG. 1. The system may enable users to work from computer systems with an Internet connection. The system further may enable users to select and access virtual assets from a single integrated interface. The assets may generally be in digital form and stored in a computer file (e.g., .mp3, .jpg, .gif, .swf, .pdf, .ppt, or other extension, etc.) associated or formatted for use with one or more software applications or modules.

System 15 may include end user systems or remote computing devices 5-9. For example, remote computing devices may include laptop 6, personal computer or workstation 7, laptop 8, personal computer, mobile device 9, personal data assistant (PDA), smart phone, or any other suitable device. Each may be coupled to a central application server 2 via a communication network 1, such as the Internet. The remote computing devices may be implemented by any conventional, or other suitable, computer or processing systems (e.g., laptops, personal computers, workstations, PDA's, mobile devices, etc.) with any conventional, or other suitable, operating system (e.g., Windows, Macintosh, Unix, LINUX, etc.). Central application server 2 may transfer data to and/or receive data from the remote computing devices via the communication network 1. The central application server may double as, or be coupled to, a database server system 3 to store and retrieve data, including media content, from/within an associated data storage unit 4.

Figure 2:
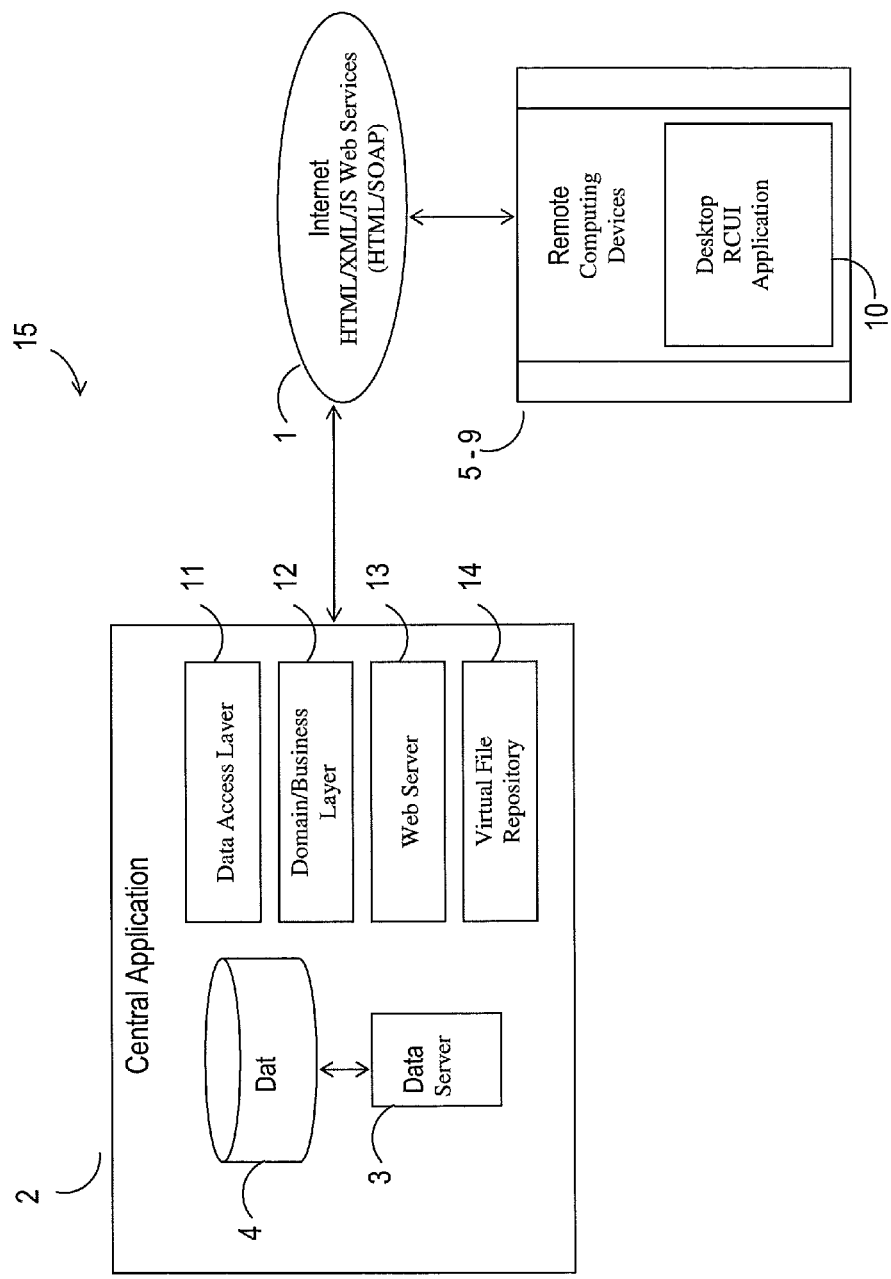
FIG. 2 is a block diagram of a system architecture of a virtual asset management system.

Referring to FIG. 2, each remote computing device may establish communications with central application server 2. A user may interact with the central application server 2 to select and access virtual assets via a Rich Client User Interface (RCUI) Application 10 residing on the remote computing device associated with that user. Communication between the central application server 2 and the remote computing devices 5-9 may be bi-directional, where users may connect to the central application server by interacting with a visual, graphical interface provided by the embedded RCUI Application. RCUI Application 10 may interpret the actions, data, or input submitted or inputted by the user and may generate a standards-based (e.g., SOAP/HTML) Web Service request to central application server 2. The central application server 2 may subsequently process each Web Server Request and may send the appropriate SOAP/HTML response back to RCUI Application 10. The web services may enable discrete units of application-level functionality to be exposed across the network for user consumption.

The central application server 2 may be implemented by any conventional or other computer or processing systems (e.g., personal computer, server, etc.) with any conventional, or other, operating system and software (e.g., Windows, Unix, LINUX, communications/server software, etc.). The central application server may include an n-tier architecture including a generic data access layer to support plural relational databases for data storage, a domain/business layer to support fulfillment of business processes, and a web services layer accessible to remote clients. In particular, central application server 2 may include a web server 13, a virtual file system 14, a domain/business layer 12 and a data access layer 11. Web server 13 may be responsible for handling HTTP/Web Service requests initiated by an end user. The virtual file system may store creative assets uploaded from an end user system and may generally represent a remote file system (e.g., a collection of folders, files, and associated metadata and/or media or other content that are stored on the central application server 2). The virtual file system may generally be a centralized area for end users and/or clients to store and manage virtual assets. Domain/business layer 12 may include logic for encapsulating business processes supported by the system, while data access layer 11 may provide a mechanism for data storage and retrieval from database storage servers 3, which may be implemented by relational database servers (e.g., Microsoft SQL Server, Oracle Database 10 g, MySQL, PostgreSQL, etc.). Relational database server 3 may store user data, folder and portfolio metadata and metadata for virtual assets stored in virtual file system 14.

Figure 3:
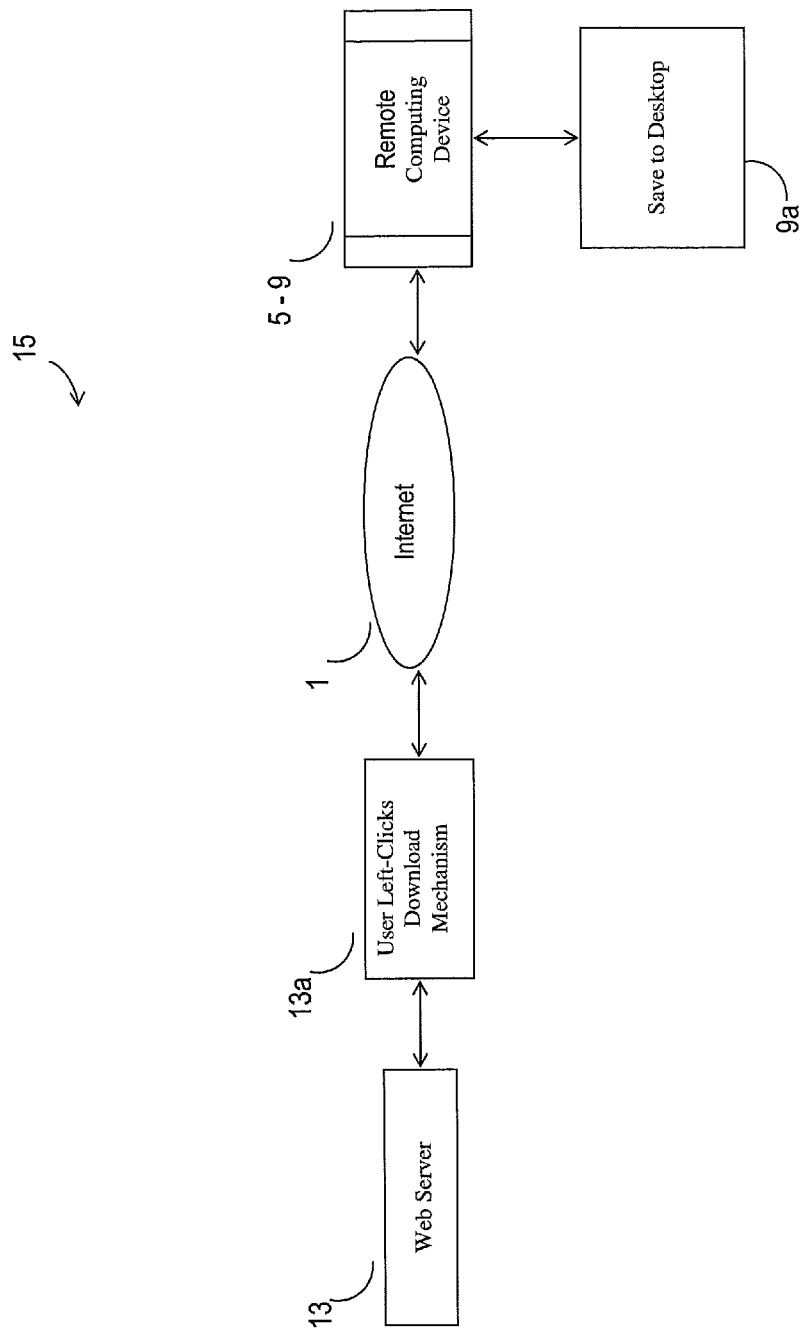
FIG. 3 is a procedural flow chart illustrating a manner in which software is downloaded.

The manner in which the software architecture may be downloaded is illustrated in FIG. 3. Specifically, a user may access a system Web page using a Web browser on an end user system 5-9 (FIG. 1) at step 13. The web page may reside on central application server 2 and the user may left-click on a hyperlinked text, graphical or media object to initiate the download of system 15 as an executable file from the central application server 2 (FIG. 1). Once a download is initiated, the user may have the option to save Rich Client User Interface (RCUI) Application 10 (FIG. 2) to their desktop 9a as an icon residing on the remote computing device 5-9 (FIG. 1).

Figure 4:
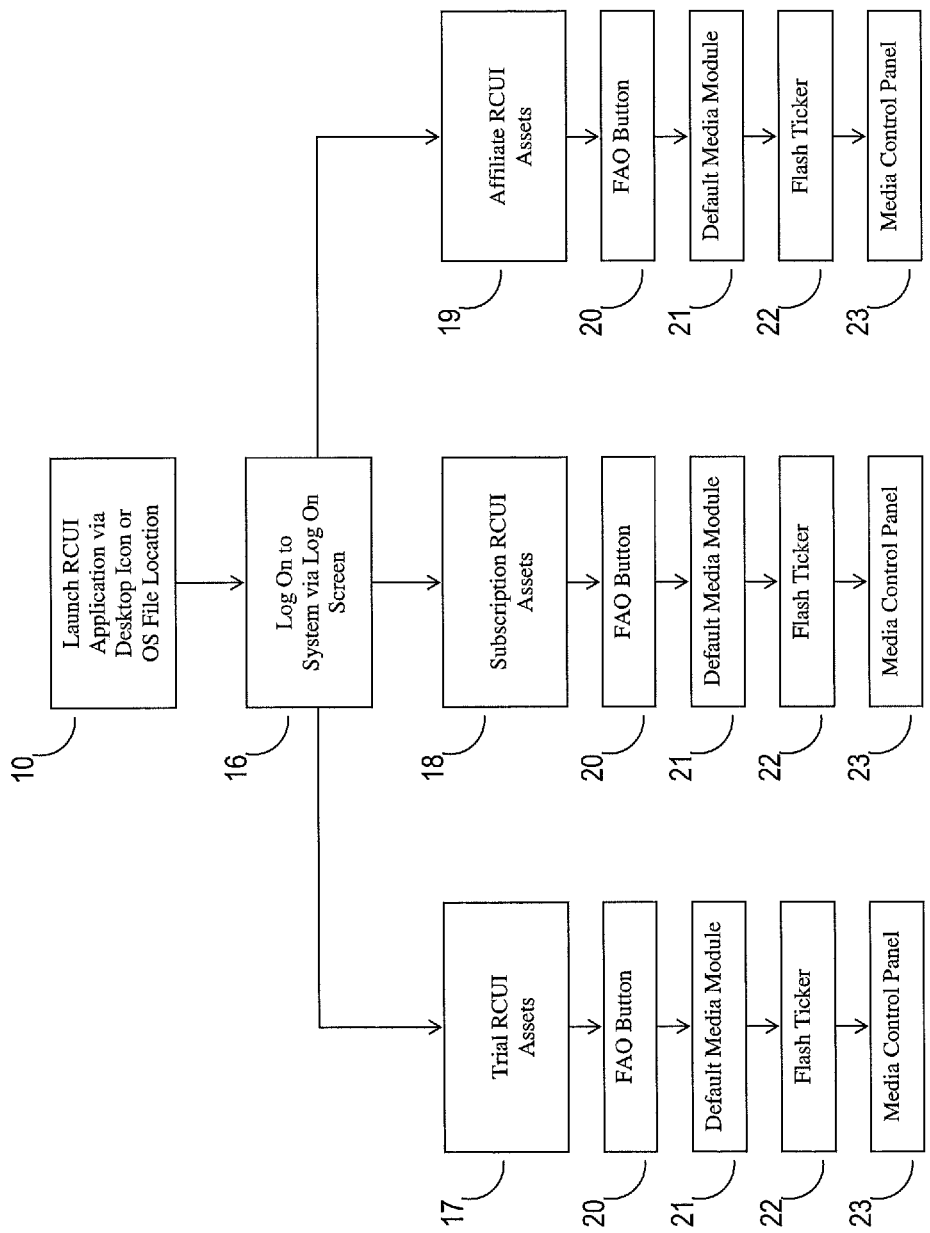
FIG. 4 is a block diagram of software architecture pertaining to system launch, log on, module defaults, and loading of virtual assets.

An exemplary implementation of system 15 is illustrated in FIG 4. After launching the Rich Client User Interface Application (RCUI) 10 (FIG. 2), the user may log onto system 15 via graphical user screen 16. Upon successful authentication, virtual assets may be loaded and may comprise an RCUI application trial version 17, an RCUI subscription application version 18, or an RCUI application affiliate version 19 of the Rich Client User Interface (RCUI) Application 10 (FIG. 2). Virtual assets for each RCUI application version may include, but are not limited to, frequently asked questions (FAQ) button 20, default media module 21, flash ticker 22, and media control panel 23.

In particular, virtual assets may reside within web Server 13 (FIG. 2), may interact with virtual file repository 14 (FIG. 2), and may be tightly integrated and changeable to serve as the user interface.

Figure 5:
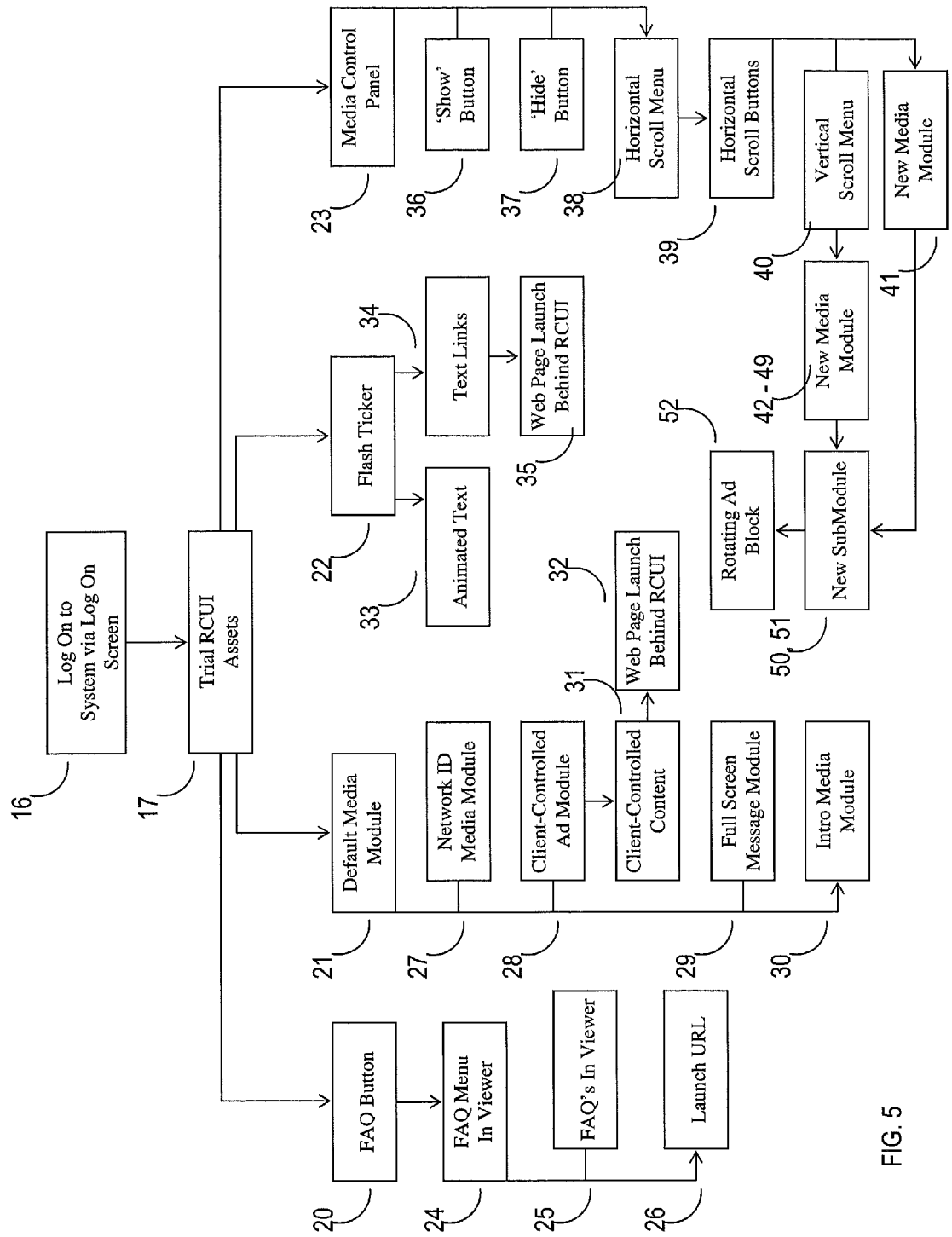
FIG. 5 is a block diagram of software architecture pertaining to log on, module defaults, and loading of virtual assets according to a trial version.

The manner in which log on, module default, and simultaneous loading of modules 21, 27, 28, 29, 30 and virtual assets into the RCUI trial version interface 17 (FIG. 4) is illustrated in FIG. 5. Left-clicking on the frequently asked questions (FAQ) button 20 may enable the user to view an interactive FAQ menu 24. When the user makes a selection from the FAQ menu, FAQ information 25 may replace FAQ menu 24, or a web page 26 may be launched behind Rich Client User Interface (RCUI) Application 10 displaying the appropriate information.

Specifically, the default media module 21 may automatically load and sequentially display media content or the network ID media module 27, followed by the client-controlled ad module 28, the full screen message module 29, and/or the intro media module 30. The network ID module 27 may replace the default media module 21 content with a short flash movie or graphic display confirming the user's selection from the horizontal scrolling menu 38.

The client-controlled ad module 28 may replace the default media module 21 or network ID module 27 after a predetermined time interval. The client-controlled ad module 28 may consist of an HTML window that may point to media content residing on an advertiser's web server. The media content may consist of flash, video, audio, text or graphical content and may contain embedded hyperlinks. When selected, hyperlinked content may launch web page 32 behind Rich Client User Interface (RCUI) Application 10 (FIG. 2) displaying the appropriate information.

The full screen message module 29 may replace the client-controlled ad module 28 after a predetermined time interval. The full screen message module 29 may be a graphical display that provides the user with full screen video viewing instructions and how to exit full screen mode and return to the previous viewing state.

The intro media module 30 may be the last stage of the sequential module displays and may consist of a flash or media video host introducing the category content the user selected from the horizontal scrolling menu 38.

The flash ticker 22 may automatically display below default media module 21 and may consist of animated text 33 or hyper-linkable text 34 pertaining to sequential text information display that may appears in either a vertical or horizontal scrolling manner. If portions of text information are hyper-linked, the user may select the link and new content may be displayed either in default media module 21, or as a web page 35 launched behind Rich Client User Interface (RCUI) Application 10 (FIG. 2) displaying the appropriate information.

The media control panel 23 may be an HTML file or flash application that automatically displays below flash ticker 22 and may consist of a show button 36, hide button 37, horizontal scrolling menu 38, horizontal scroll buttons 39, and vertical scrolling menu 40. The horizontal scrolling menu 38 may reveal horizontal scroll buttons 39 when the user clicks show button 36. Conversely, the horizontal scrolling menu 38 may conceal the horizontal scroll buttons 39 when the user clicks hide button 37. By a user actuating a horizontal scroll button 39, a new media module 42-49 may replace the default media module 21, while simultaneously launching vertical scrolling menu 40. Nested within media module 42-49 may be submodules 50-51, in which may nest rotating ad block 52. By clicking on a button within vertical scrolling menu 40, the user may be able to view new submodules 50-51 and rotating ad block 52 content in media module 42-49. This process may repeat itself each time the user clicks on a button within scrolling menu 40.

Figure 6:
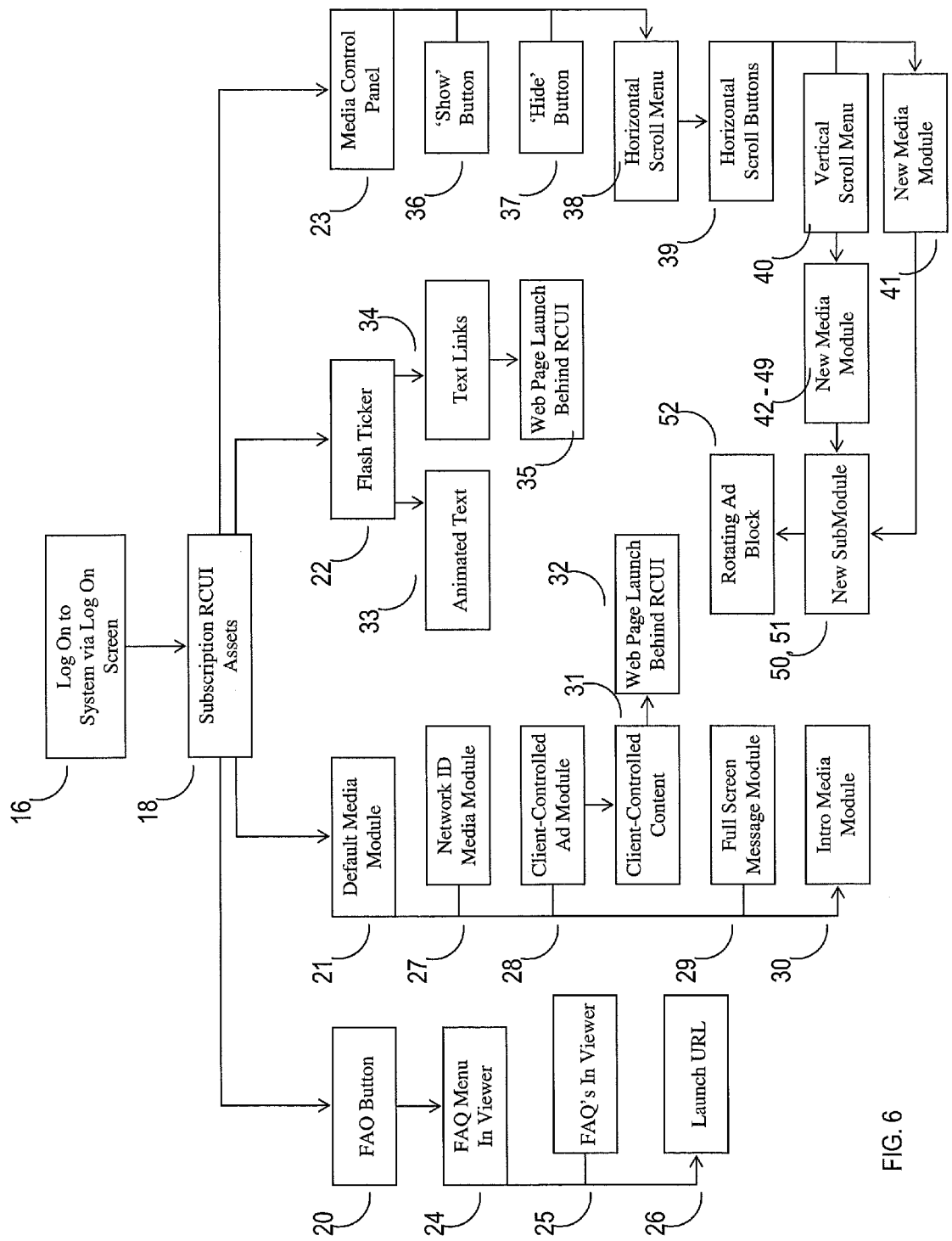
FIG. 6 is a block diagram of software architecture pertaining to log on, module defaults, and loading of virtual assets according to a subscription version.

The manner in which log on, module default, and simultaneous loading of modules 21, 27, 28, 29, 30 and virtual assets into the Rich Client User Interface (RCUI) Application 10 (FIG. 2) subscription version interface 18 (FIG. 4) is illustrated in FIG. 6 and identical to the explanation above for RCUI subscription version interface 17.

Figure 7:
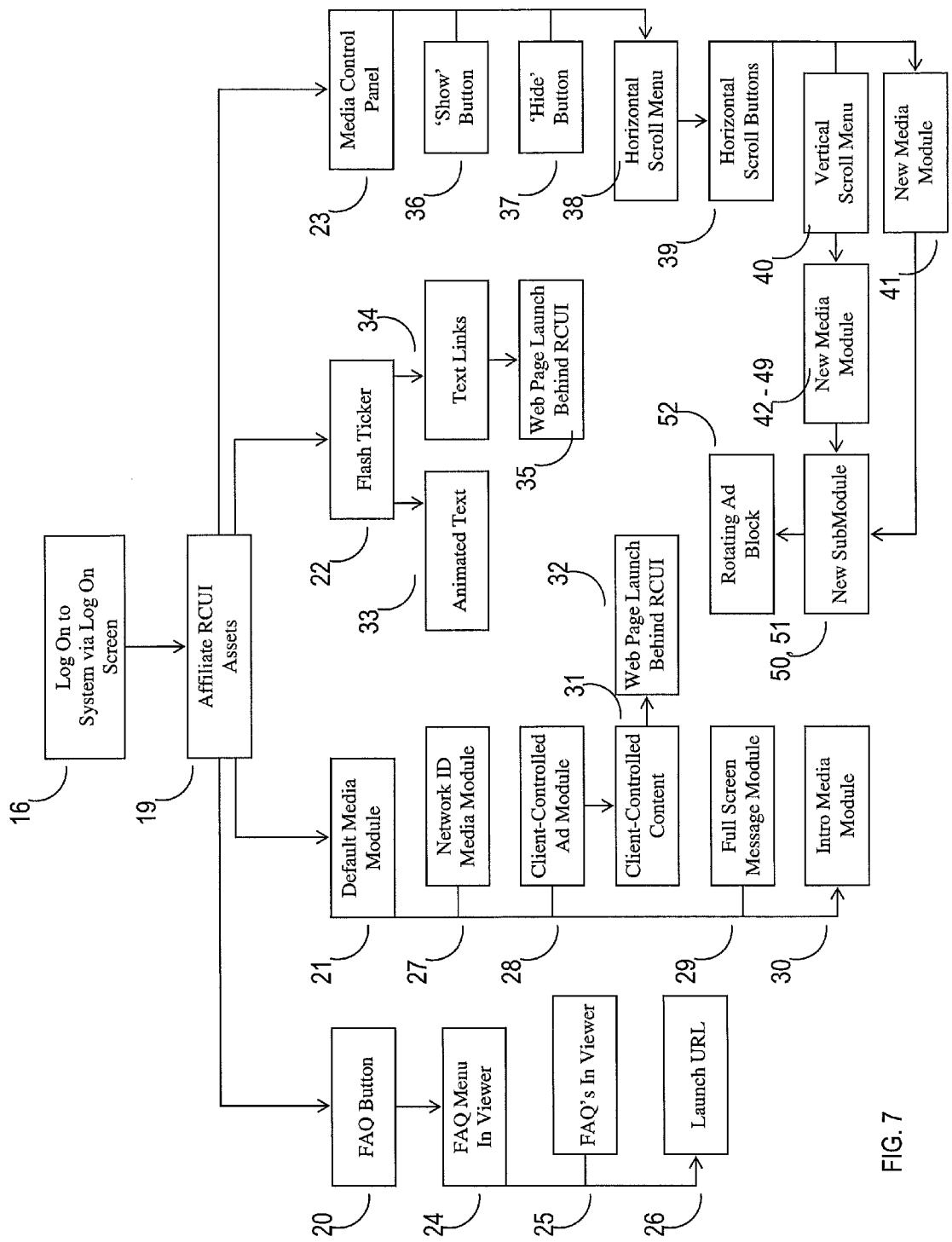
FIG. 7 is a block diagram of software architecture pertaining to log on, launching of module defaults, and loading of virtual assets according to an affiliate version.

The manner in which log on, module default, and simultaneous loading of modules 21, 27, 28, 29, 30 and virtual assets into the Rich Client User Interface (RCUI) Application 10 (FIG. 2) affiliate version interface 19 (FIG. 4) is illustrated in FIG. 7 and identical to the explanation above for RCUI subscription version interface 17.

Figure 8:
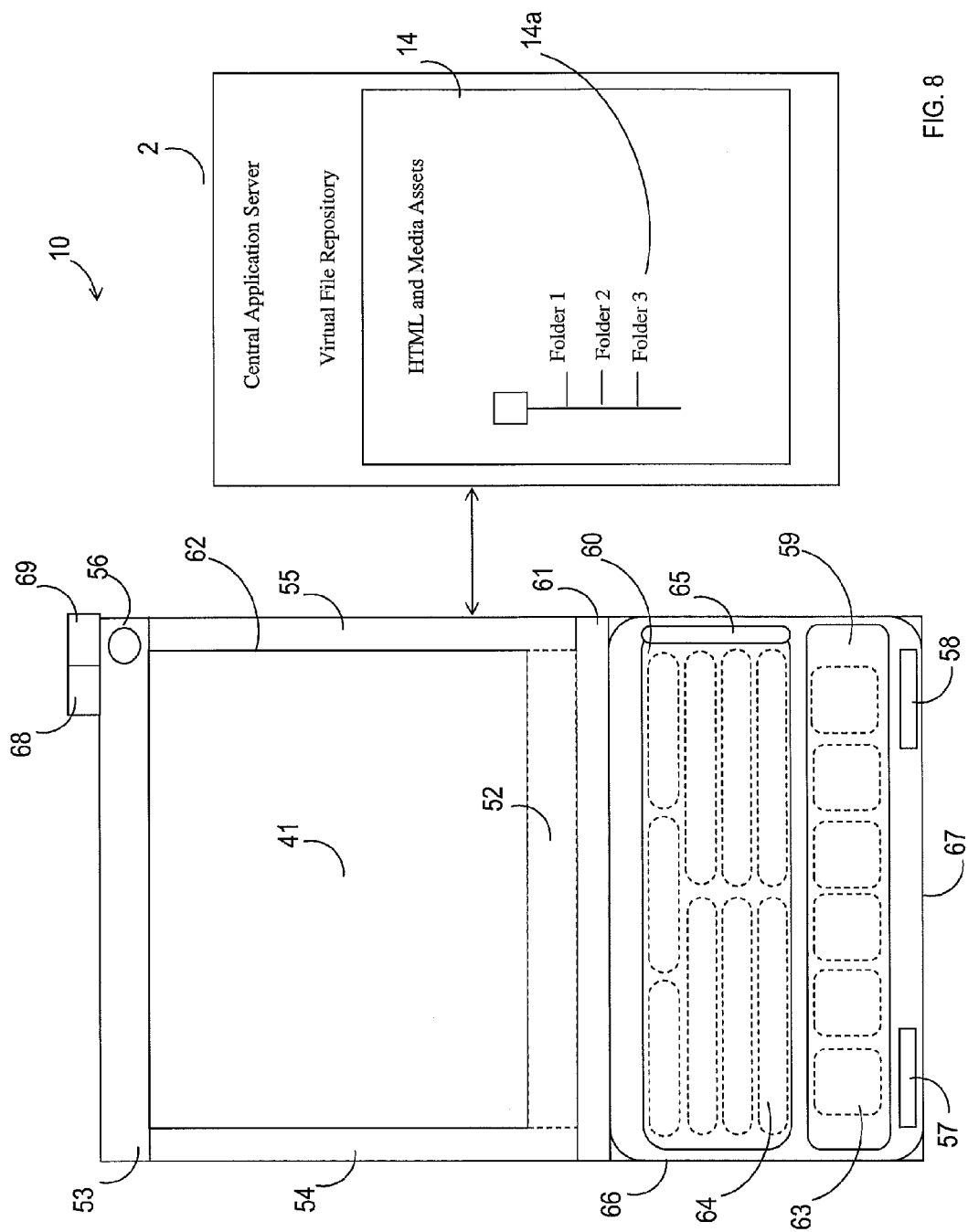
FIG. 8 is a schematic illustration of exemplary server storage folders in the form of a file list for virtual assets within a virtual asset management system.

An exemplary graphical user interface and server storage screen in the form of a hierarchical tree structure folder file list 14a for HTML and virtual assets within the virtual asset management system 14 is illustrated in FIG. 8. Specifically, the virtual assets for Rich Client User Interface (RCUI) Application 10 (FIG. 2) may be encapsulated in a window container 67. User selection of the minimize button 68 may cause the Rich Client User Interface (RCUI) Application to contract into the toolbar on the user's desktop. User selection of the close button 69 may cause the Rich Client User Interface Application (RCUI) to terminate.

In launch mode, the Rich Client User Interface (RCUI) Application may consist of a media control panel 66, a flash ticker 61, and a viewer 62 enclosed at the top, left and right sides by graphical skin components 53, 54, and 55, respectively. Simultaneously, HTML and media content 14 residing on central application server 2 may also be called from hierarchical tree structure folder file list 14a, and displayed in the hyperlinked client-controlled rotating ad block 52, which may be embedded inside media module 41, both of which may be embedded inside viewer 62. Further, all virtual assets of the Rich Client User Interface (RCUI) Application may be scripted in any programming language (e.g. HTML, XML, javascript, or flash, etc.), and organized in any combination, shape or configuration to achieve a desired graphical user interface result.

The media control panel 66 may consist of a show button 57, a hide button 58, a horizontal scrolling menu window 59, auto or manual horizontal scroll buttons 63, a vertical scrolling menu window 60, rows of vertical scrolling buttons 64, and a vertical scroll bar 65. When the user clicks on show button 57 a procedural call may be actuated to central application server 2, thereby opening the horizontal scrolling menu window 59 in media control panel 66 and revealing horizontal scroll button 63 options. Simultaneously, HTML and media content 14 residing on central application server 2 may also be called from hierarchical tree structure folder file list 14a, and displayed in the hyperlinked client-controlled rotating ad block 52, which may be embedded inside media module 41, of which both may be embedded as a single module inside viewer 62.

When the user selects a horizontal scroll button 63, a procedural call may be actuated to central application server 2 and thereby the vertical scrolling menu window 60 in media control panel 66 may be opened and rows of vertical scroll button 64 options of which viewing and selection are controlled by vertical scroll bar 65 may be revealed. Simultaneously, HTML and media content 14 residing on central application server 2 may also be called from hierarchical tree structure folder file list 14a, and may replace previous media module 41 content as well as the hyperlinked client controlled rotating ad block 52, of which both may be embedded as a single module inside viewer 62.

The flash ticker 61 may be constant, may be automatically displayed below media module 41, and may consist of a sequential text information display that may appear in either a vertical or horizontal scrolling manner. If portions of text information are hyper-linked, the user may select the link and new content may be displayed either in default media module 41, or as a web page 35 (FIG. 5) launched behind Rich Client User Interface (RCUI) Application 10 (FIG. 2) displaying the appropriate information.

FAQ button 56 may be hyperlinked and located on graphical skin component 53. Left-clicking on the frequently asked questions (FAQ) button 56 may enable the user to view interactive FAQ menu 24 (FIG. 5, 6, 7). When the user makes a selection from the FAQ menu, FAQ information 25 (FIG. 5, 6, 7 may replace FAQ menu 24, or a web page 26 (FIG. 5, 6, 7) may be launched behind Rich Client User Interface (RCUI) Application 10 (FIG. 2) displaying the appropriate information.

Figure 9:
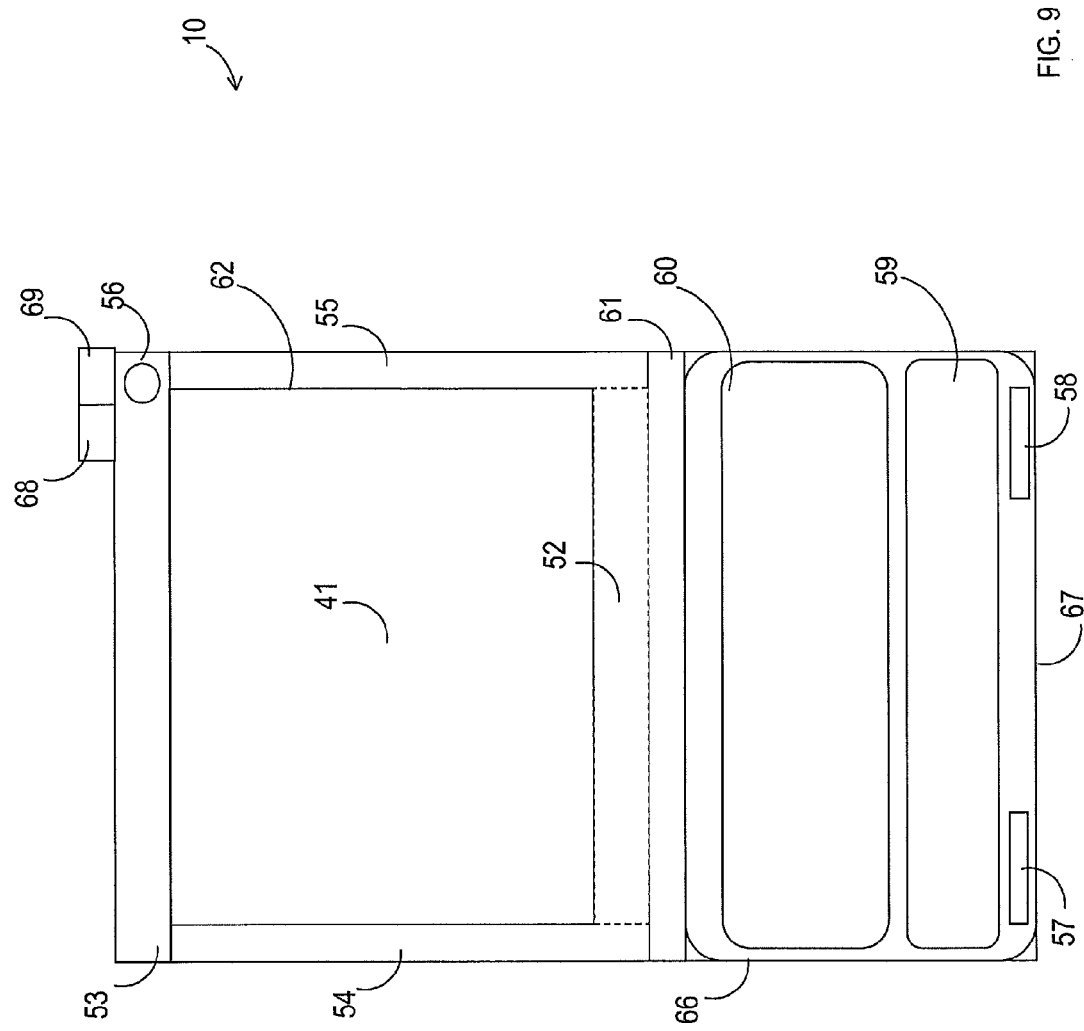

An exemplary graphical user screen displaying virtual assets of the Rich Client User Interface (RCUI) Application (RCUI) 10 (FIG. 2) after log on is illustrated in FIG. 9. Particularly, minimize button 68, close button 69, window container 67 encapsulating media control panel 66, show button 57, hide button 58, horizontal scrolling menu window 59, flash ticker 61, media module 41 content as well as the hyperlinked client controlled rotating ad block 52, of which both may be embedded as a single module inside viewer 62, graphical skin components 53, 54, and 55, and FAQ button 56 may be displayed. Functionality and inter-relationship of all virtual assets is described above as they pertain to FIG. 8.

Figure 10:
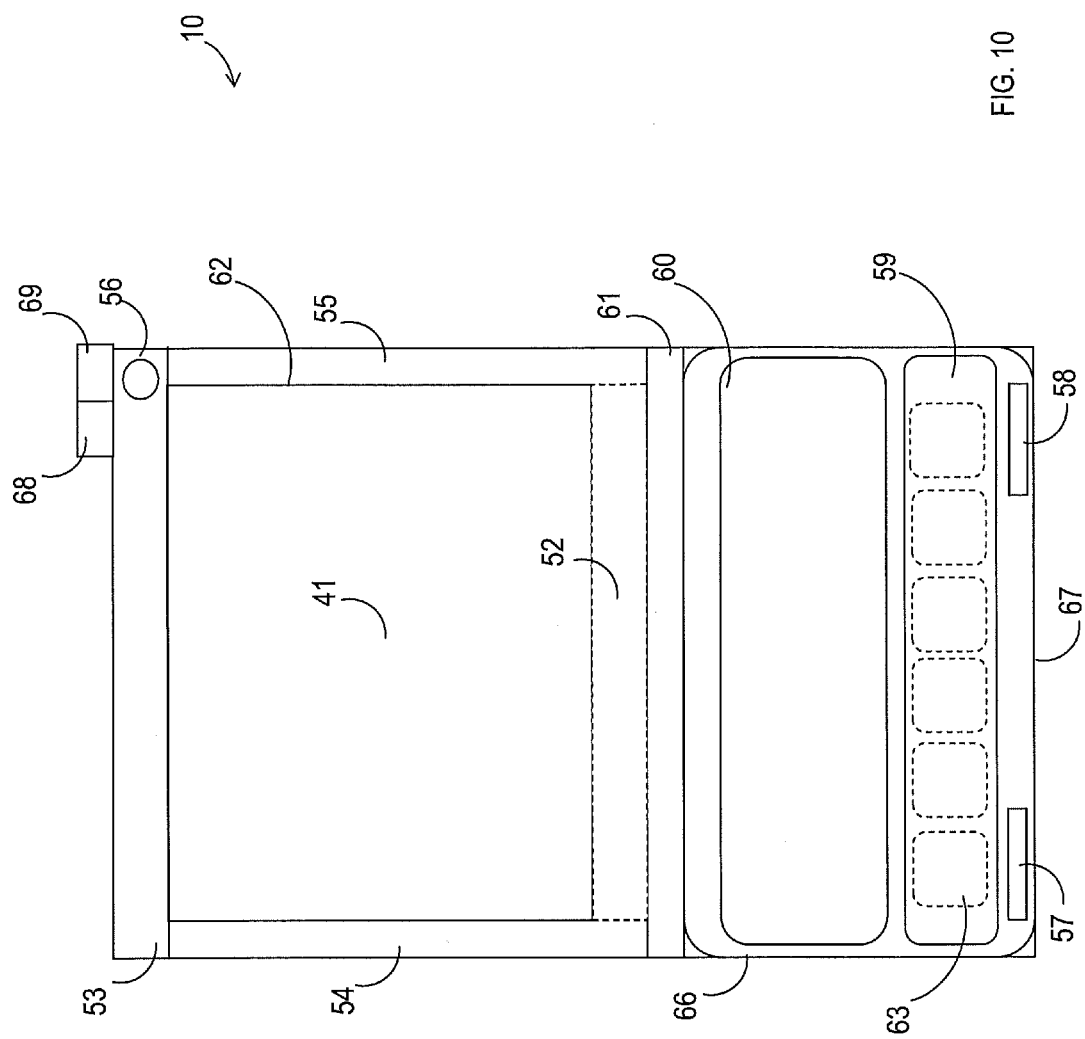
FIG. 10 is a schematic illustration of an exemplary graphical user screen displaying a horizontal scrolling menu after a media control panel button selection.

An exemplary graphical user screen displaying virtual assets of the Rich Client User Interface (RCUI) Application 10 (FIG. 2) after user selects show button 57, is illustrated in FIG. 10. Specifically, the viewability of the horizontal scroll button 63 options resulting from a procedural call actuated by user selection of show button 57, is shown in addition to all previous virtual assets described above as they relate to FIG. 9.

Figure 11:
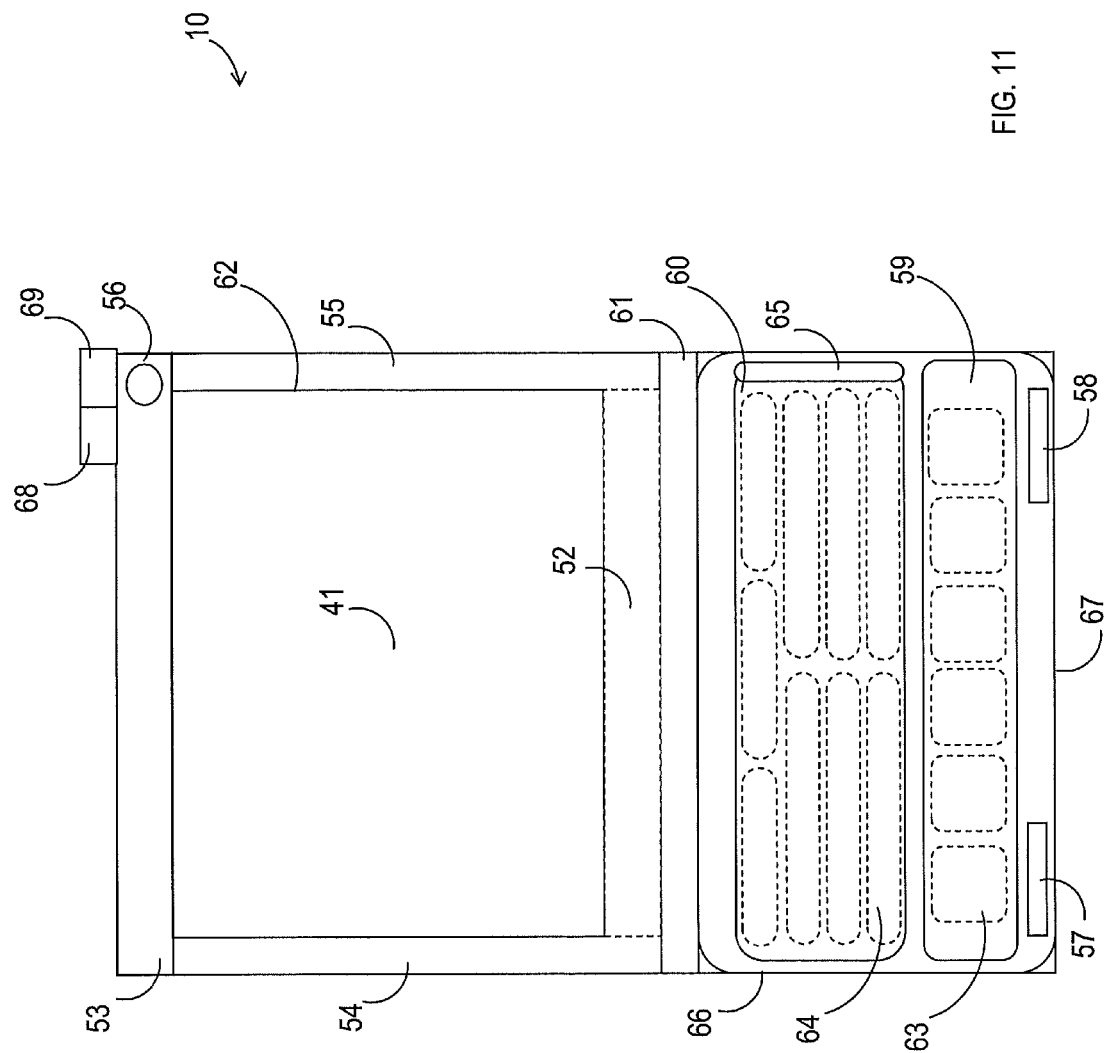
FIG. 11 is a schematic illustration of an exemplary graphical user screen displaying a vertical scrolling menu after a horizontal scrolling button selection.

An exemplary graphical user screen displaying virtual assets of the Rich Client User Interface (RCUI) Application 10 (FIG. 2) after a user selects horizontal scroll button 63 options is illustrated in FIG. 11. Specifically, the viewability of the vertical scroll button 64 options resulting from a procedural call actuated by user selection of a horizontal scroll button 63 option is shown. Further, media module 41 content as well as the hyperlinked client controlled rotating ad block 52 may launch as a single, embedded module inside viewer 62, in addition to all previous virtual assets described above as they relate to FIG. 10.

Figure 12:
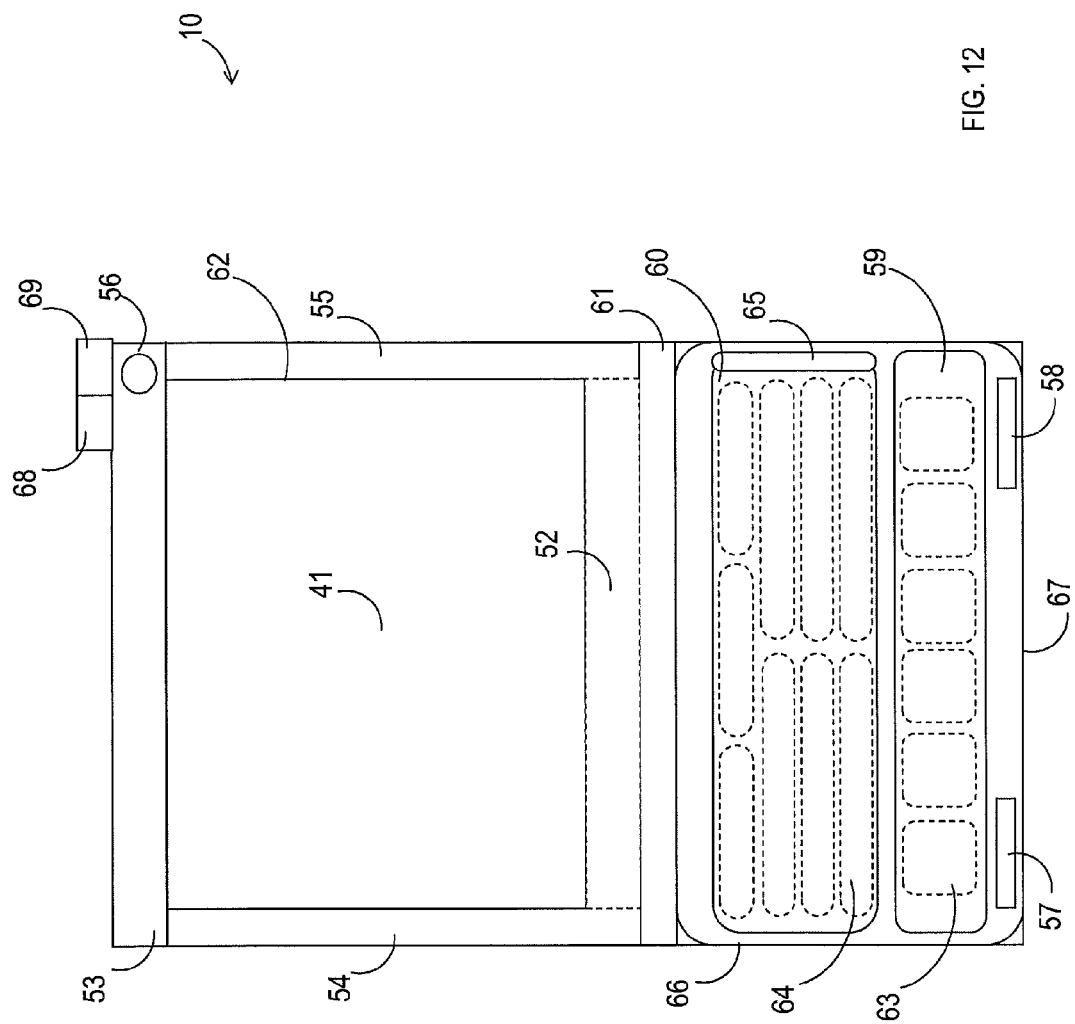
FIG. 12 is a schematic illustration of an exemplary graphical user screen displaying a media module after a vertical scrolling button selection.

An exemplary graphical user screen displaying virtual assets of the Rich Client User Interface (RCUI) Application 10 (FIG. 2) after a user selects vertical scroll button 64 options is illustrated in FIG. 12. Specifically, the replacement of media module 41 content as well as the hyperlinked client controlled rotating ad block 52, of which both may be embedded as a single module inside viewer 62, and resulting from a procedural call actuated by user selection of a vertical scroll button 64 option, is shown in addition to all previous virtual assets described above as they relate to FIG. 11.

Figure 13:
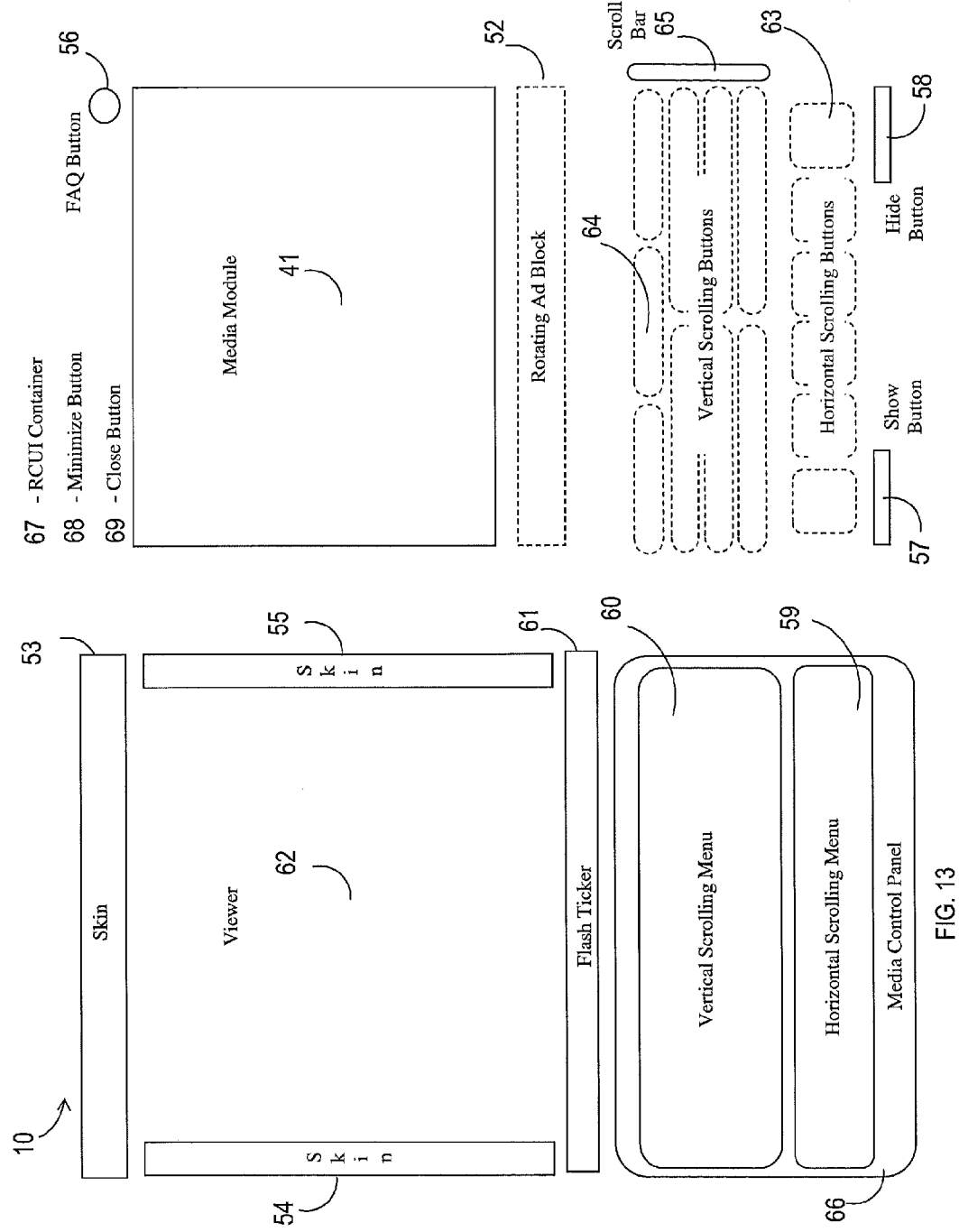
FIG. 13 is a diagrammatic illustration of an exemplary graphical user screen displaying virtual assets as separate components.

An exemplary graphical user screen displaying virtual assets as separate components of the Rich Client User Interface (RCUI) Application 10 (FIG. 2) is illustrated in FIG. 13. Particularly, minimize button 68, close button 69, window container 67 encapsulating media control panel 66, show button 57, hide button 58, horizontal scrolling menu window 59, horizontal scroll button 63 options, vertical scrolling menu window 60, vertical scroll button 64 options, vertical scroll bar 65, flash ticker 61, media module 41 content as well as the hyperlinked client controlled rotating ad block 52, of which both may be embedded as a single module inside viewer 62, graphical skin components 53, 54, and 55, and FAQ button 56 are shown. Functionality and inter-relationship of all virtual assets is described above as they pertain to FIG. 8.

Figure 14:
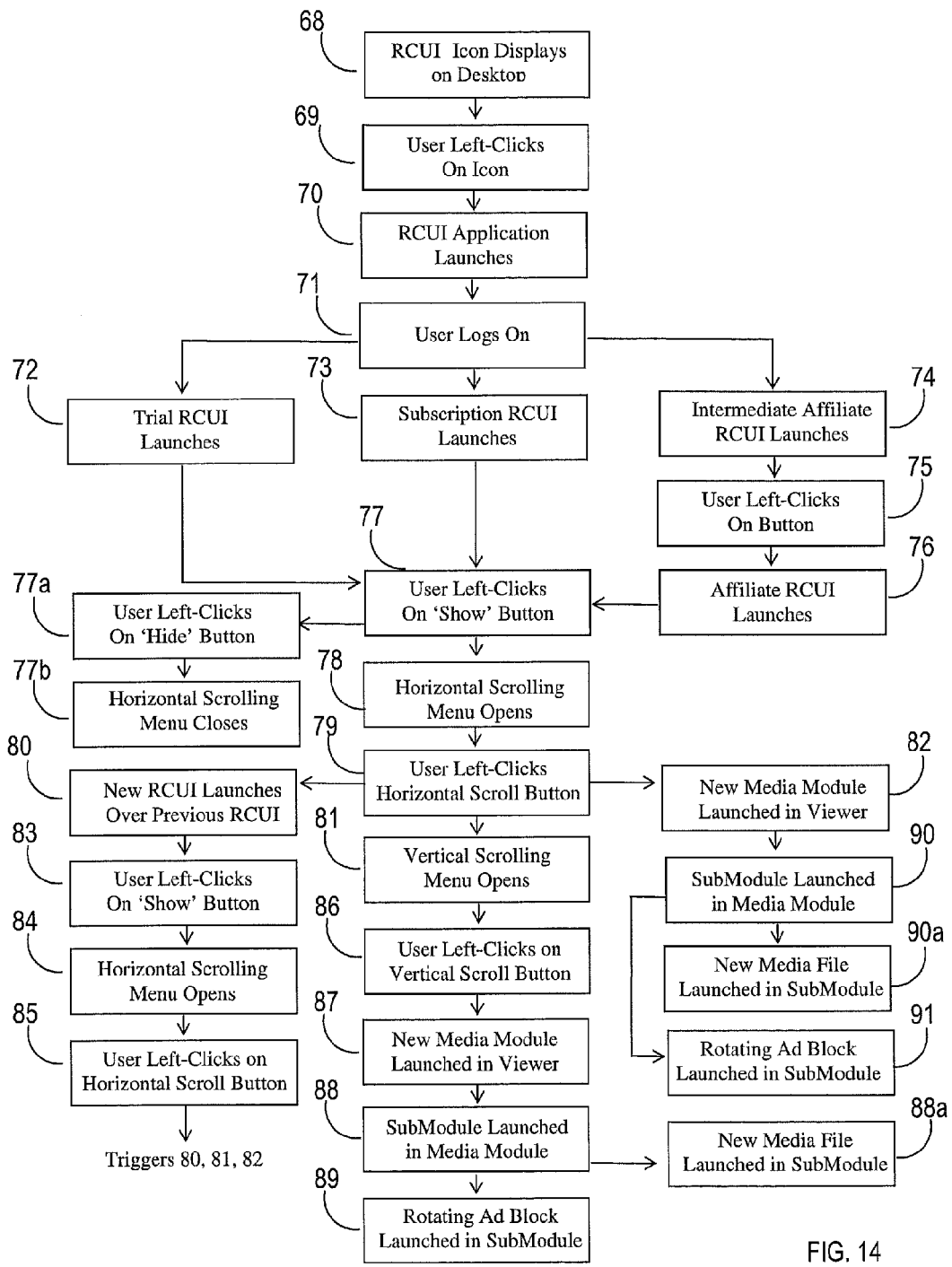
FIG. 14 is a procedural flow chart illustrating a manner in which a virtual asset management system may enable log on, launching of module defaults, and loading of virtual assets for viewing and selection of media assets.

The manner in which the virtual asset management system enables log on, launching of module defaults, and loading of virtual assets for viewing and selection of media assets is illustrated in FIG. 14. Particularly, the user may left-click 69 icon 68 on the Rich Client User Interface (RCUI) Application 10 (FIG. 2) located on the user's desktop which may launch the Rich Client User Interface Application 70. Upon successful authentication, virtual assets may be loaded as they pertain to FIG. 8 described above all of which may comprise either a Rich Client User Interface (RCUI) Application trial version 72, a Rich Client User Interface (RCUI) Application subscription version 73, or a Rich Client User Interface (RCUI) Application affiliate version 74, of the Rich Client User Interface (RCUI) Application 10 (FIG. 2).

In all cases, HTML and media content residing on central application server 2 (FIG. 8) may also be called and displayed in the hyperlinked client-controlled rotating ad block 52 (FIG. 13), which may be embedded inside media module 41 (FIG. 13), of which both are embedded as a single module inside viewer 62 (FIG. 13).

With regard to Rich Client User Interface (RCUI) application trial version 72, the user may left-click on show button 77, a procedural call may be actuated to central application server 2 (FIG. 8), and the horizontal scrolling menu window 78 may be opened and horizontal scroll buttons 63 (FIG. 13) contained within media control panel 66 (FIG. 13) may be revealed. Conversely, if the user left-clicks on hide button 77a, a procedural call may be actuated to central application server 2 (FIG. 8), and the horizontal scrolling menu window 78 may be closed and horizontal scroll buttons 63 (FIG. 13) contained within media control panel 66 (FIG. 13) may be concealed.

Depending on the user selection of horizontal scroll buttons 63 (FIG. 13), a procedural call may be actuated to central application server 2 (FIG. 8), thereby opening the vertical scrolling menu window 81 in media control panel 66 (FIG. 13), revealing rows of vertical scroll button 64 (FIG. 13), options of which viewing and selection may be controlled by vertical scroll bar 65 (FIG. 13), while at the same time, a new media module may be launched inside the viewer 82 and may replace the previous media module 41 (FIG. 13). This new media module may also contain a new submodule 90 that may display a new media file 90a, as well as a new rotating ad block 91.

When the user selects vertical scroll button 86, a new media module may be launched inside the viewer 87 and may replace the previous media module 41 (FIG. 13). This new media module may also contain a new submodule 88 that may display a new media file 88a, as well as a new rotating ad block 89.

Alternatively, in the event the user selects a designated horizontal scroll button 79, a new Rich Client User Interface (RCUI) 80 may replace the graphical user interface with a new set of virtual assets that may include those described in FIG. 13, and that may follow the same process as those described in steps 77-90a above.

In regards to Rich Client User Interface (RCUI) application subscription version 73, all virtual asset configuration, shape, and combination options, and procedural flow may be identical to those pertaining to Rich Client User Interface (RCUI) application trial version 72 described above.

In regards to Rich Client User Interface (RCUI) application subscription version 76, all virtual asset options and procedural flow may be identical to those pertaining to Rich Client User Interface (RCUI) application subscription version 73 described above with the exception that after user log on 71 an intermediate affiliate graphical user interface 74 may launch and may contain any combination, shape or configuration of virtual assets previously described in Rich Client User Interface (RCUI) application subscription version 73, to include a hyperlinked button 75 that a user may select to launch Rich Client User Interface (RCUI) application affiliate version 76.

Figure 15:
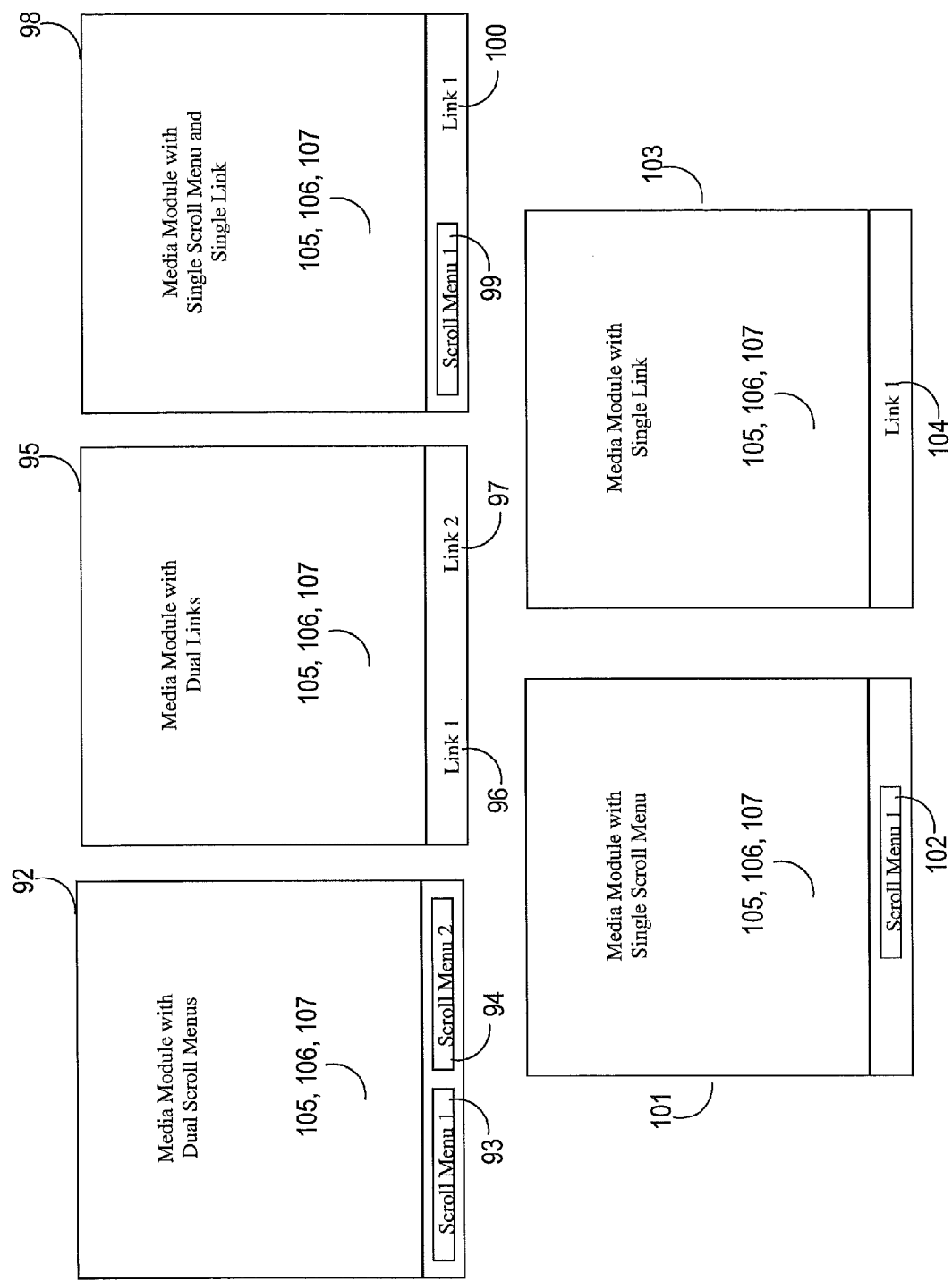
FIG. 15 is a schematic illustration of media module views for displaying submodules and methods of selection.

Media module views for displaying submodules and methods of selection are illustrated in FIG. 15. Specifically, when the user selects a horizontal scroll button 79 (FIG. 14), a new media module 92 may replace the previous media module in viewer 62 (FIG. 13) and may contain either submodule 105, submodule 106, or submodule 107 (FIG. 26), within which media content 90a (FIG. 14) and/or rotating ad block 91 (FIG. 14) may be displayed.

Submodule selection and display as they relate to media module 92, media module 95, media module 98, media module 101, and media module 103 may be controlled by a combination of either one (1) or two (2) scroll menus and/or hyperlinks tightly integrated directly below the media module window. Upon user selection of a scrolling menu item or link, new media content may be displayed in the media module window, or a web page URL may be launched behind the Rich Client User Interface (RCUI) Application 10 (FIG. 2).

In particular, media module 92 may contain scroll menu1 93 and scroll menu2 94. Media module 95 may contain link1 96 and link2 97. Media module 98 may contain scroll menu1 99 and link1 100. Media module 101 may contain scroll menu1 102. Media module 103 may contain link1 104.

Figure 16:
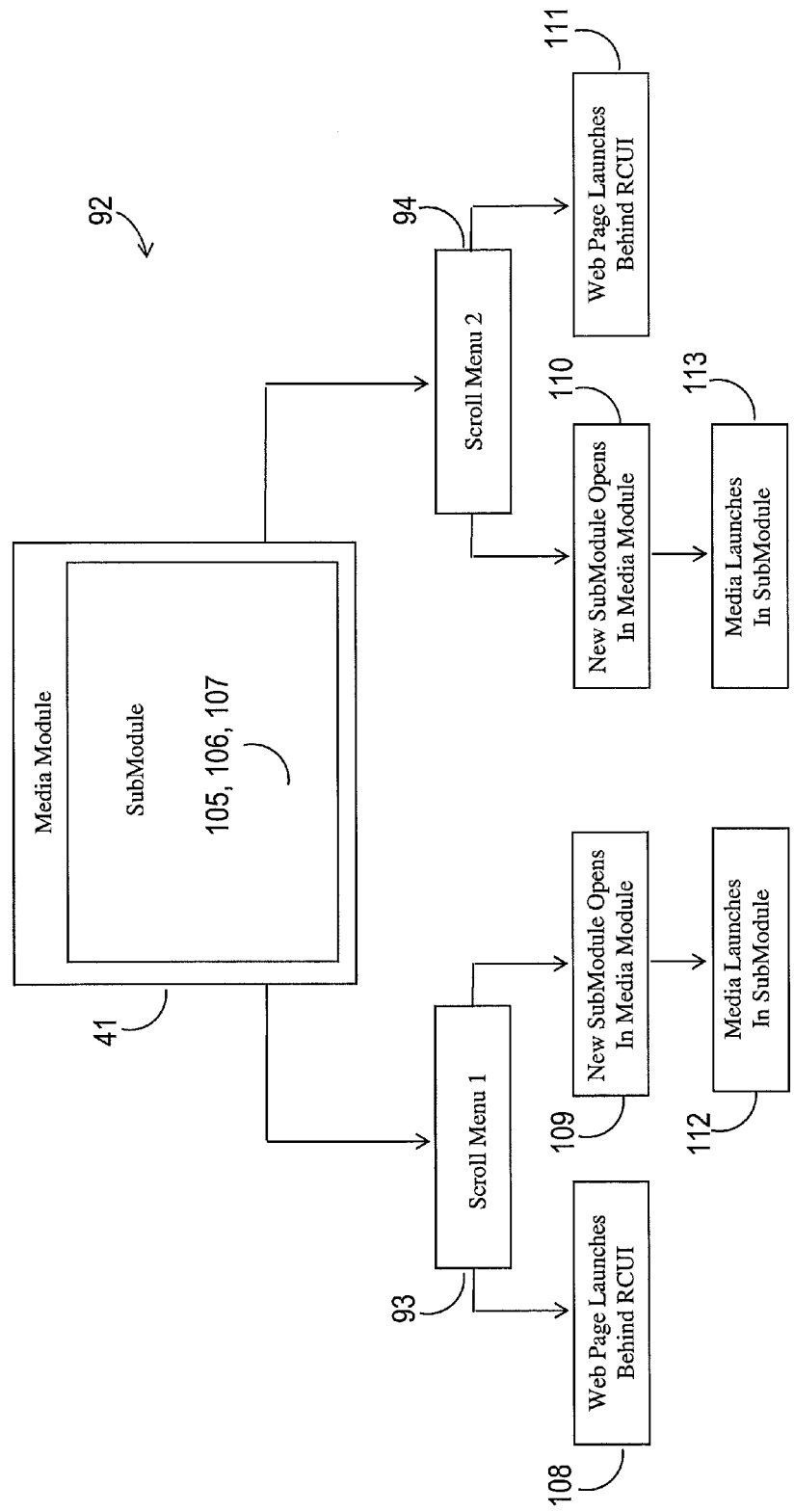
FIG. 16 is a block diagram illustrating a manner in which software architecture may enable display of submodules using dual scrolling menu methods of selection.
Figure 26:
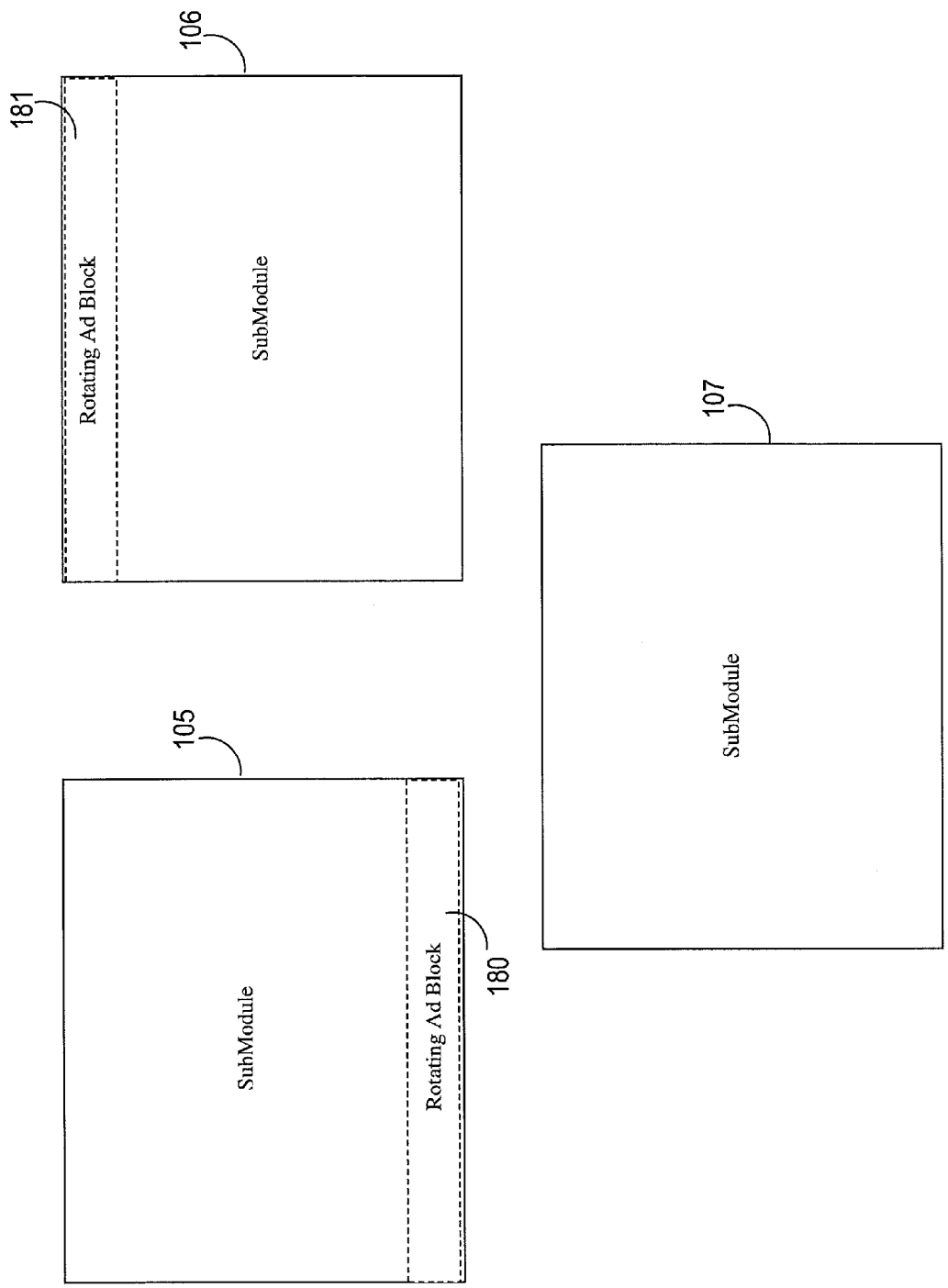
FIG. 26 is a schematic illustration of submodule views for displaying media files and upper/lower rotating media files that may launch a web page when selected.

The manner in which the software architecture may enable display of submodules using dual scrolling menu methods of selection is illustrated in FIG. 16. Assuming the user has selected a horizontal scroll button 79 (FIG. 14), a new media module 41 may replace the previous media module in viewer 62 (FIG. 13) displaying media content in submodule 105, 106, or 107 (FIG. 26).

Hyperlinked menu items may be accessible from either scroll menu1 93 or scroll menu2 94. Selecting a hyperlinked item from scroll menu1 93 may launch a web page URL 108 display behind the Rich Client User Interface (RCUI) Application 10 (FIG. 2), or a new media submodule 109 displaying new media content 112 that may replace previous submodule 105, 106, or 107 (FIG. 26) and its media content display.

Similarly, selecting a hyperlinked item from scroll menu2 94 may launch a web page URL 111 display behind the Rich Client User Interface (RCUI) Application 10 (FIG. 2), or a new media submodule 110 displaying new media content 113 that may replace previous submodule 105, 106, or 107 (FIG. 26) and its media content display.

Figure 17:
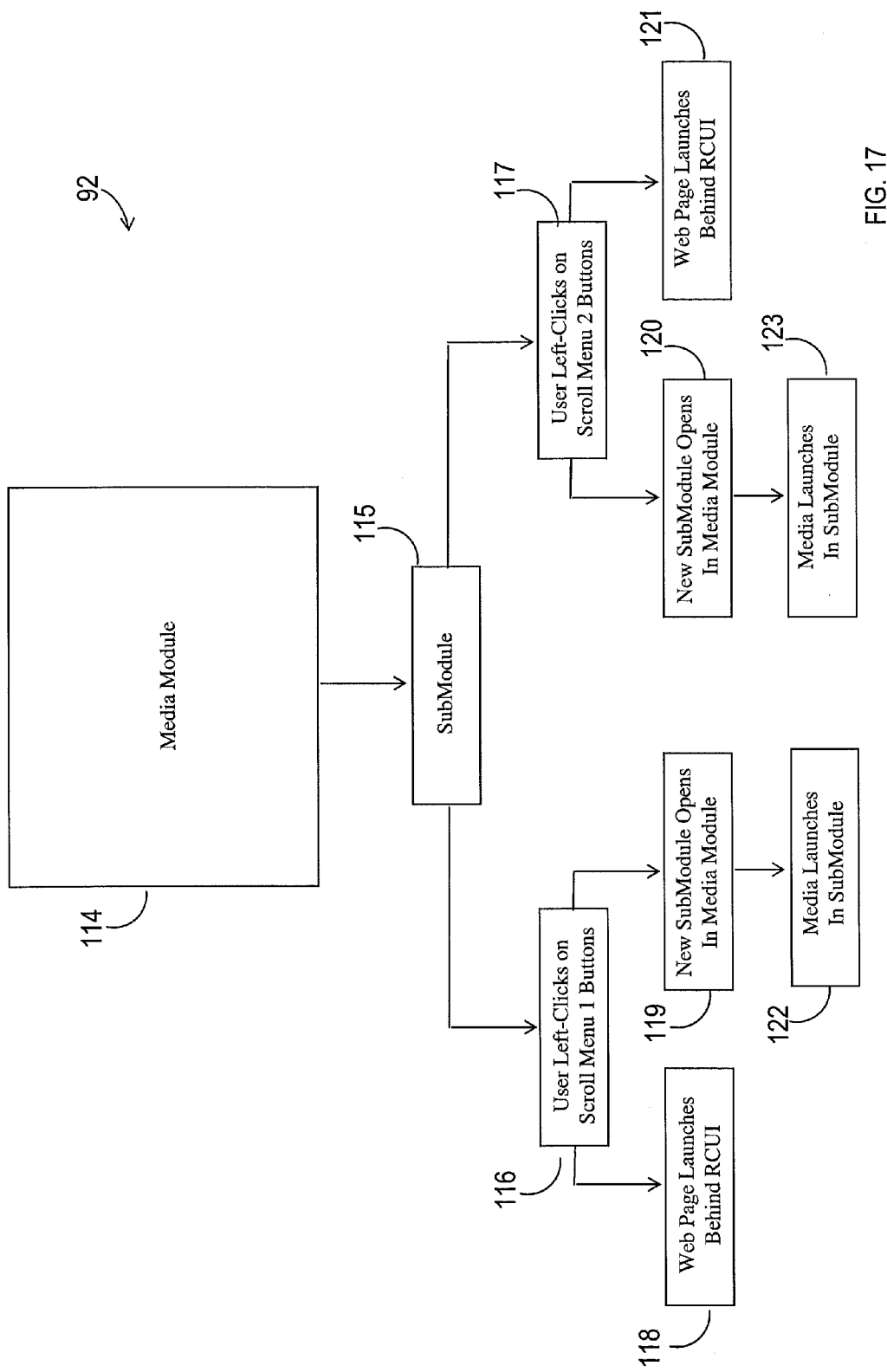
FIG. 17 is a procedural flow chart illustrating a manner in which software architecture may enable display of submodules using dual scrolling menu methods.

The procedural flow in which the software architecture may enable display of submodules using dual scrolling menu methods of selection is illustrated in FIG. 17. Assuming the user has selected a horizontal scroll button 79 (FIG. 14), a new media module 41 (FIG. 13) may replace the previous media module in viewer 62 (FIG. 13) displaying media content in submodule 105, 106, or 107 (FIG. 26).

Hyperlinked menu items may be accessible from either scroll menu1 116 or scroll menu2 117. Selecting a hyperlinked item from scroll menu1 116 may launch a web page URL 118 display behind the Rich Client User Interface (RCUI) Application 10 (FIG. 2), or a new media submodule 119 and new media content 122 within media module 114 that may replace previous submodule 115 and its media content display.

Similarly, selecting a hyperlinked item from scroll menu2 117 may launch a web page URL 121 display behind the Rich Client User Interface (RCUI) Application 10 (FIG. 2), or a new media submodule 120 displaying new media content 123 that may replace previous submodule 105, 106, or 107 (FIG. 26) and its media content display.

Figure 18:
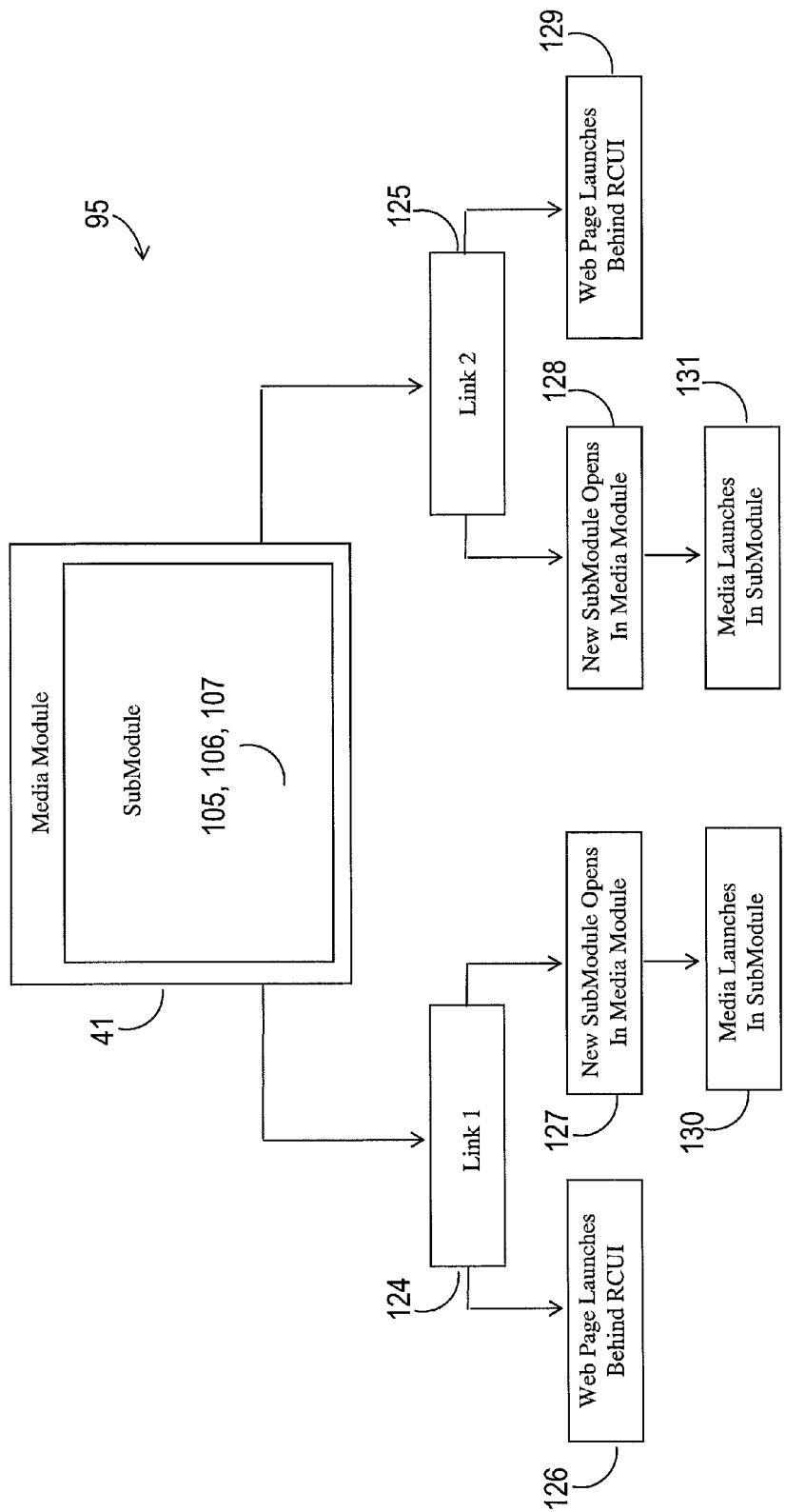
FIG. 18 is a block diagram illustrating a manner in which software architecture may enable display of submodules using dual link methods of selection.

The manner in which the software architecture may enable display of submodules using dual hyperlink methods of selection is illustrated in FIG. 18. Assuming the user has selected a horizontal scroll button 79 (FIG. 14), a new media module 41 (FIG. 13) may replace the previous media module in viewer 62 (FIG. 13) displaying media content in submodule 105, 106, or 107 (FIG. 26).

Hyperlinked menu items may be accessible from either link1 124 or link2 125. Selecting hyperlinked item link1 124 may launch a web page URL 126 display behind the Rich Client User Interface (RCUI) Application 10 (FIG. 2), or a new media submodule 127 displaying new media content 130 that may replace previous submodule 105, 106, or 107 and its media content display.

Similarly, selecting hyperlinked item link2 125 may launch a web page URL 129 display behind the Rich Client User Interface (RCUI) Application 10 (FIG. 2), or a new media submodule 128 displaying new media content 131 that may replace previous submodule 105, 106, or 107 (FIG. 26) and its media content display.

Figure 19:
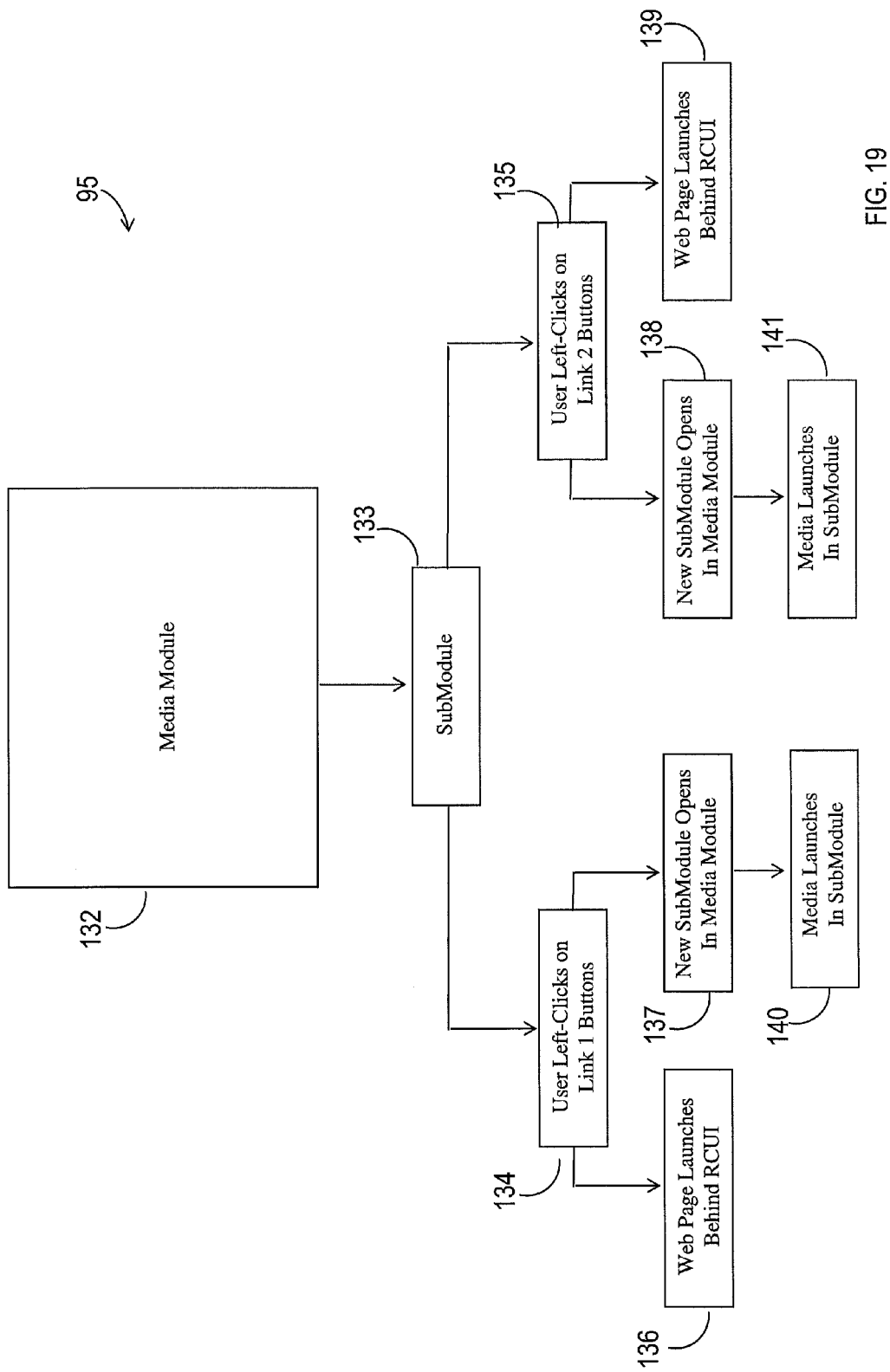
FIG. 19 is a procedural flow chart illustrating a manner in which software architecture may enable display of submodules using dual link methods of selection.

The procedural flow in which the software architecture may enable display of submodules using dual hyperlink menu methods of selection is illustrated in FIG. 19. Assuming the user has selected a horizontal scroll button 79 (FIG. 14), a new media module 41 (FIG. 13) may replace the previous media module in viewer 62 (FIG. 13) displaying media content in submodule 105, 106, or 107 (FIG. 26).

Hyperlinked menu items are accessible from either link1 134 or link2 135. Selecting a hyperlinked item from link1 134 may launch a web page URL 136 display behind the Rich Client User Interface (RCUI) Application 10 (FIG. 2), or a new media submodule 137 and new media content 140 within media module 132 that may replace previous submodule 133 and its media content display.

Similarly, selecting hyperlinked item link2 135 may launch a web page URL 139 display behind the Rich Client User Interface (RCUI) Application 10 (FIG. 2), or a new media submodule 138 displaying new media content 141 that may replace previous submodule 105, 106, or 107 (FIG. 26) and its media content display.

Figure 20:
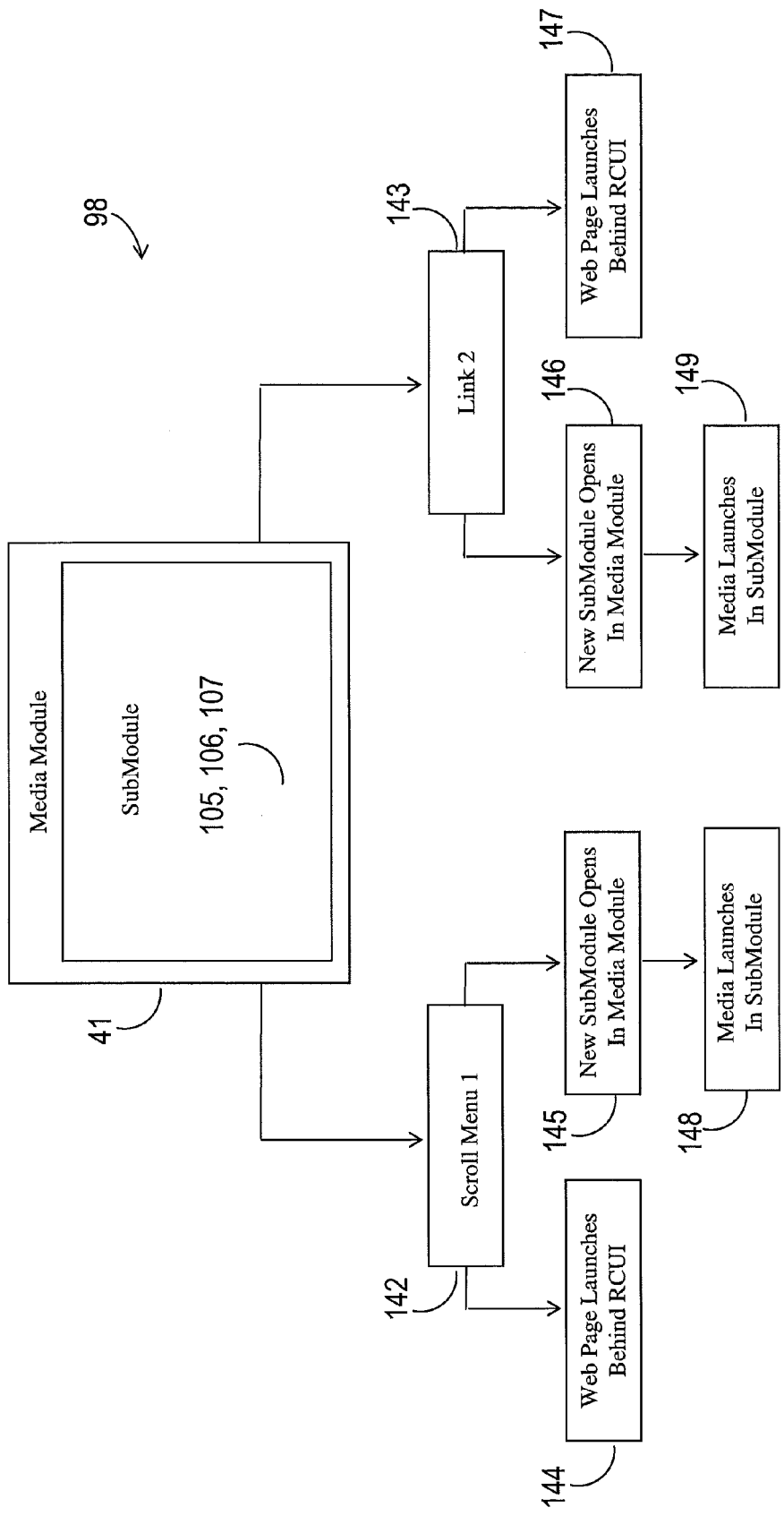
FIG. 20 is a block diagram illustrating a manner in which software architecture may enable display of submodules using a single scrolling menu and single link methods of selection.

The manner in which the software architecture may enable display of submodules using a single scroll menu and single hyperlink combination as methods of selection is illustrated in FIG. 20. Assuming the user has selected a horizontal scroll button 79 (FIG. 14), a new media module 41 (FIG. 13) may replace the previous media module in viewer 62 (FIG. 13) displaying media content in submodule 105, 106, or 107 (FIG. 26).

Hyperlinked menu items are accessible from either scroll menu1 142 or link2 143. Selecting a hyperlinked item from scroll menu1 142 may launch a web page URL 144 display behind the Rich Client User Interface (RCUI) Application 10 (FIG. 2), or a new media submodule 145 displaying new media content 148 that replaces previous submodule 105, 106, or 107 (FIG. 26) and its media content display.

Similarly, selecting hyperlinked item link2 143 may launch a web page URL 147 display behind the Rich Client User Interface (RCUI) Application 10 (FIG. 2), or a new media submodule 146 displaying new media content 149 that may replace previous submodule 105, 106, or 107 (FIG. 26) and its media content display.

Figure 21:
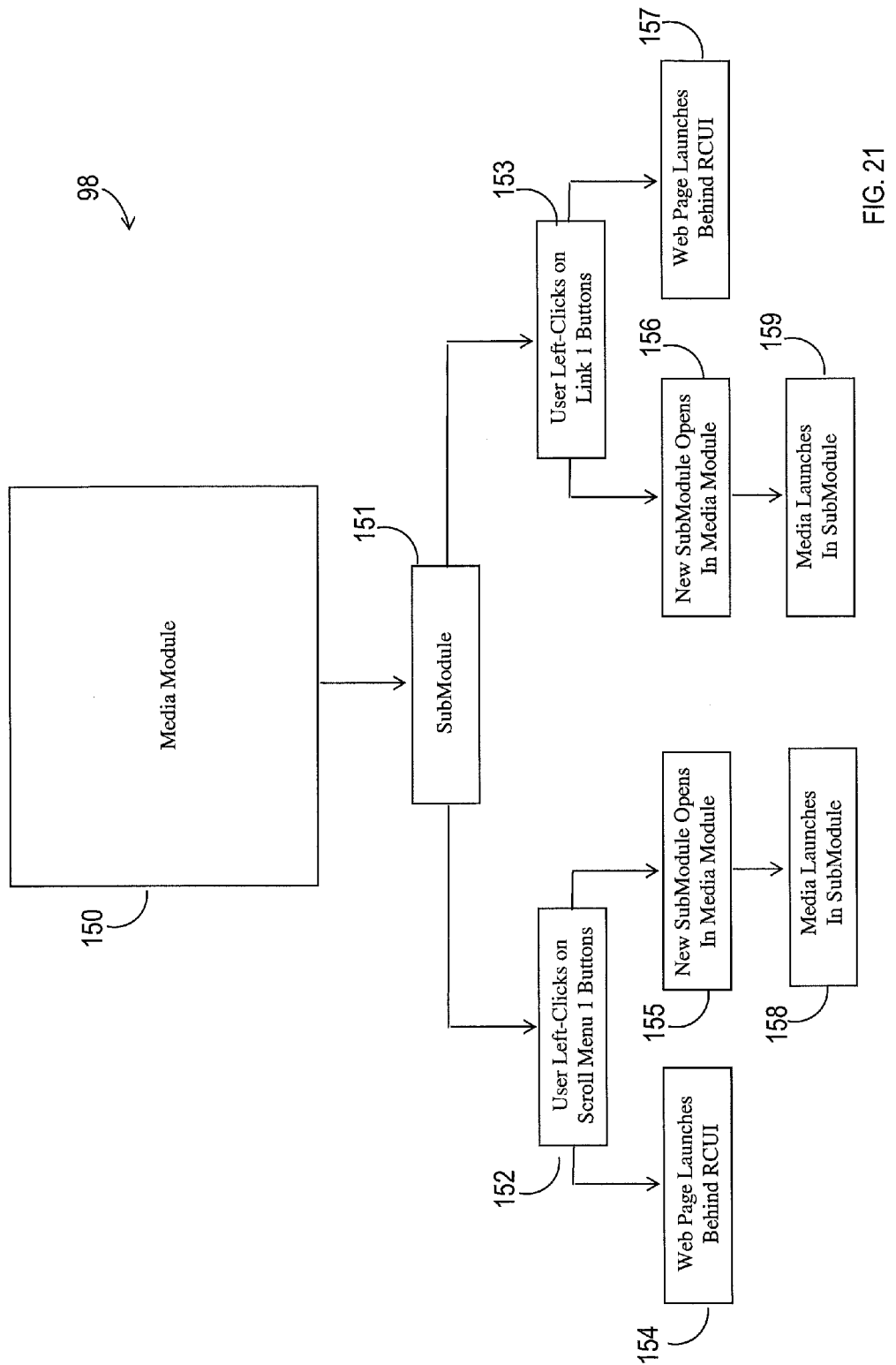
FIG. 21 is a procedural flow chart illustrating a manner in which software architecture may enable display of submodules using a single scrolling menu and single link methods of selection.

The procedural flow in which the software architecture may enable display of submodules using a single scroll menu and single hyperlink combination as methods of selection is illustrated in FIG. 21. Assuming the user has selected a horizontal scroll button 79 (FIG. 14), a new media module 41 (FIG. 13) may replace the previous media module in viewer 62 (FIG. 13) displaying media content in submodule 105, 106, or 107 (FIG. 26).

Hyperlinked menu items may be accessible from either scroll menu1 152 or link1 153. Selecting a hyperlinked item from scroll menu1 152 launches a web page URL 154 display behind the Rich Client User Interface (RCUI) Application 10 (FIG. 2), or a new media submodule 155 and new media content 158 within media module 150 that may replace previous submodule 151 and its media content display.

Similarly, selecting hyperlinked item link1 153 may launch a web page URL 157 display behind the Rich Client User Interface (RCUI) Application 10 (FIG. 2), or a new media submodule 156 displaying new media content 159 may replace previous submodule 105, 106, or 107 (FIG. 26) and its media content display.

Figure 22:
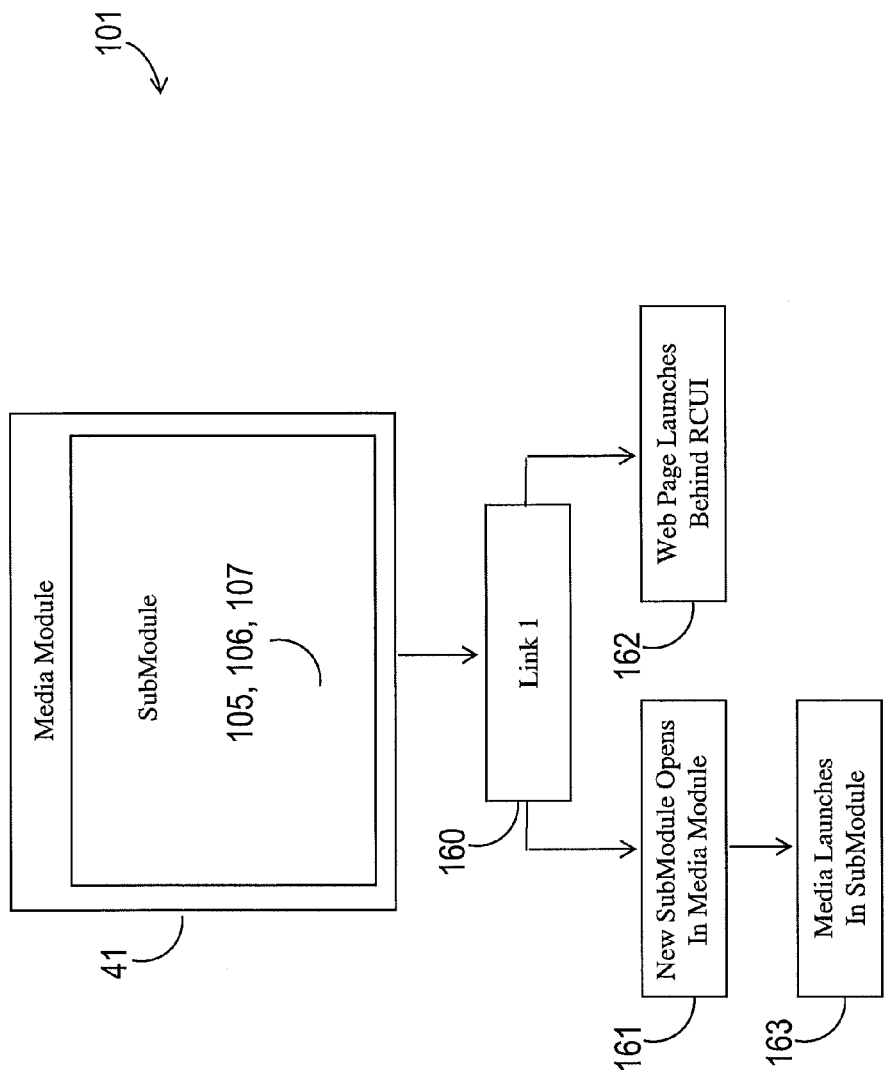
FIG. 22 is a block diagram illustrating a manner in which software architecture may enable display of submodules using a single link method of selection.

The manner in which the software architecture may enable display of submodules using a single hyperlink combination method of selection is illustrated in FIG. 22. Assuming the user has selected a horizontal scroll button 79 (FIG. 14), a new media module 41 (FIG. 13) may replace the previous media module in viewer 62 (FIG. 13) displaying media content in submodule 105, 106, or 107 (FIG. 26).

Hyperlinked menu items may be accessible from link1 160. Selecting hyperlinked item link1 160 may launch a web page URL 162 display behind the Rich Client User Interface (RCUI) Application 10 (FIG. 2), or a new media submodule 161 displaying new media content 163 that may replace previous submodule 105, 106, or 107 (FIG. 26) and its media content display.

Figure 23:
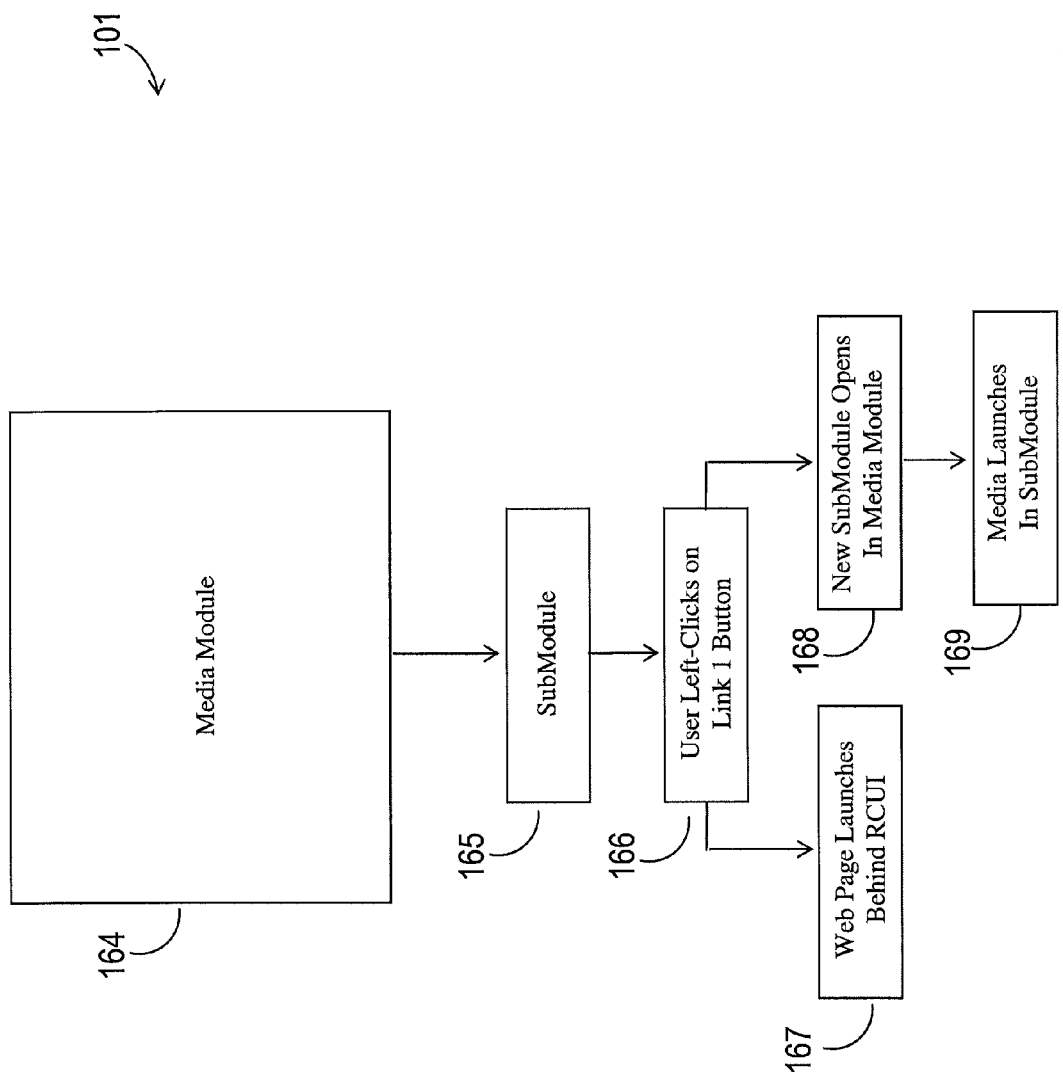
FIG. 23 is a procedural flow chart illustrating a manner in which software architecture may enable display of submodules using a single link method of selection.

The procedural flow in which the software architecture may enable display of submodules using a single hyperlink as a method of selection is illustrated in FIG. 23. Assuming the user has selected a horizontal scroll button 79 (FIG. 14), a new media module 41 (FIG. 13) may replace the previous media module in viewer 62 (FIG. 13) displaying media content in submodule 105, 106, or 107 (FIG. 26).

Hyperlinked menu items may be accessible from link1 166. Selecting hyperlinked item link1 166 may launch a web page URL 167 display behind the Rich Client User Interface (RCUI) Application 10 (FIG. 2), or a new media submodule 168 and new media content 169 within media module 164 that may replace previous submodule 165 and its media content display.

Figure 24:
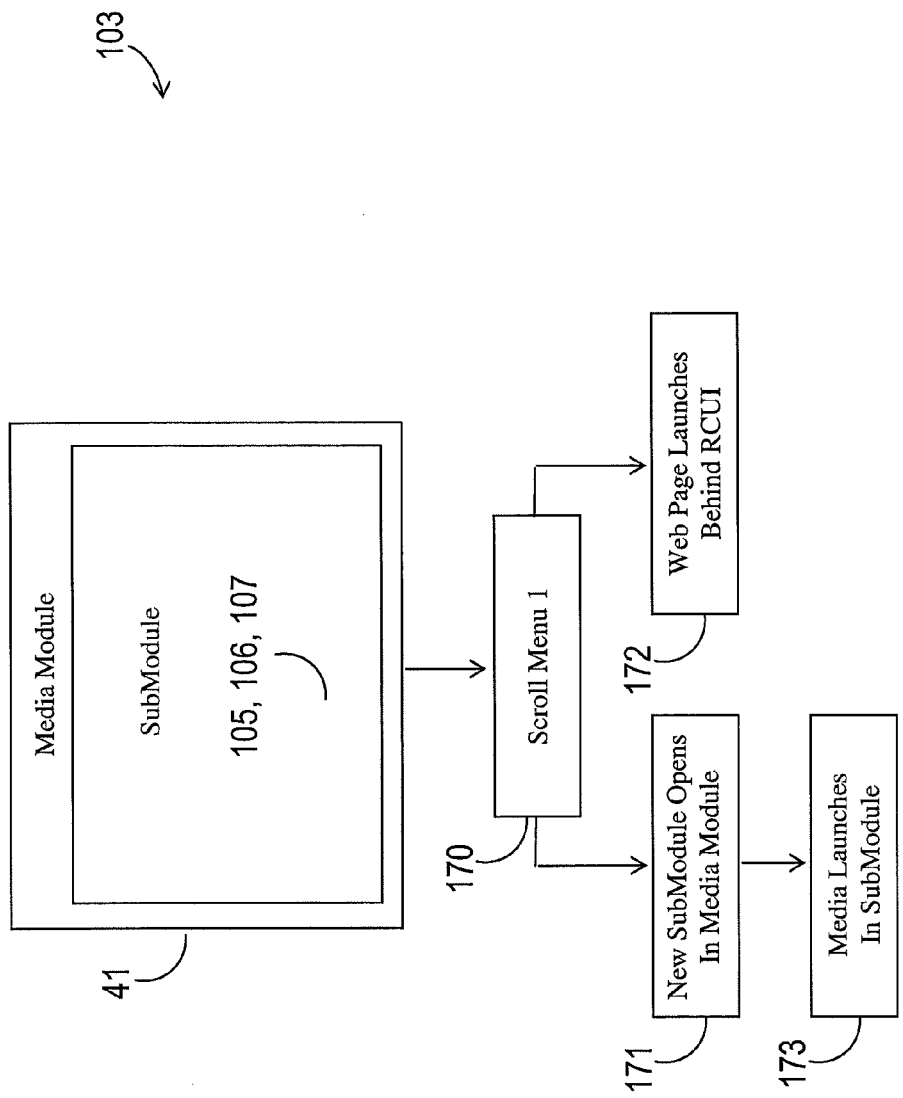
FIG. 24 is a block diagram illustrating a manner in which software architecture may enable display of submodules using a single scroll method of selection.

The manner in which the software architecture may enable display of submodules using a single scroll menu as a method of selection is illustrated in FIG. 24. Assuming the user has selected a horizontal scroll button 79 (FIG. 14), a new media module 41 (FIG. 13) may replace the previous media module in viewer 62 (FIG. 13) displaying media content in submodule 105, 106, or 107 (FIG. 26).

Hyperlinked menu items may be accessible from scroll menu1 170. Selecting a hyperlinked item from scroll menu1 170 may launch a web page URL 172 display behind the Rich Client User Interface (RCUI) Application 10 (FIG. 2), or a new media submodule 171 displaying new media content 173 that may replace previous submodule 105, 106, or 107 (FIG. 26) and its media content display.

Figure 25:
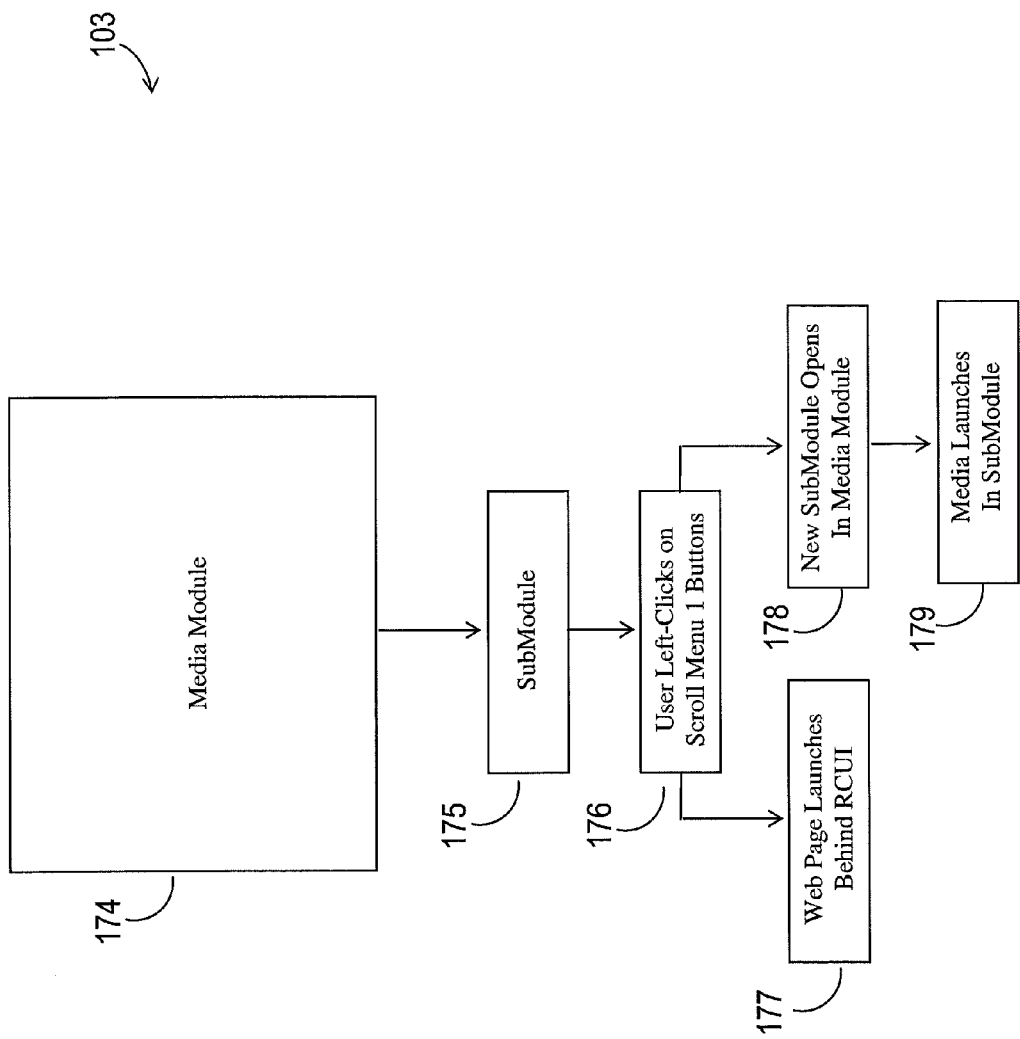
FIG. 25 is a procedural flow chart illustrating a manner in which software architecture may enable display of submodules using a single scroll method of selection.

The procedural flow in which the software architecture may enable display of submodules using a single scroll menu as a method of selection is illustrated in FIG. 25. Assuming the user has selected a horizontal scroll button 79 (FIG. 14), a new media module 41 (FIG. 13) may replace the previous media module in viewer 62 (FIG. 13) displaying media content in submodule 105, 106, or 107 (FIG. 26).

Hyperlinked menu items may be accessible from scroll menu1 176. Selecting a hyperlinked item from scroll menu1 176 may launch a web page URL 177 display behind the Rich Client User Interface (RCUI) Application 10 (FIG. 2), or a new media submodule 178 and new media content 179 within media module 174 that may replace previous submodule 175 and its media content display.

Submodule views for displaying media files and hyperlinked, upper/lower rotating media files that may launch a web page when selected are illustrated in FIG. 26. Assuming the user has selected a horizontal scroll button 79 (FIG. 14), a new media module 41 (FIG. 13) may replace the previous media module in viewer 62 (FIG. 13) displaying new media content within either submodule 105, 106, or 107 and/or rotating ad block 180 and 181.

Figure 27:
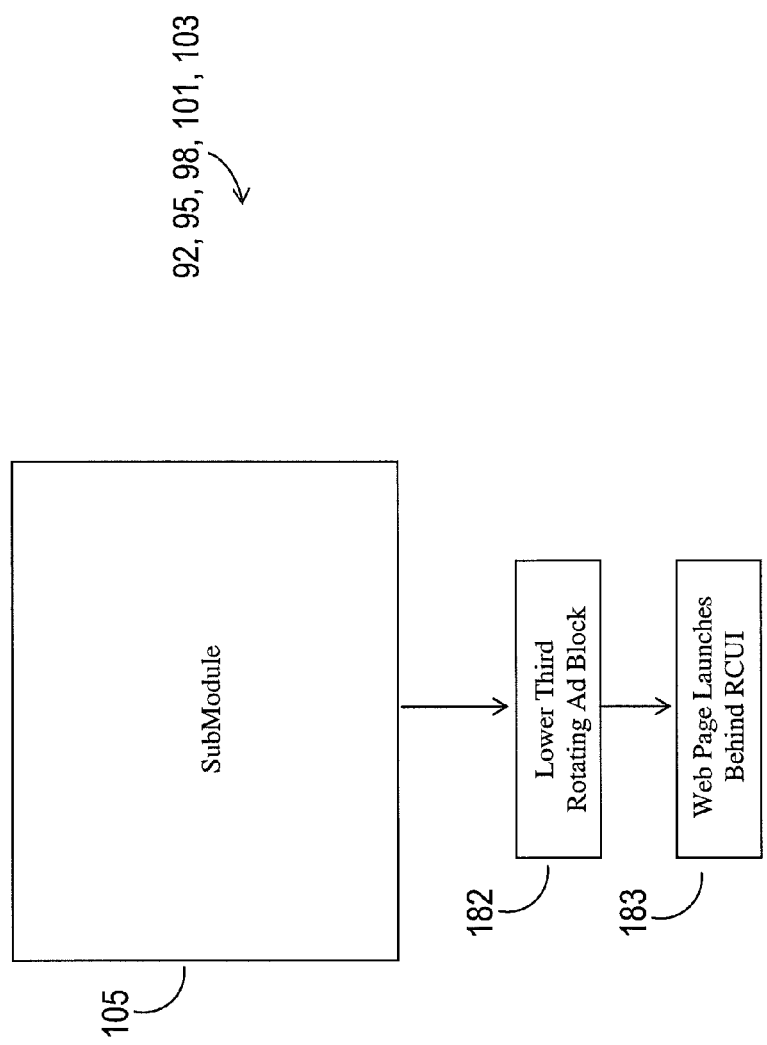
FIG. 27 is a block diagram illustrating a manner in which software architecture may enable display of media files and interactive, lower rotating media files that may launch a web page when selected.

The manner in which the software architecture may enable display of media files and hyperlinked, lower third rotating media files that launch a web page when selected is illustrated in FIG. 27. Particularly, media content may be displayed within submodule 105 and hyperlinked lower third rotating ad block 182 contained within submodule 105 and may launch web page 183 behind the Rich Client User Interface (RCUI) Application 10 (FIG. 2), when selected by the user.

Figure 28:
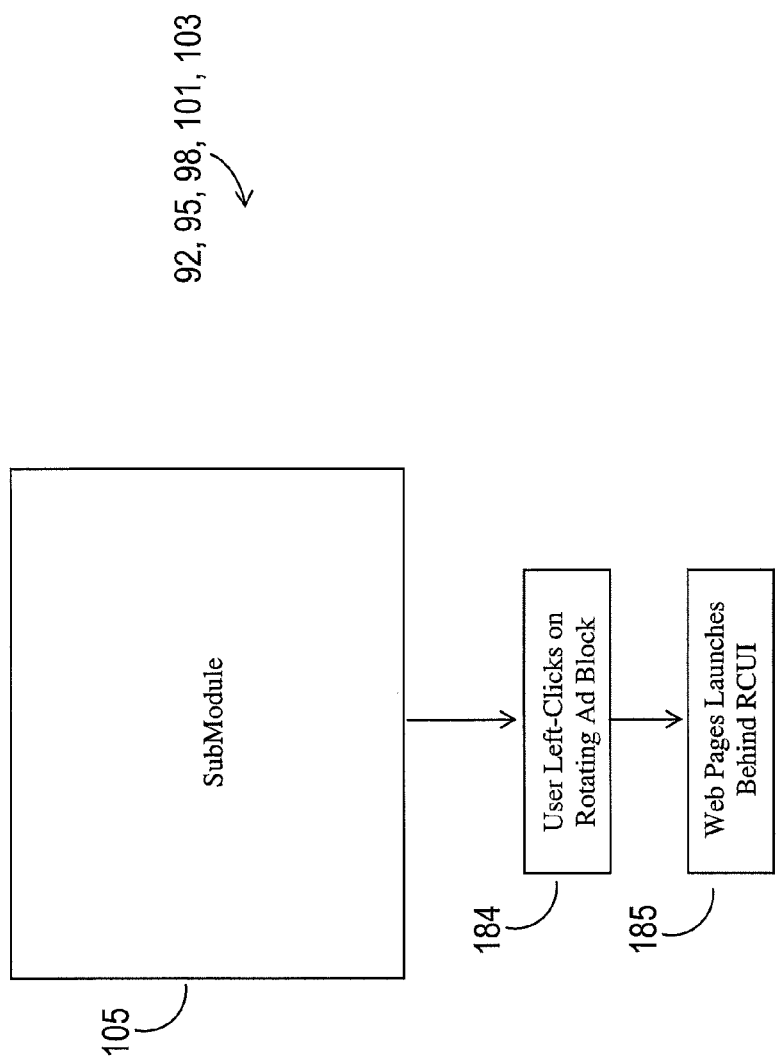
FIG. 28 is a procedural flow chart illustrating a manner in which software architecture may enable display of media files and interactive, lower rotating media files that may launch a web page when selected.

The procedural flow in which the software architecture may enable display of media files and hyperlinked, lower third rotating media files that launch a web page when selected is illustrated in FIG. 28. Particularly, media content may be displayed within submodule 105 and hyperlinked lower third rotating ad block 180 that is contained within submodule 105 and may launch web page 185 behind the Rich Client User Interface (RCUI) Application 10 (FIG. 2), when selected by the user 184.

Figure 29:
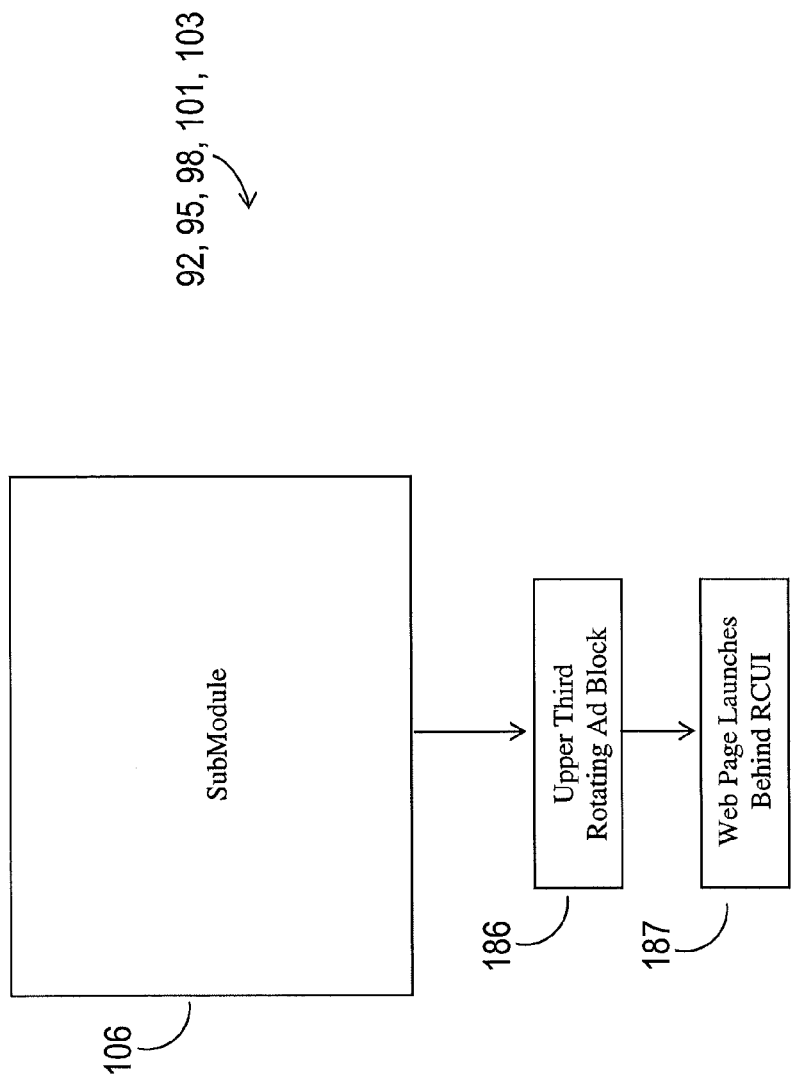
FIG. 29 is a block diagram illustrating a manner in which software architecture may enable display of media files and interactive, upper rotating media files that may launch a web page when selected.

The manner in which the software architecture may enable display of media files and hyperlinked, upper third rotating media files that launch a web page when selected is illustrated in FIG. 29. Particularly, media content may be displayed within submodule 106 and hyperlinked upper third rotating ad block 186 contained within submodule 106 and may launch web page 187 behind the Rich Client User Interface (RCUI) Application 10 (FIG. 2), when selected by the user.

Figure 30:
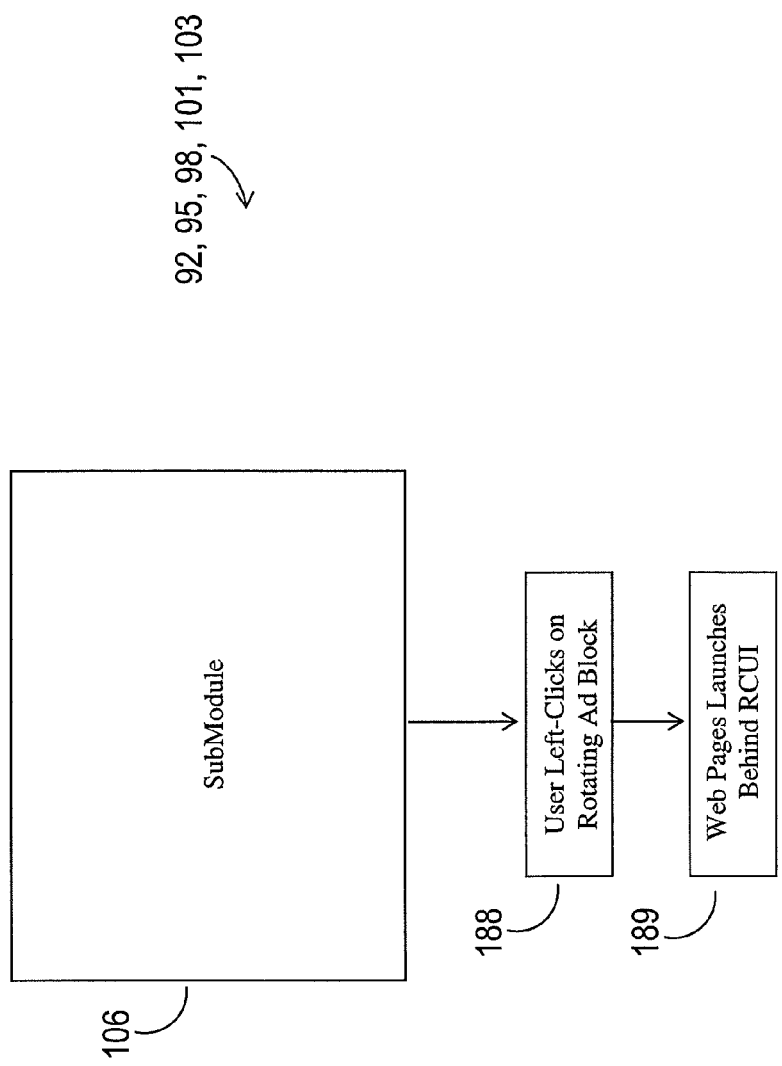
FIG. 30 is a procedural flow chart illustrating a manner in which software architecture may enable display of media files and interactive, upper rotating media files that may launch a web page when selected.

The procedural flow in which the software architecture may enable display of media files and hyperlinked, upper third rotating media files that launch a web page when selected is illustrated in FIG. 30. Particularly, media content may be displayed within submodule 106 and hyperlinked upper third rotating ad block 181 that is contained within submodule 106 and may launch web page 189 when selected by the user 188.

Figure 31:
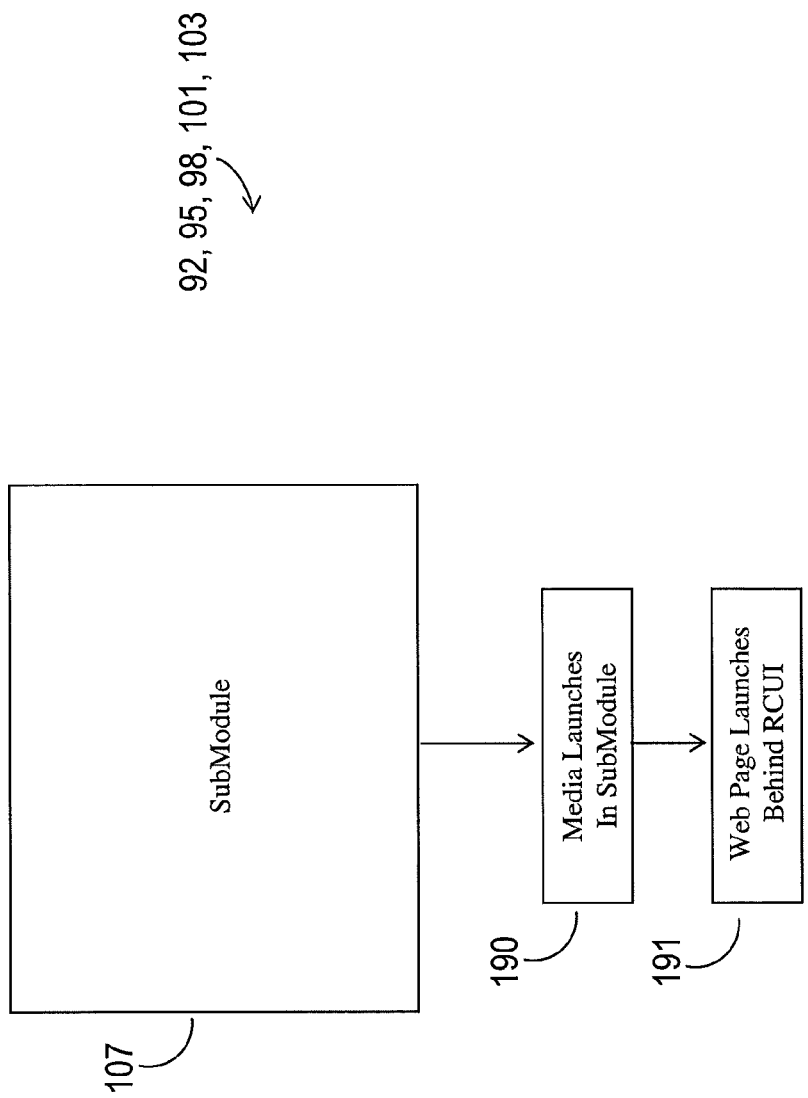
FIG. 31 is a block diagram illustrating a manner in which software architecture may enable display of media files.

The manner in which the software architecture may enable display of media files and hyperlinked, media content and media files that launch a web page when selected is illustrated in FIG. 31. Particularly, media content 190 may be displayed within submodule 107 and may launch web page 191 when selected by the user.

Figure 32:
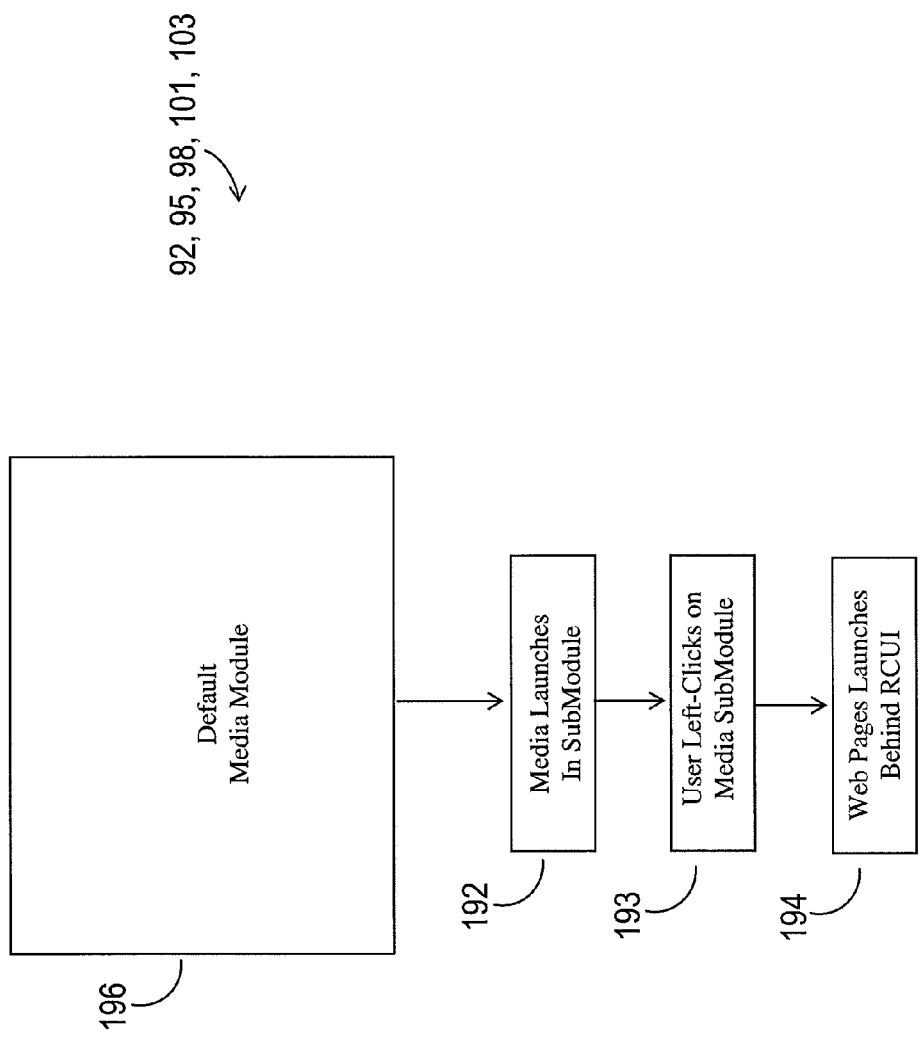
FIG. 32 is a procedural flow chart illustrating a manner in which software architecture may enable display of media files.

The procedural flow in which the software architecture may enable display of media files and hyperlinked, media content and media files that launch a web page when selected is illustrated in FIG. 32. Particularly, media content 192 may be displayed within submodule 107 and may launch web page 194 when selected by the user 193.

Figure 33:
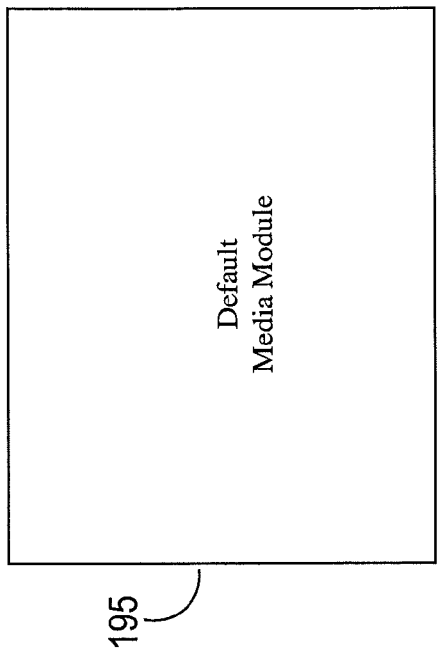
FIG. 33 is a schematic illustration of a default media module view for displaying sequential media files and modules.

The manner in which default media module view displays sequential media files and modules is illustrated in FIG. 33. Specifically, the window encapsulation of media modules 92, 95, 98, 101, 103 (FIG. 15) are displayed.

Figure 34:
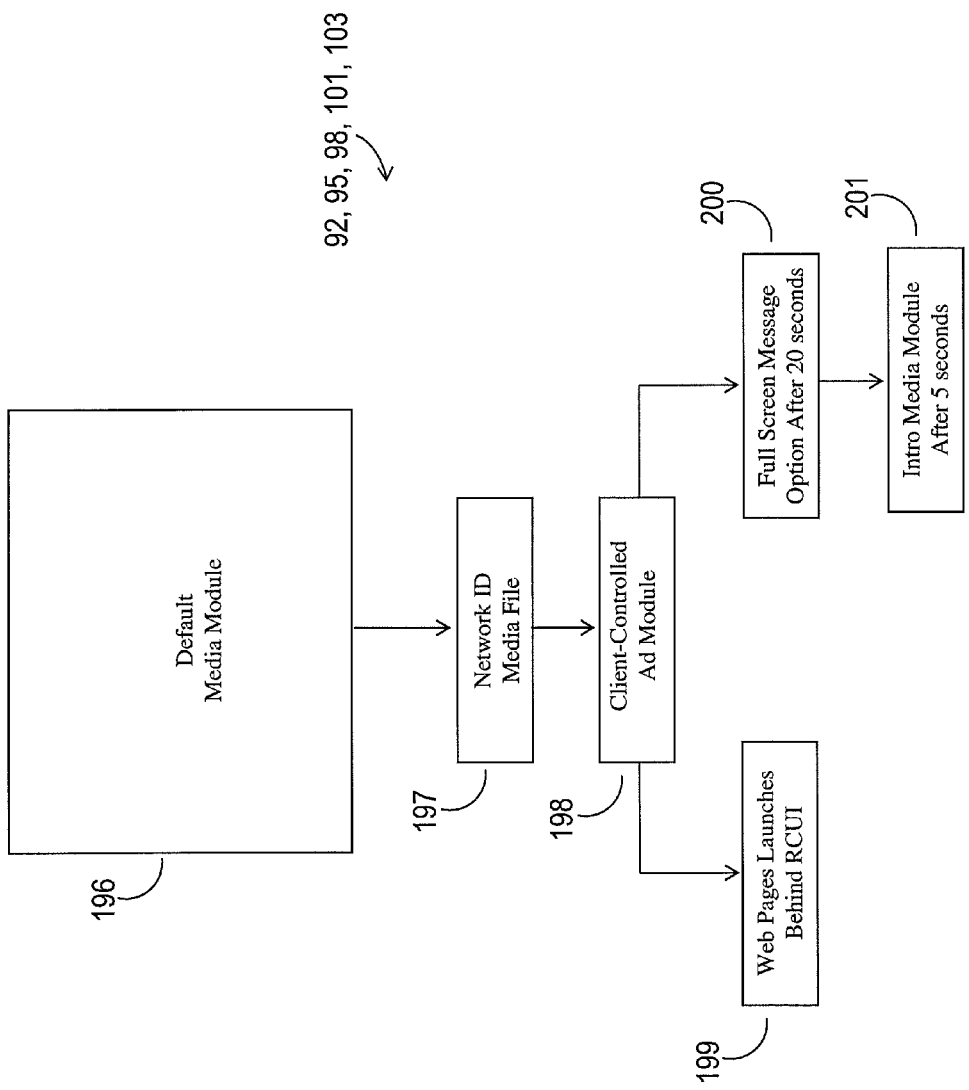
FIG. 34 is a block diagram illustrating a manner in which software architecture may enable display of sequential media files and modules.

The manner in which the software architecture may enable display of sequential media files and modules within a default media module 196 is illustrated in FIG. 34. Assuming the user has selected a horizontal scroll button 79 (FIG. 14), a new media module 41 (FIG. 13) may replace the previous media module in viewer 62 (FIG. 13) displaying media content in submodule 105, 106, or 107 (FIG. 26). The network ID media file 197 that corresponds with selected category of media content may be actuated and displayed confirming the user's selection. After a short predetermined time interval the network ID media file 197 may automatically be replaced by a hyperlinked client controlled ad module 198 display that may launch a web page 199 behind the Rich Client User Interface (RCUI) Application 10 (FIG. 2) when selected.

Following another pre-scripted time interval the hyperlinked client controlled ad module 198 may automatically be replaced by the full screen message module 200, followed by the intro media module 201.

Figure 35:
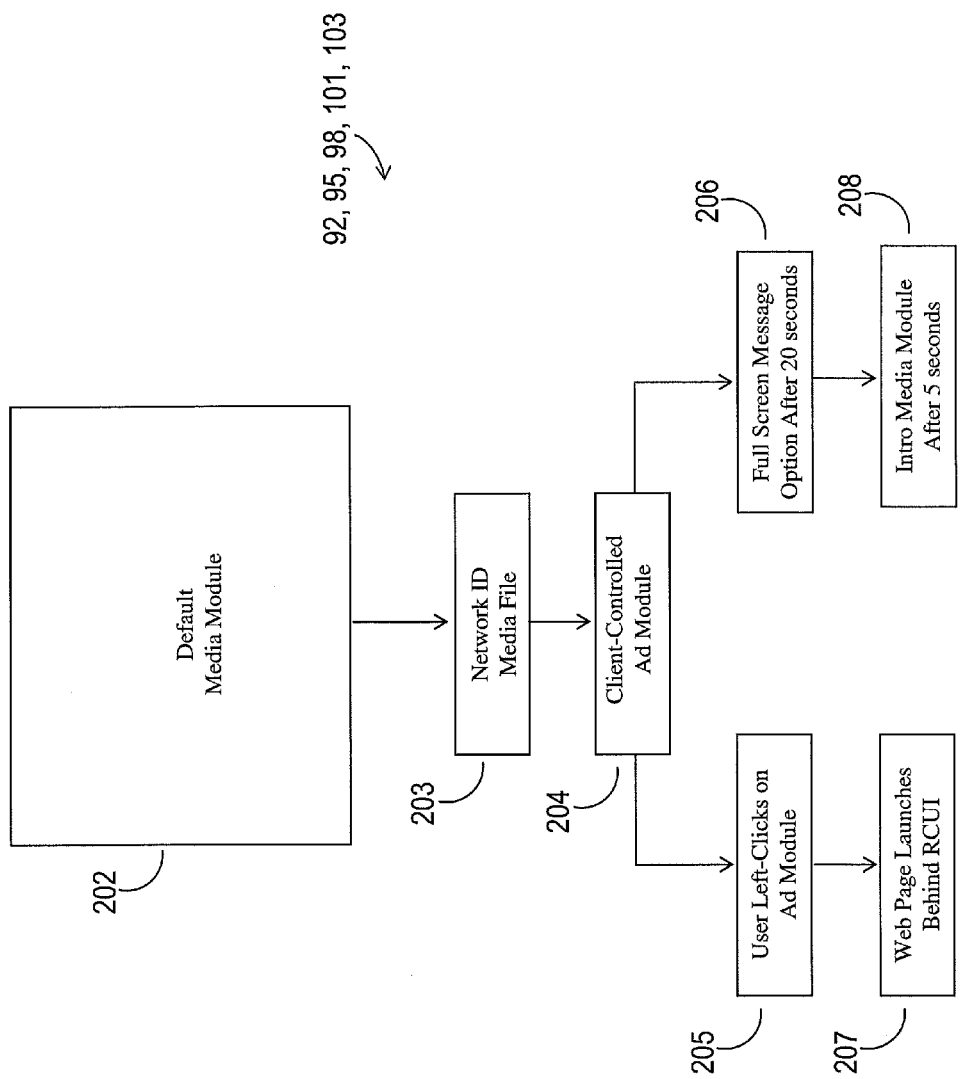
FIG. 35 is a procedural flow chart illustrating a manner in which software architecture may enable display of sequential media files and modules.

The procedural flow in which the software architecture may enable display of sequential media files and modules within a default media module 202 is illustrated in FIG. 35. Assuming the user has selected a horizontal scroll button 79 (FIG. 14), a new media module 41 (FIG. 13) may replace the previous media module in viewer 62 (FIG. 13) displaying media content in submodule 105, 106, or 107 (FIG. 26). The network ID media file 203 that corresponds with selected category of media content may be actuated and displayed confirming the user's selection. After a short pre-scripted time interval the network ID media file 203 may automatically be replaced by a hyperlinked client controlled ad module 198 display that may launch a web page 207 behind the Rich Client User Interface (RCUI) Application 10 (FIG. 2) when selected by the user 205.

Following another pre-scripted time interval the hyperlinked client controlled ad module 204 may automatically be replaced by the full screen message module 206, followed by the intro media module 208.

Figure 40:
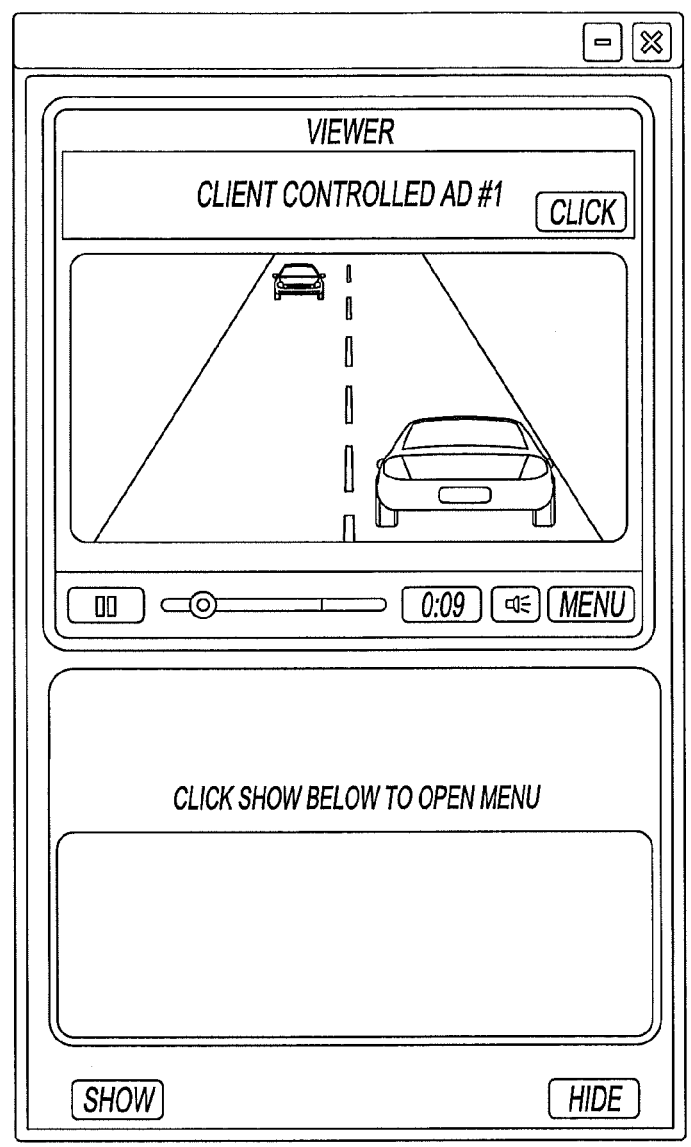
FIG. 40 is a screenshot of an exemplary virtual asset management system.
Figure 41A:
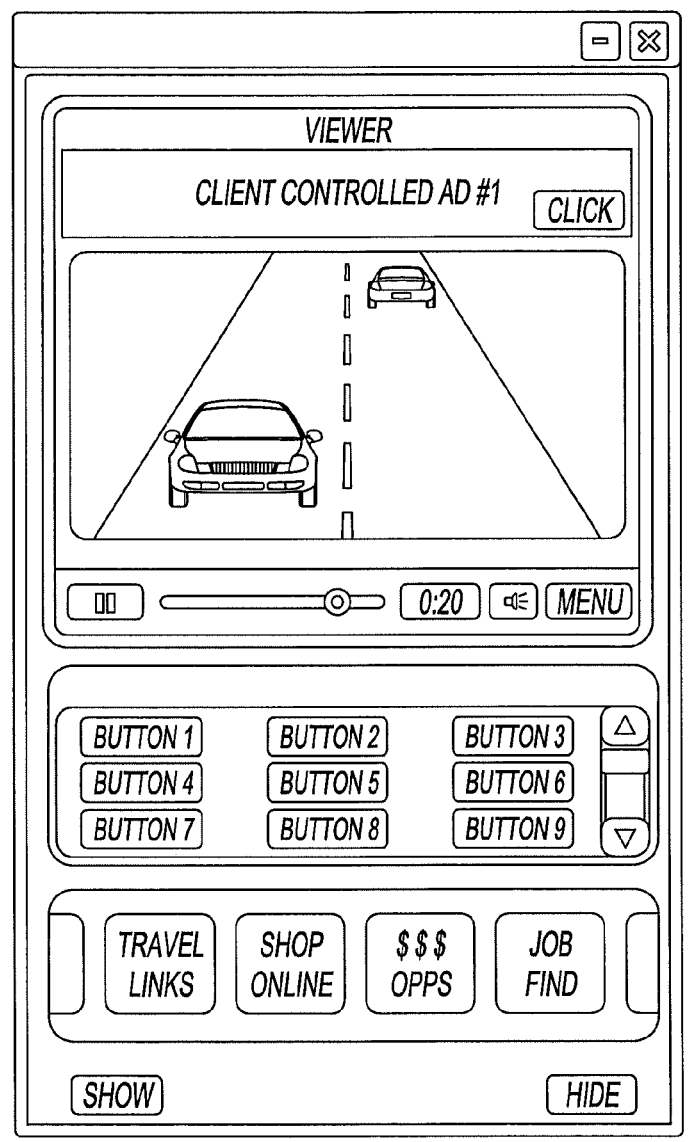
FIG. 41a is a screenshot of an exemplary virtual asset management system.
Figure 41B:
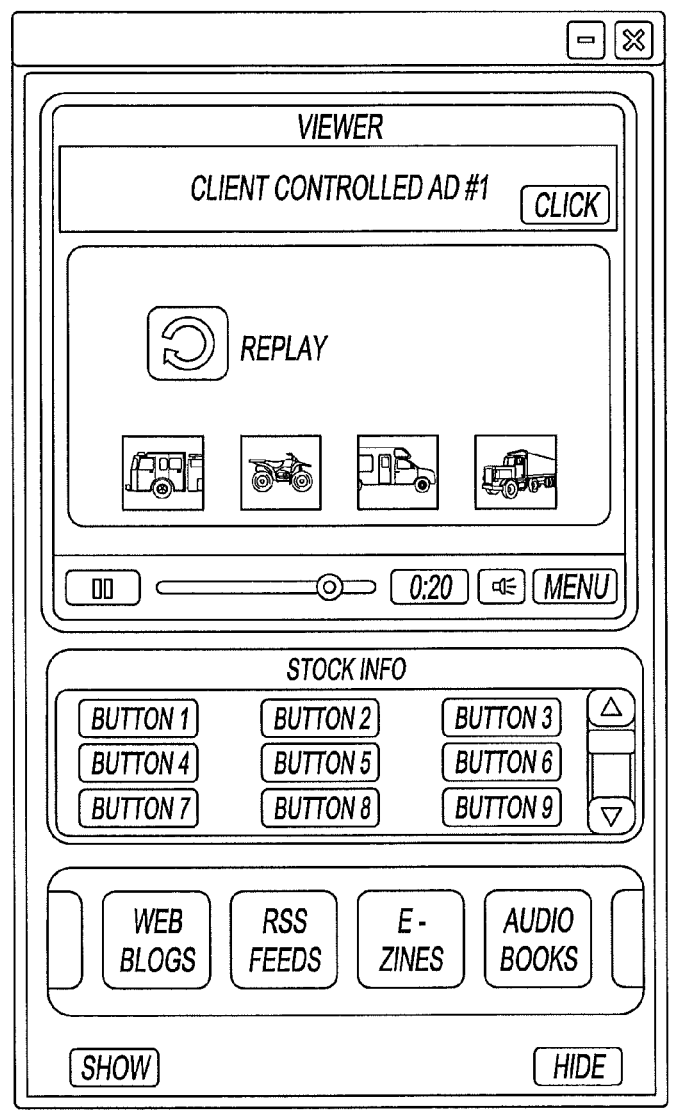
FIG. 41b is a screenshot of an exemplary virtual asset management system.

FIG. 40, FIG. 41*a*, and FIG. 41*b* are screenshots of an exemplary Rich Client User Interface (RCUI) Application 10 residing on a remote computing device.

Figure 36:
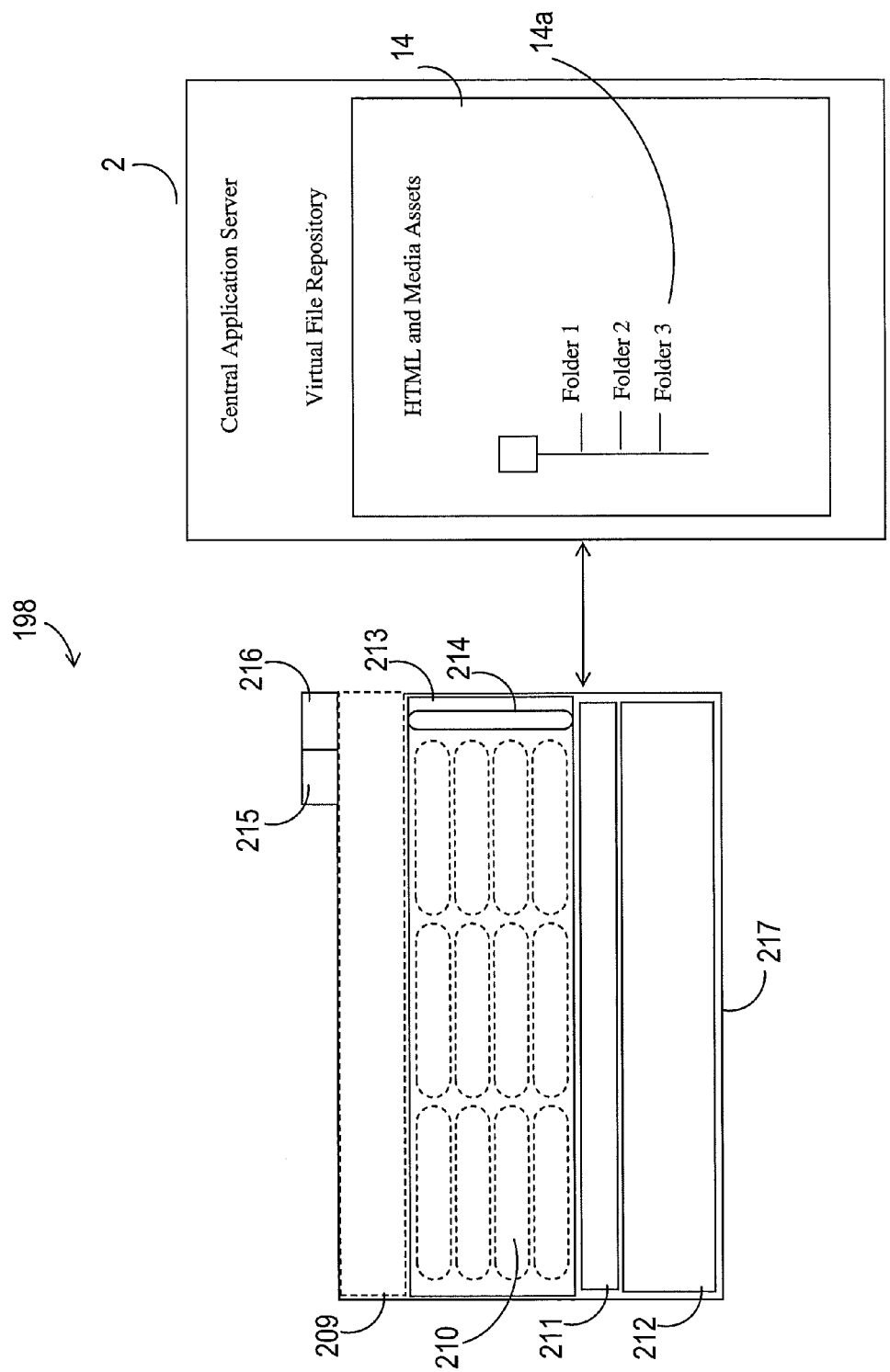
FIG. 36 is a schematic illustration of an exemplary graphical user screen displaying audio streaming virtual assets.

An exemplary audio streaming graphical user interface variation and server storage screen in the form of a hierarchical tree structure folder file list 14*a* for HTML and virtual assets within the virtual asset management system 14 is illustrated in FIG. 36. Specifically, the virtual assets for Rich Client User Interface (RCUI) Application 198 may be encapsulated in a window container 217. User selection of the minimize button 215 causes the Rich Client User Interface (RCUI) Application 198 to contract into the toolbar on the user's desktop. User selection of the close button 216 causes the system 198 to terminate.

In launch mode the audio streaming system 198 may consist of a window container 217, a tightly integrated hyperlinked upper third rotating ad block, a vertical scroll menu 213, a media status bar 211, and media player controls. Simultaneously, HTML and media content 14 residing on central application server 2 may also be called from hierarchical tree structure folder file list 14*a*, and displayed in the hyperlinked client-controlled rotating ad block 209, which may be placed above vertical scroll menu window 213, both of which are embedded inside container 217. Further, all virtual assets of the audio streaming system 198 can be scripted in any programming language (e.g. HTML, XML, javascript, or flash, etc.), organized in any combination, shape, or configuration to achieve a desired graphical user interface result, and call audio playlist streams from central application server 2, or a third party central application or media streaming server.

The virtual assets contained within a vertical scroll menu 213 may consist of rows of vertical scrolling buttons 210, and a vertical scroll bar 214.

Figure 37:
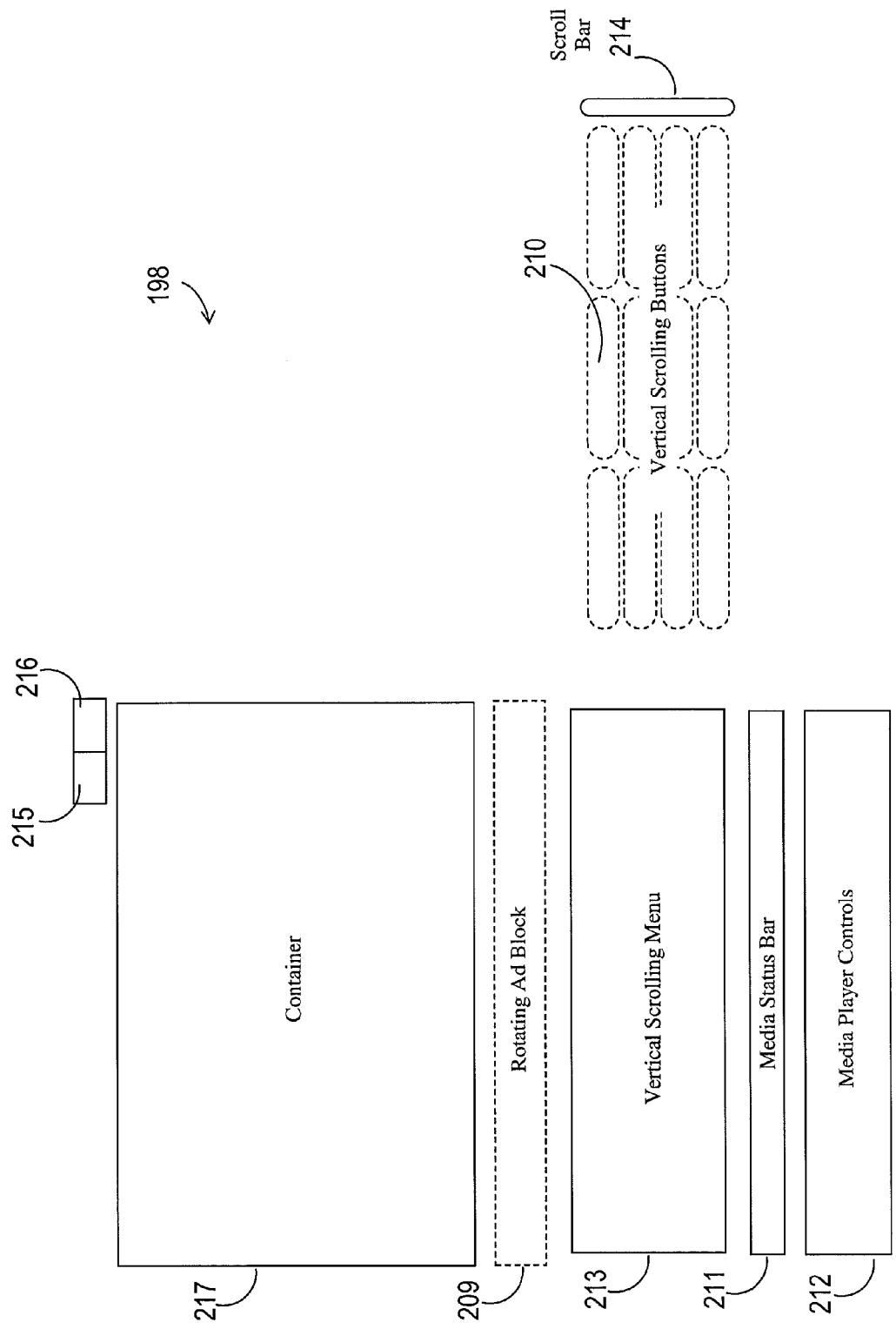
FIG. 37 is a diagrammatic illustration of an exemplary audio streaming graphical user screen displaying virtual assets as separate components.

An exemplary graphical user screen displaying virtual assets as separate components of the audio streaming system 198 is illustrated in FIG. 37. Particularly, minimize button 215, close button 216, window container 217, hyperlinked, upper third rotating ad block 209, vertical scrolling menu window 213, vertical scroll button 210 options, vertical scroll bar 214, media status bar 211, media and media player controls 212.

Figure 38:
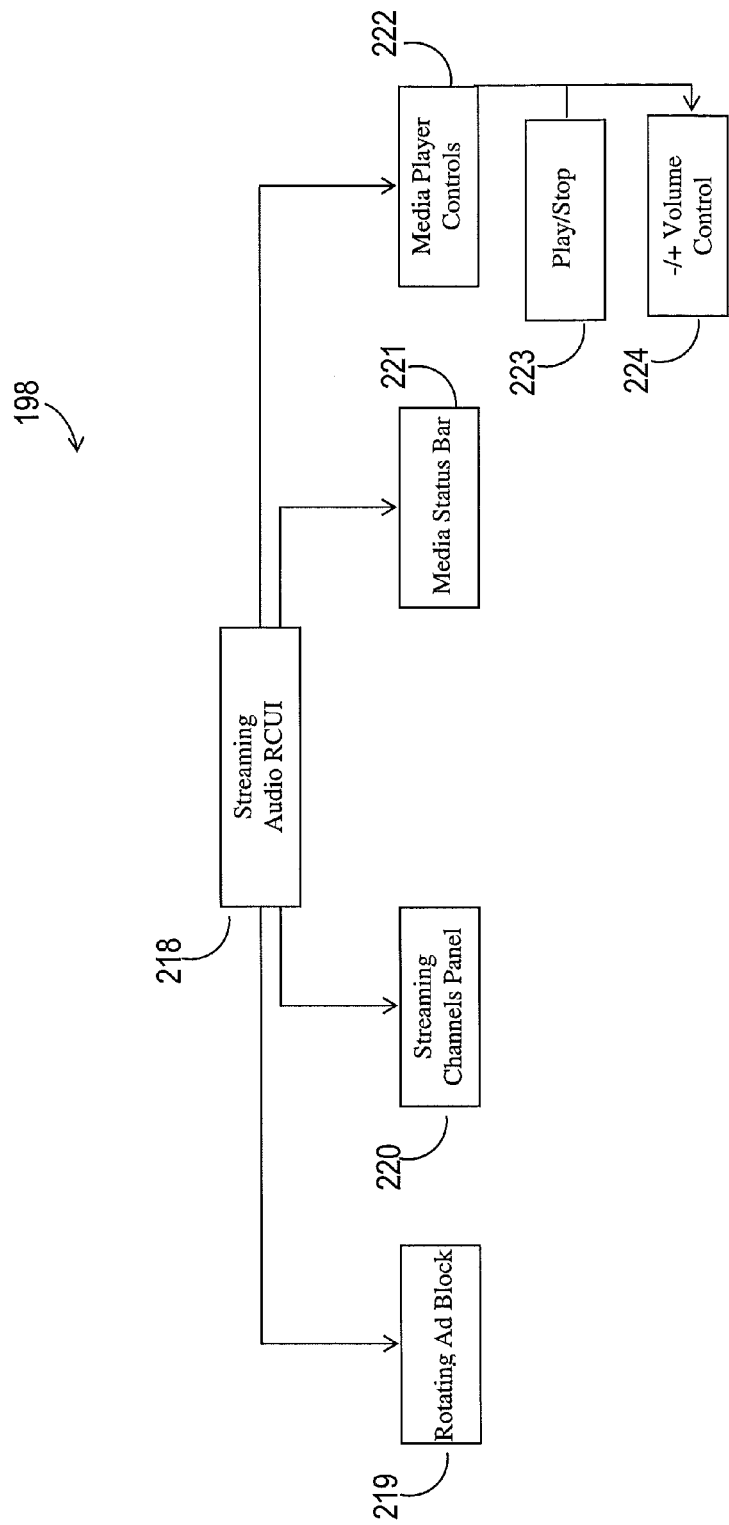
FIG. 38 is a block diagram illustrating a manner in which software architecture may enable display of audio streaming virtual assets.

The manner in which audio streaming system 198 may enable display of virtual assets for viewing and selection of media assets is illustrated in FIG. 38.

The hyperlinked, upper third rotating ad block 219 may launch a web page behind the audio streaming system 198 when selected. Rows of vertical scroll buttons may actuate audio streaming playlists or audio media streams when selected, while simultaneously a new media status bar may replace the previous media status bar 221, new media player controls may replace the previous media player controls 222, and a new hyperlinked upper third rotating ad block may replace rotating ad block 219.

The media status bar 221 may display audio streaming information pertaining to artists, stream titles, duration and elapsed time. Media player controls 222 may display audio stream play and stop 223 functionality, while volume controls 224 may allow the user to increase or decrease audio stream sound volume. The hyperlinked upper third rotating ad block 209 may display media content pertaining to ad clients and may launch a web page behind the system 198 when clicked, displaying associated information.

Figure 39:
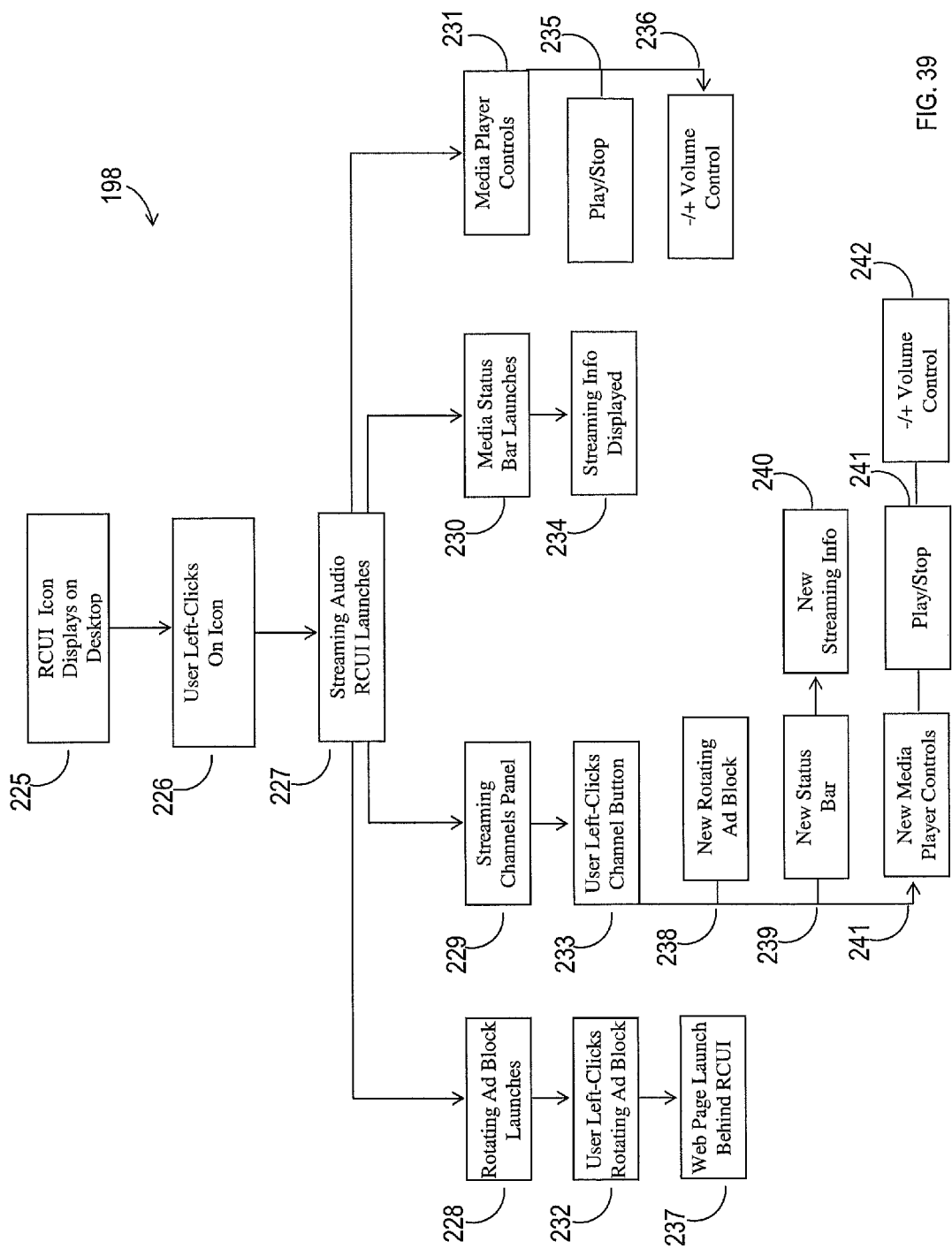
FIG. 39 is a procedural flow chart illustrating a manner in which software architecture may enable display of audio streaming virtual assets.

The manner in which the software architecture may enable display of audio streaming virtual assets in system 198 is illustrated in FIG. 39. Particularly, the user may left-click 226 on associated desktop icon 225, or file located on their hard drive which may launch the audio streaming Rich Client User Interface RCUI 227. Upon launch, virtual assets may be loaded as they pertain to FIG. 38 described above.

When the hyperlinked, upper third rotating ad block 228 is selected by the user 232, a web page 237 may be launched behind the Rich Client User Interface RCUI 227 and may display associated information. The streaming channels panel 229 may display rows of vertical buttons 210 (FIG. 37). When selected, audio streaming playlists or audio media streams may be actuated, and a new hyperlinked upper third rotating ad block 238 may replace the previous hyperlinked upper third rotating ad block 228. Additionally, a new media status bar 239 may replace the previous media status bar 230 and may display new audio stream information 240. Further, new media player controls 241 may replace previous media player controls 231 meaning new audio stream play/stop controls 241 may replace previous play/stop controls 235, and new volume controls 242 may replace previous volume controls 236.

The media status bar 230 displays audio streaming information pertaining to artists, stream titles, duration and elapsed time. Media player controls 231 display audio stream play and stop 2235 functionality, while volume controls 236 may allow the user to increase or decrease audio stream sound volume. The hyperlinked upper third rotating ad block 228 may display media content pertaining to ad clients and may launch a web page behind the system 198 when clicked displaying associated information.

Figure 42:
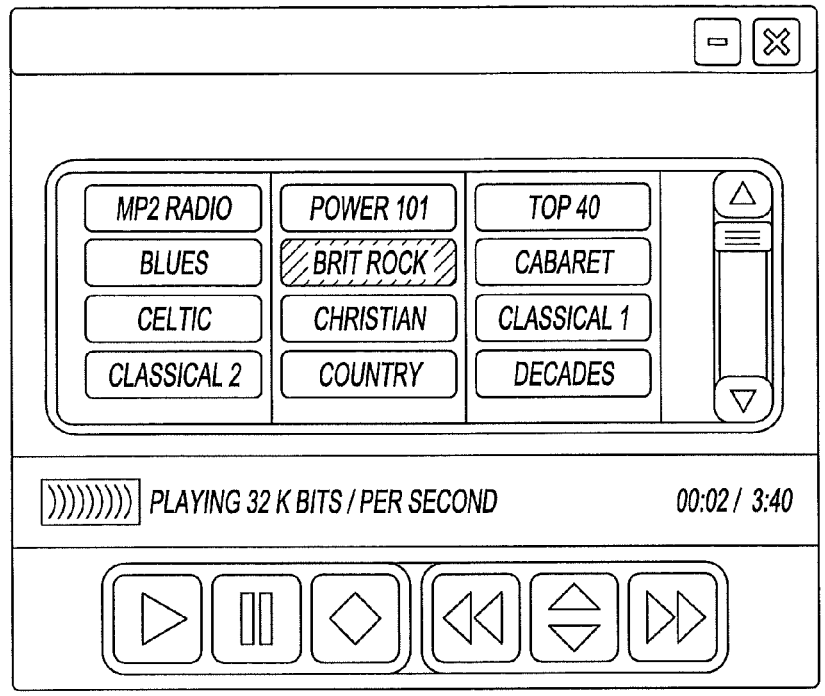
FIG. 42 is a screenshot of an audio streaming graphical user screen displaying virtual assets.
Figure 43:
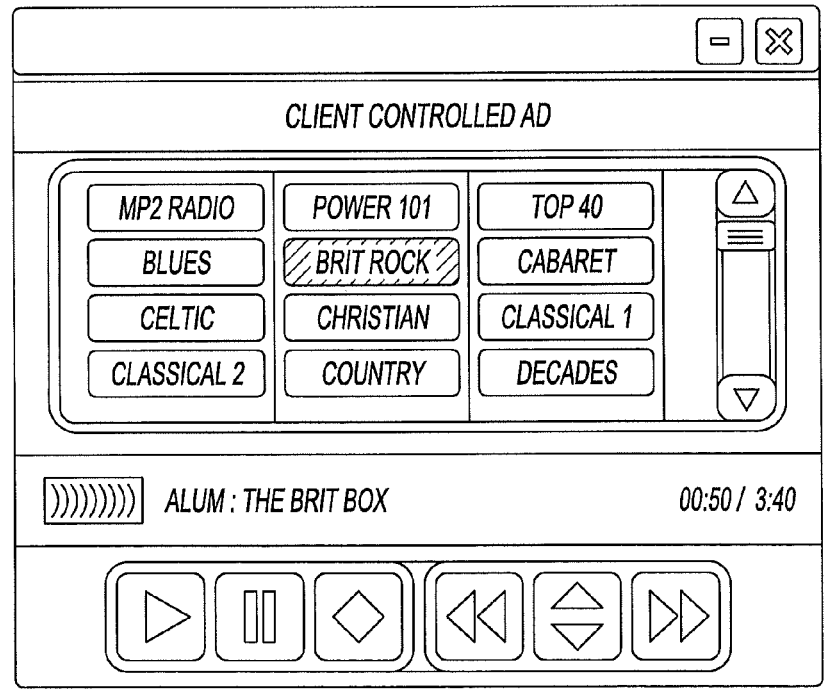
FIG. 43 is a screenshot of an exemplary audio streaming graphical user screen displaying virtual assets.
Figure 44:
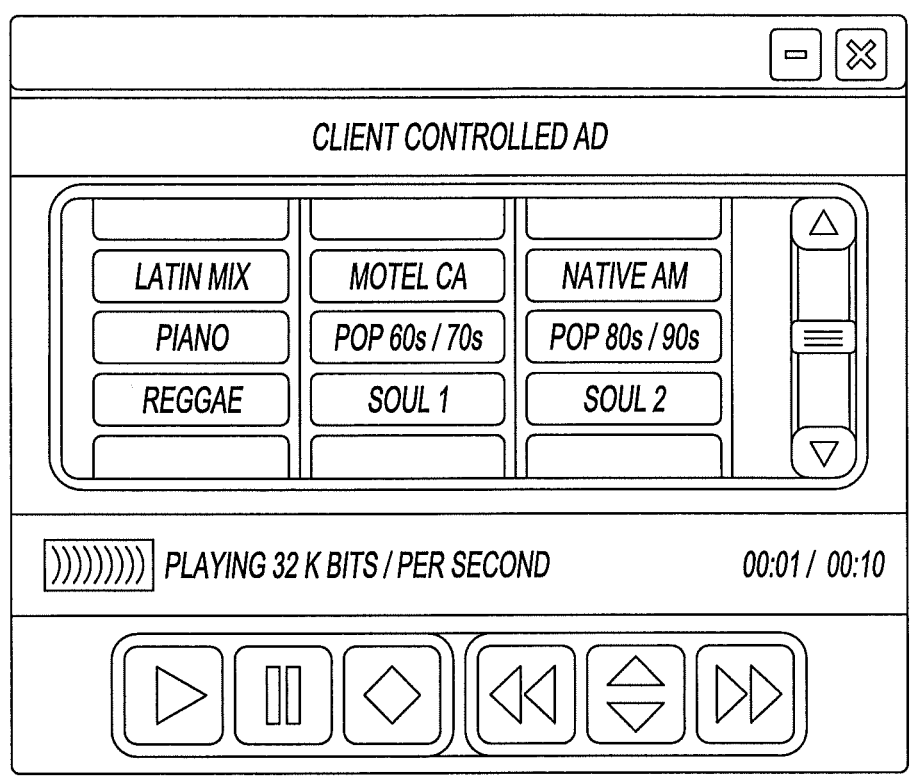
FIG. 44 is a screenshot of an exemplary audio streaming graphical user screen displaying virtual assets.

FIG. 42 through FIG. 44 illustrate screenshots of an exemplary audio streaming graphical user interface variation residing on a remote computing device.

Figure 45:
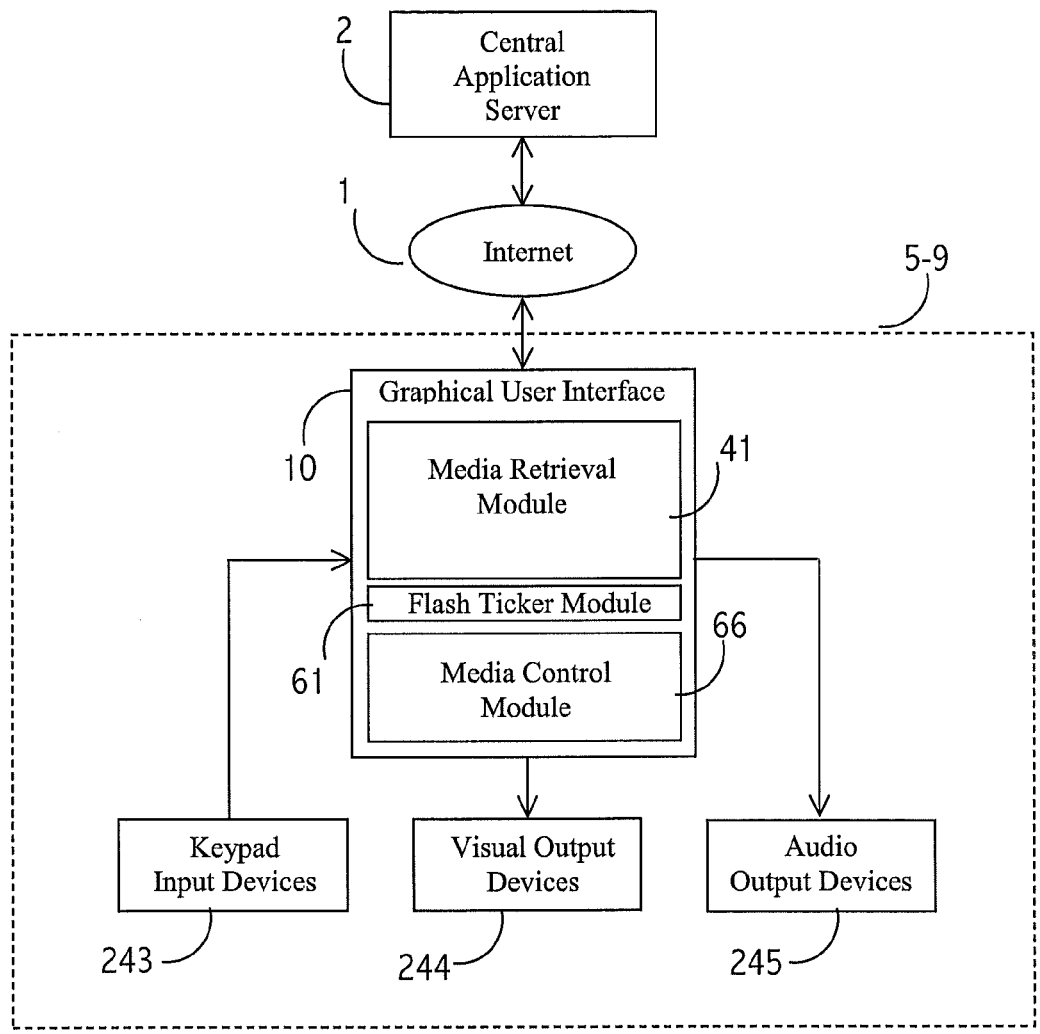
FIG. 45 is a schematic illustration of an exemplary virtual asset management system.

An exemplary graphical user screen displaying virtual asset modules of the Rich Client User Interface (RCUI) Application 10 (FIG. 2) after user launch 70 (FIG. 14) and log on 71 (FIG. 14) is illustrated in FIG. 45. Particularly, the media retrieval module 41 (FIG. 13), flash ticker module 61 (FIG. 13), and media control module 66 (FIG. 13) are retrieved from the central application server 2 (FIG. 2), using internet connection 1 (FIG. 2) and displayed within the graphical user interface 10 (FIG. 2) residing on remote computing devices 5-9 (FIG. 2). Keypad input device 243 associated with remote computing devices 5-9 (FIG. 2) allow the user to actuate procedural calls through hyperlinks to replace content within or without the graphical user interface 10 (FIG. 2) window via media retrieval module 41 (FIG. 13), flash ticker module 61 (FIG. 13), and media control module 66 (FIG. 13) while viewing the changes on a visual output device 244 associated with remote computing devices 5-9 (FIG. 2), and/or listening to changes on an audio output device 245 associated with remote computing devices 5-9 (FIG. 2). Flash ticker module 61, for example, may be a stock ticker that scrolls stock values from a stock exchange, such as the New York stock exchange.

It is to be understood that the terms "top", "bottom", "side", "upper", "lower", "front", "rear", "horizontal", "vertical", "right", "left" and the like are used herein merely to describe points of reference and do not limit the present teachings to any specific shape, configuration, or orientation.

Further, all virtual assets of the Rich Client User Interface (RCUI) Application can be scripted in any programming language (e.g. HTML, XML, javascript, or flash, etc.), and organized in any combination, shape, or configuration to achieve a desired graphical user interface result. The system may be a stand-alone or networked system, or may be combined or embedded within other systems.

The RCUI Application may be used to facilitate client-controlled content. For example, the Rich Client User Interface (RCUI) Application may provide virtual facilitation of third party advertisers or streaming media providers to independently produce, edit/modify, and/or upload content at will to external servers and channel said content through the Rich Client User Interface (RCUI) to a single or plurality of user desktops via visual display or audio stream formats, while simultaneously bypassing the need to involve the vendor as a permission-based intermediary for production, edit/modification, and upload, thereby relieving the manpower and server burdens to the vendor.

The procedural calls of visual display or audio stream formats is accomplished through the specialized coding/scripting of media and advertising submodules that are actuated by the user's content selection associated with menu buttons encapsulated within the graphical user interface shell.

As shown in FIG. 46 and described above, Central Application Server 2 may include a Data Storage Unit 4 for storing virtual assets. Central Application Server 2 may be provided and/or established by a vendor. The Data Storage Unit 4 of the Central Application Server 2 may include one or more Client Files 303a, 303b, 303c for pushing client media content 301a, 301b, 301c. For example, various clients (e.g., Client1, Client2, Client3) may upload Client Media Content (e.g., Client1 Media Content 301, Client2 Media Content 301b, Client3 Media Content 301c), including streaming media, audio, and/or video content or data through Internet 1 to associated Client Containers, (e.g., Client1 Container 303a, Client2 Container 303b, Client3 Container 303c) of the Data Storage Unit 4. The Client Media Content (e.g., Client1 Media Content 301, Client2 Media Content 301b, Client3 Media Content 301c) may then be provided automatically to RCUI Applications 10 of Remote Computing Devices 5-9. For example, Client Media Content may be pushed to RCUI Applications 10 of Remote Computing Devices 5-9 or provided when requested by RCUI Applications 10 of Remote Computing Devices 5-9. Data Storage Unit 4 may also store Other Media 305, 305b to be provided to RCUI Applications 10 of Remote Computing Devices 5-9.

In this way, Clients (e.g., Client1, Client2, Client3) may independently update their respective media content by uploading the media content without the involvement of the vendor of the Central Application Server 2. For example, a client may upload new advertising content to their respective Client Container 303. Alternatively, Client Media Content may be stored locally at a Client location and Data Storage Unit may include a link or pointer to the location of the Client Media Content. In such case, Central Application Server 2 may access updated Client Media Content at a data storage unit residing locally at a client location. Because the conditional, client/vendor relationship pertaining to assignment of authority over client-controlled content display within the RCUI is further defined by separate data storage locations of the client media file(s) and vendor HTML file(s) that call and permit display of the client media file, the vendor maintains ultimate authority to revoke and/or replace display of the client media file at-will in the event of breach or termination of the terms of the previously established agreement between the client and the vendor.

Figure 47:
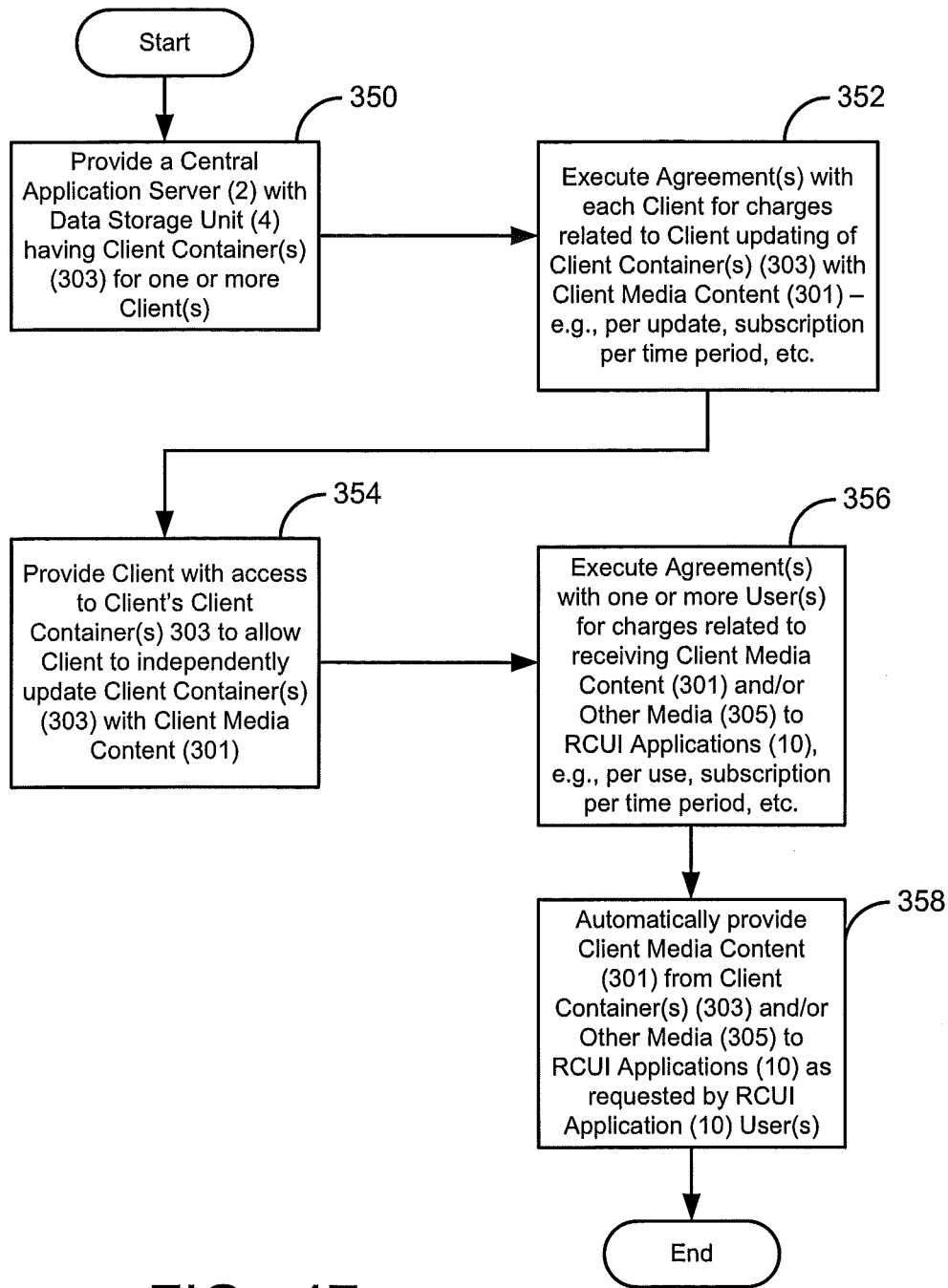
FIG. 47 is a flow chart for a method of utilizing an exemplary virtual asset management system to provide client controlled content and user accessibility.

A flow chart for a method of utilizing a virtual asset management system to provide client controlled content and user accessibility is shown in FIG. 47. In step 350, a vendor, for example, may provide a Central Application Server 2 with a Data Storage Unit 4, as described in detail above. Further, Data Storage Unit 4 may include one or more Client Containers 303 for one or more associated Clients. The Client Containers 303 may store Client Media Content uploaded to Data Storage Unit 4 by respective clients. In addition, or alternatively, as described above, Data Storage Unit 4 may include links or pointers to Client Media Content stored locally on a client Data Storage Unit located at a client location or site.

In step 352, the vendor may execute agreements with each client for charges related to Client updating of Client Containers 202 with Client Media Content 301. For example, vendor may agree to charge on a per update basis based on the number of times a client updates client media content in the respective Client Container 303. In the alternative, vendor may agree to charge a subscription rate for a predetermined period of time within.

In step 354, vendor may provide each Client with access to the Client's Client Container(s) 303 to allow Client to independently update Client Container(s) 303 with Client Media Content 301. In this way, each Client may freely update, modify, and revise their respective media content, including advertising and the like, to be made available to users of connected RCUI Applications 10.

In step 356, vendor may execute an agreement with one or more Users for charges related to receiving Client Media Content and/or Other Media 305 to RCUI Applications 10. Client may pay on a per use basis or on a subscription per predetermined time period basis.

In step 358, the Client Media Content 301 from the Client Containers 303 and/or Other Media 305 may be provided to RCUI Applications 10 as requested by RCUI Application Users. The Client Media Content 301 and Other Media 305 may be pushed out to RCUI Application Users or provided upon request by RCUI Application Users.

Figure 48:
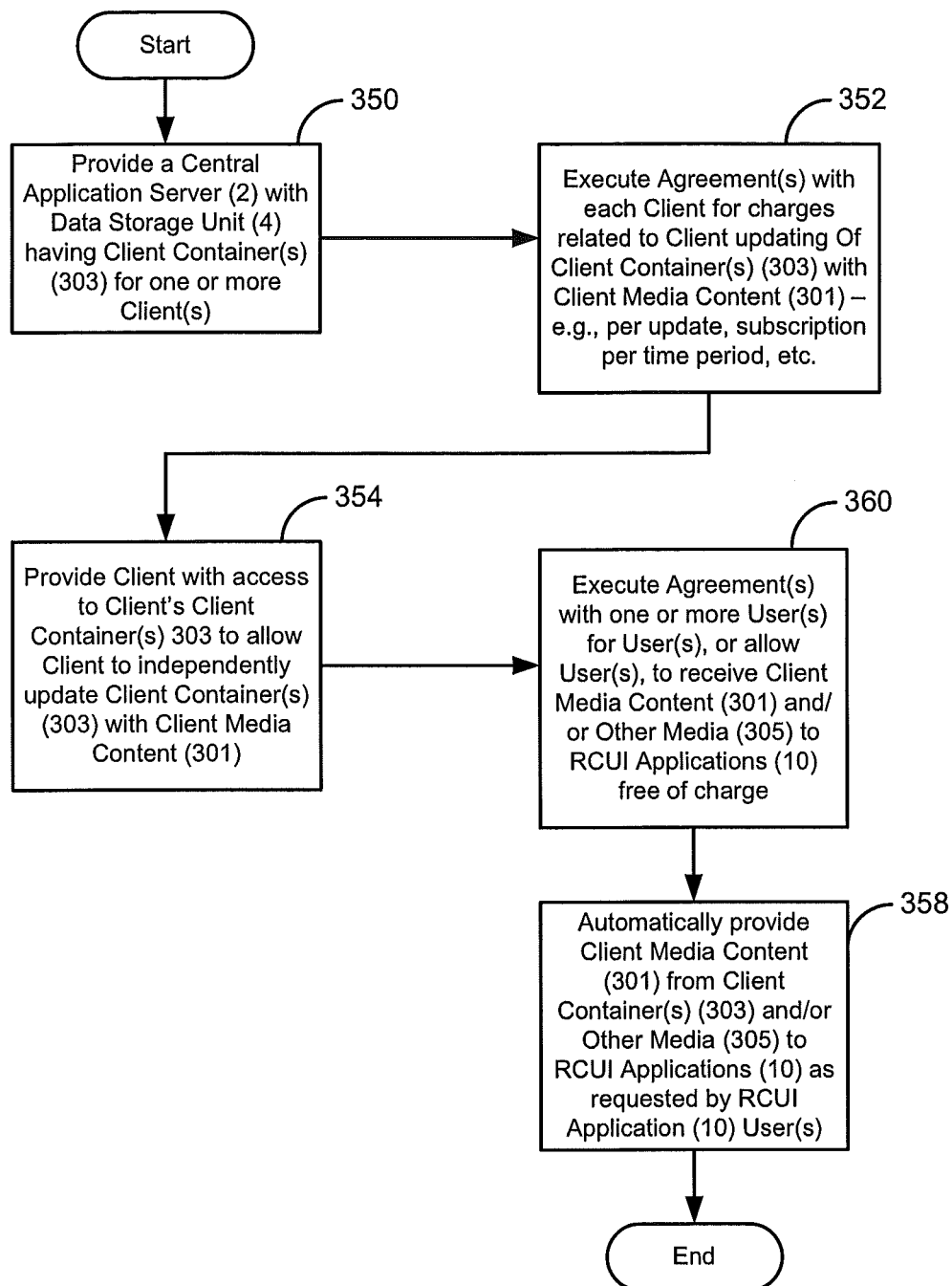
FIG. 48 is a flow chart for a method of utilizing an exemplary virtual asset management system to provide client controlled content and user accessibility.

Another flow chart for a method of utilizing a virtual asset management system to provide client controlled content and user accessibility is shown in FIG. 48. Steps 350, 352, 354, and 358 are as described above with respect to FIG. 47. In step 360, vendor may execute an agreement (explicit or implicit) with one or more Users to provide Client Media Content and/or Other Media 305 to RCUI Applications 10 at no charge. In this way, Client may receive Client Media Content and/or Other Media 305 to RCUI Applications 10 for free.

A hybrid desktop portal system for online information access, delivery and communication is disclosed. The system may include a rich client user interface (RCUI) application, a web client, and application server. A downloadable, embeddable, or web-server-deployed, rich graphical and intuitive User Interface (UI) framework may encapsulate, in a window environment, dense, interactive, two-way web or flash-based, data/media/streaming media-centric content, and online communication functionality, while delivering it to a user desktop, or plurality of user desktops, with single-click procedural calls. The web client may enable a user to display and interact with text, images, videos, music and other information using loosely coupled web-oriented architecture (WOA), protocols, and hyperlink structures typically located on a web page at a website on the World Wide Web or a local area network (LAN). The application server may employ a software engine that delivers applications to client computers or devices, typically through the Internet via the extensive use of server-side dynamic content and integration with database engines, while processing and governing the state of most, if not all, of the ubiquitous program logic and data access requests of the application.

The description is merely exemplary in nature and, thus, variations are intended to be within the scope of the teachings. Such variations are not to be regarded as a departure from the spirit and scope of the teachings.

Computer Program Listing. The following program listing, comprising Sections A through H, includes source code in accordance with the present teachings. A brief description of functionality precedes each section.

Section A—Causes FAQ 56 (FIG. 13), default media module 41 (FIG. 14), flash ticker 61 (FIG. 13), media control panel 66 (FIG. 13) to display with skin assets 53, 54, 55 (FIG. 13).

---

BODY BGCOLOR=020D8C oncontextmenu="return false;" LEFTMARGIN=0 TOPMARGIN=0 MARGINWIDTH=0 MARGINHEIGHT=0 BODY SCROLL="NO">
<!-- ImageReady Slices (PPAD_IF1.psd) --> <TABLE WIDTH=350 BORDER=0 CELLPADDING=0 CELLSPACING=0 HEIGHT="599"> <TR> <TD COLSPAN=3 BGCOLOR=#3300CC> <IMG SRC="http://www.mypowerpad.com/PPAD_1/images/PPAD_IF1_01.jpg" WIDTH=350 HEIGHT=68 ALT="" USEMAP="#Map" BORDER="0"><MAP NAME="Map"><AREA SHAPE="circle" COORDS="330,31,9" HREF="http://www.mypowerpad.com/PAD_MODULES_1/A_TOS/help.htm" TARGET="movieframe2"></MAP></TD></TR>
<TR> <TD BGCOLOR=#3300CC> <IMG SRC="http://www.mypowerpad.com/PPAD_1/images/PPAD_IF1_02.jpg" WIDTH=15 HEIGHT=312 ALT=""></TD><TD BGCOLOR=#3300CC> <IFRAME CLASS="frame_border" NAME="movieframe2" SRC="http://www.mypowerpad.com/PPAD_1/PPAD_IF1_defmod.htm" WIDTH="320" HEIGHT="312" FRAMEBORDER="0" MARGINHEIGHT="0" MARGINWIDTH="0" SCROLLING="no"></IFRAME></TD><TD BGCOLOR=#3300CC> <IMG SRC="http://www.mypowerpad.com/PPAD_1/images/PPAD_IF1_04.jpg"

-continued

```
WIDTH=15 HEIGHT=312 ALT=""></TD></TR>
<TR> <TD COLSPAN=3> <IMG
SRC="http://www.mypowerpad.com/PPAD_1/images/PPAD_IF1_05.jpg"
WIDTH=350 HEIGHT=11 ALT=""></TD></TR>
<TR><TD COLSPAN=3 BGCOLOR=#3300CC> <IFRAME CLASS="frame_border"
NAME="movieframe3" SRC="http://www.mypowerpad.com/PPAD_1/ticker_1.htm"
WIDTH="350" HEIGHT="15" FRAMEBORDER="0" MARGINHEIGHT="0"
MARGINWIDTH="0" SCROLLING="no" ></IFRAME></TD></TR>
<TR> <TD COLSPAN=3 BGCOLOR=#3300CC> <IFRAME CLASS="frame_border"
NAME="movieframe4"
SRC="http://www.mypowerpad.com/PPAD_1/control_1.htm" WIDTH="350"
HEIGHT="193" FRAMEBORDER="0" MARGINHEIGHT="0" MARGINWIDTH="0"
SCROLLING="no" ></IFRAME></TD></TR>
</TABLE><!-- End ImageReady Slices -->
</BODY>
```

Section B—Causes default media module 41 (FIG. 13) to display scroll and link combinations (FIG. 15) while calling for submodule 105, 106, 107 (FIG. 26) to display. The Client-Controlled Ad Module in media module (FIG. 13) (not rotating ad block) can also double as the module for client controlled content described in FIG. 46.

```
<!DOCTYPE html PUBLIC "-//W3C//DTD XHTML 1.0 Transitional//EN"
"http://www.w3.org/TR/xhtml1/DTD/xhtml1-transitional.dtd">
<html xmlns="http://www.w3.org/1999/xhtml">
<head>
<META HTTP-EQUIV="Content-Type" CONTENT="no; charset=iso-8859-1"><link
rel=alternate         media=print         href="noprint.asp">
<title>Iframe_Playlist</title> <style type="text/css">
     body {scrollbar-3dlight-color:;
          scrollbar-arrow-color:017FD0;
          scrollbar-base-color:;
          scrollbar-darkshadow-color:;
          scrollbar-face-color:0000C2;
          scrollbar-highlight-color:017FD0;
          scrollbar-shadow-color:}
.td_movie {
     background:#001389;
}
</style>
<script language=JavaScript>
<!--
var message="THIS IS PROPRIETARY INFORMATION";
function   clickIE( ) {  if   (document.all)   {(message);return   false;}}
function clickNS(e) {if
(document.layers||(document.getElementById&&!document.all))        {   if
(e.which==2||e.which==3)     {(message);return      false;}}}      if
(document.layers)
{document.captureEvents(Event.MOUSEDOWN);document.onmousedown=clickNS;}
else{document.onmouseup=clickNS;document.oncontextmenu=clickIE;}
document.oncontextmenu=new Function("return false") // --> </script>
<script language="JavaScript1.2">
function disableselect(e){
return false
}
function reEnable( ){
return true
}
//if IE4+
document.onselectstart=new Function ("return false")
//if NS6
if (window.sidebar){
document.onmousedown=disableselect
document.onclick=reEnable
}
</script>
<SCRIPT LANGUAGE=JAVASCRIPT>
window.status = "PPAD_IF1_defmod.htm";
</SCRIPT>
<script type="text/javascript" language="javascript">
function ge( )
{var            ea;for(var            i=0;i<arguments.length;i++){var
e=arguments[i];if(typeof e=='string')
e=document.getElementById(e);if(arguments.length==1)
return e;if(!ea)
ea=new Array( );ea[ea.length]=e;}
return ea;}
```

-continued

```
function change_video( ){
if(document.form1.video_url.value!="-")
url=document.form1.video_url.value
ge('div_iframe').innerHTML='<IFRAME CLASS="frame_border"
NAME="movieframe7" src="'+url+'" WIDTH="320" HEIGHT="291"
FRAMEBORDER="0" MARGINHEIGHT="0" MARGINWIDTH="0" SCROLLING="no" >
</IFRAME>'
}
function change_video2( ){
if(document.form1.video_url2.value!="-")
url=document.form1.video_url2.value
ge('div_iframe').innerHTML='<IFRAME CLASS="frame_border"
NAME="movieframe7" src="'+url+'" WIDTH="320" HEIGHT="291"
FRAMEBORDER="0" MARGINHEIGHT="0" MARGINWIDTH="0" SCROLLING="no" >
</IFRAME>'
}
</script>
</head>
<body oncontextmenu="return false;" LEFTMARGIN="0" TOPMARGIN="0"
BGCOLOR="001389" BODY SCROLL="NO">
<TABLE WIDTH="320" BORDER="0" CELLSPACING="0" CELLPADDING="0"
HEIGHT="312" BGCOLOR="001389">
<TR> <TD COLSPAN="2" WIDTH="320"> <TR> <TD CLASS="td_movie"
WIDTH="320"    HEIGHT="291"><div    id="div_iframe"><IFRAME
CLASS="frame_border"  NAME="movieframe7" src="submodA.html"
WIDTH="320" HEIGHT="291" FRAMEBORDER="0" MARGINHEIGHT="0"
MARGINWIDTH="0" SCROLLING="no" >
</IFRAME></div></TD></TR>    <TR>   <TD   WIDTH="320"   HEIGHT="21"><FORM
NAME="form1"><DIV ALIGN="LEFT" STYLE="scrollbar-face-color: #0515CD;
        scrollbar-track-color: #0515CD;
        scrollbar-arrow-color: #ECE9D8;
        scrollbar-3dlight-color: #373DE6;
        scrollbar-shadow-color: #ECE9D8;
        scrollbar-highlight-color: #ECE9D8;
        scrollbar-darkshadow-color: #0912A2"><SELECT NAME="video_url"
STYLE="color:#FFFFFF;background:#0912A2" ONCHANGE="change_video( )"
MULTIPLE   SIZE="1"><OPTION   VALUE="submod4.html">Scroll   Down   Playlist -
</OPTION><OPTION    VALUE="submod2.html">Tejano    Music</OPTION><OPTION
VALUE="submod3.html">Christian            Contemp</OPTION><OPTION
VALUE="submod7.html">Jazz             London</OPTION><OPTION
VALUE="submod6.html">Flash             Player</OPTION><OPTION
VALUE="submod14.html">San     Diego,     CA</OPTION><OPTION
VALUE="submod16.html">Panama     City     Pool</OPTION><OPTION
VALUE="http://www.mypowerpad.com/audio/album.html">Sandra's
Music</OPTION></SELECT> <   FONT   COLOR="#000099">1</FONT><SELECT
NAME="video_url2" STYLE="color:#FFFFFF;background:#0912A2"
ONCHANGE="change_video2( )"         MULTIPLE         SIZE="1"><OPTION
VALUE="submod10.html">Scroll    Down    Playlist    -</OPTION><OPTION
VALUE="submod1.html">Oral     Roberts     Univ</OPTION><OPTION
VALUE="submod8.html">Paul             Potts</OPTION><OPTION
VALUE="submod9.html">Australia    Top    40</OPTION><OPTION
VALUE="submod12.html">Cartoons</OPTION><OPTION
VALUE="submod11.html">Classic
Movies</OPTION><OPTION            VALUE="submod13.html">Waikiki
Beach</OPTION><OPTION            VALUE="submod15.html">Times    Square
NY</OPTION><OPTION    VALUE="submod18.html">W.    Wall    -
Jerusalem</OPTION></SELECT>   </DIV></FORM></TD></TR>   </TABLE>   </body>
</html>
```

Section C—Causes submodule 105, 106, 107 (FIG. 26) to display client controlled content and rotating ad block 180 & 181 (FIG. 26).

```
<HTML>
<HEAD>
<TITLE>submod</TITLE> <META HTTP-EQUIV="Content-Type"
CONTENT="text/html; charset=iso-8859-1"> </HEAD>
<BODY oncontextmenu="return false;" BGCOLOR="001389"
LEFTMARGIN="0" TOPMARGIN="0">
<TABLE WIDTH="320" BORDER="0" CELLSPACING="0"
CELLPADDING="0"
HEIGHT="291"><TR><TD     WIDTH="320"
HEIGHT="249"><div
id="div_iframe"><IFRAME CLASS="frame_border"
NAME="movieframe5"
src="movieasx.htm" WIDTH="320" HEIGHT="249"
FRAMEBORDER="0"
MARGINHEIGHT="0"        MARGINWIDTH="0"
SCROLLING="no"      >
</IFRAME></div></TD></TR><TR><TD      WIDTH="320"
HEIGHT= "42"><div
id="div_iframe"><IFRAME CLASS="frame_border"
NAME="movieframe6"
src="L_1.htm" WIDTH="320" HEIGHT="42"
FRAMEBORDER="0" MARGINHEIGHT="0"
MARGINWIDTH="0" SCROLLING="no" >
</IFRAME></div></TD></TR></TABLE>
</BODY>
</HTML>
```

Section D—Causes lower/upper third rotating ad blocks 180 & (FIG. 26) to display.

```
<!DOCTYPE html PUBLIC "-//W3C//DTD XHTML 1.0
Transitional//EN"
"http://www.w3.org/TR/xhtml1/DTD/xhtml1-transitional.dtd">
<html xmlns="http://www.w3.org/1999/xhtml">
<head>
<meta http-equiv="refresh" content="20;
url=L_4.htm" charset=iso-8859-1">
<title>L_3</title>
</head>
<style type="text/css">
body{
margin:0px;
}
</style>
<body    BGCOLOR="001389"    LEFTMARGIN="0"
TOPMARGIN="0">   <OBJECT
CLASSID="clsid:D27CDB6E-AE6D-11cf-96B8-444553540000"
CODEBASE="http://download.macromedia.com/pub/
shockwave/cabs/flash/swflash.cab#version=4,0,2,0"
WIDTH="320"
HEIGHT="42">
<PARAM NAME=movie VALUE="http://
www.mypowerpad.com/PPAD_1/L_3.swf">
<PARAM NAME=quality VALUE=high><PARAM
NAME="BGCOLOR" VALUE="#000000">
<EMBED    SRC="http://www.mypowerpad.com/
PPAD_1/L_3.swf"    QUALITY=high
PLUGINSPAGE="http://www.macromedia.com/shockwave/
download/index.cgi?P1_
Prod_Version=ShockwaveFlash"    TYPE="application/
x-shockwave-flash" WIDTH="320" HEIGHT="42"
BGCOLOR="#000000"></EMBED>
</OBJECT>
</body>
</html>
```

Section E—Causes horizontal scroll button 63 (FIG. 13) within media control panel 66 (FIG. 13) to simultaneously

```
}
In this instance "gotoSceneAndPlay("<current scene>",4);" produces in a
flash movie timeline:
onFrame (4,afterPlacedObjectEvents) {
getURL("http://www.mypowerpad.com/PAD_MODULES_1/
1_KNOWGOD/KnowGod_premod.htm", "movieframe2");
}
```

Section F—Causes default media content to display in media module 41 (FIG. 13) from within media control panel 66 (FIG. 13).

```
onFrame (4,afterPlacedObjectEvents) {
getURL("http://www.mypowerpad.com/PAD_MODULES_1/
1_KNOWGOD/KnowGod_premod.htm", "movieframe2");
}
```

Section G—Causes horizontal scroll button 63 (FIG. 13) within media control panel 66 (FIG. 13) to simultaneously display vertical scrolling menu 60 (FIG. 13) and default media content in default media module 41 (FIG. 13).

```
on (rollOver) {
    playSound("cpanel_buttonrollover.mp3");
}
on (press) {
    gotoSceneAndPlay("<current scene>",4);
    playSound("cpanel_menuappear.mp3");
}
```

Section H—Causes default media module 41 (FIG. 13) to display Client-Controlled Ad Module 198 (FIG. 34)

```
<!DOCTYPE html PUBLIC "-//W3C//DTD XHTML 1.0 Transitional//EN"
"http://www.w3.org/TR/xhtml1/DTD/xhtml1-transitional.dtd">
<html xmlns="http://www.w3.org/1999/xhtml">
<head>
<meta http-equiv="refresh" content="20;
url=http://www.mypowerpad.com/PAD_MODULES_1/1_KNOWGOD/submodA.html"
charset=iso-8859-1">
<title>Main Ad</title>
</head>
<body oncontextmenu="return false;" LEFTMARGIN="0" TOPMARGIN="0"
BGCOLOR="#000000" BODY SCROLL="NO">
<TABLE WIDTH="320" BORDER="0" CELLSPACING="0" CELLPADDING="0"
HEIGHT="312" BGCOLOR="#000000">
<TR>   <TD   COLSPAN="2"   WIDTH="320">   <TR   BORDERCOLOR="#000000">   <TD
CLASS="td_movie"   WIDTH="320"   HEIGHT="312"><div   id="div_iframe"><DIV
ALIGN="CENTER"><IFRAME CLASS="frame_border"   NAME="movieframe2"
    src="http://www.mypowerpad.com/PAD_MODULES_1/1_KNOWGOD/ad.html"
WIDTH="320" HEIGHT="312" FRAMEBORDER="0" MARGINHEIGHT="0"
MARGINWIDTH="0"    SCROLLING="no"    ></IFRAME></DIV></div></TD></TR>
</TABLE> </body>
``` display vertical scrolling menu 60 (FIG. 13) and default media content in default media module 41 (FIG. 13).

```
on (rollOver) {
    playSound("cpanel_buttonrollover.mp3");
}
on (press) {
    gotoSceneAndPlay("<current scene>",4);
    playSound("cpanel_menuappear.mp3");
}
```

The invention claimed is:

1. A system comprising:
  a central application server with a data storage unit including a plurality of client containers corresponding to a plurality of clients, each client container storing client media content provided by a respective client, said client media content including at least one of audio files, video files, and audio/video files;
  a plurality of computing devices connected to said central application server, each computing device receiving client media content from at least one client container of said plurality of client containers;

wherein each client container of said plurality of client containers is updated independently with client media content from each respective client.

2. The system of claim 1 wherein said client media content includes advertising related to said respective client.

3. The system of claim 1 wherein each computing device includes a user interface application for providing said client media content to a user.

4. The system of claim 3 wherein said user interface application includes a media retrieval module for receiving said client media content from said central application server.

5. The system of claim 3 wherein said user interface application includes a media control module for receiving user input from said user with respect to outputting said client media content to said user.

6. The system of claim 3 wherein said user interface application includes a flash ticker module for displaying at least one of animated text or hyper-linkable text.

7. The system of claim 3 wherein said client media content is streamed to said plurality of computing devices.

8. The system of claim 1 further comprising a client data storage unit residing locally at a client location associated with one of the plurality of clients, wherein the data storage unit includes a link to the client data storage unit and wherein the client container associated with said one of the plurality of clients is updated with client media content retrieved from said client data storage unit by the central application server accessing, via said link, said client media content stored at said client data storage unit.

* * * * *